US012565597B2

(12) United States Patent
Mitsuhashi et al.

(10) Patent No.: US 12,565,597 B2
(45) Date of Patent: Mar. 3, 2026

(54) ELECTRONIC DEVICE

(71) Applicant: DAIKIN INDUSTRIES, LTD., Osaka (JP)

(72) Inventors: Hisashi Mitsuhashi, Osaka (JP); Takashi Nomura, Osaka (JP); Masato Naitou, Osaka (JP); Yuusuke Watanabe, Osaka (JP); Kaori Ozawa, Osaka (JP); Shinya Takano, Osaka (JP); Peter Hupfield, Düsseldorf (DE)

(73) Assignee: DAIKIN INDUSTRIES, LTD., Osaka (JP)

( * ) Notice: Subject to any disclaimer, the term of this patent is extended or adjusted under 35 U.S.C. 154(b) by 933 days.

(21) Appl. No.: 16/945,287

(22) Filed: Jul. 31, 2020

(65) Prior Publication Data

US 2020/0362197 A1     Nov. 19, 2020

Related U.S. Application Data

(63) Continuation of application No. PCT/JP2019/003495, filed on Jan. 31, 2019.

(30) Foreign Application Priority Data

Feb. 2, 2018   (JP) ................................. 2018-017588

(51) Int. Cl.

| | |
|---|---|
| *C09D 183/08* | (2006.01) |
| *C03C 17/30* | (2006.01) |
| *C08G 65/336* | (2006.01) |
| *C09D 5/00* | (2006.01) |
| *C09D 183/02* | (2006.01) |
| *C09D 183/12* | (2006.01) |
| *H04M 1/02* | (2006.01) |

(52) U.S. Cl.
CPC ............ *C09D 183/02* (2013.01); *C03C 17/30* (2013.01); *C08G 65/336* (2013.01); *C09D 5/00* (2013.01); *H04M 1/02* (2013.01)

(58) Field of Classification Search
CPC ........ C03C 17/30; C08G 65/336; C08G 77/46
USPC ......................................................... 528/42
See application file for complete search history.

(56) References Cited

U.S. PATENT DOCUMENTS

| | | | |
|---|---|---|---|
| 10,703,932 B2 * | 7/2020 | Katsukawa | .......... C09D 171/00 |
| 2002/0130996 A1 * | 9/2002 | Cheng | .............. G02F 1/133528 |
| | | | 349/113 |
| 2007/0149746 A1 † | 6/2007 | Yamane | |
| 2008/0114120 A1 † | 5/2008 | Koike | |

| | | | |
|---|---|---|---|
| 2012/0077041 A1 † | 3/2012 | Yamane | |
| 2015/0307719 A1 * | 10/2015 | Mitsuhashi | ............. C07F 7/188 |
| | | | 428/447 |
| 2016/0137878 A1 * | 5/2016 | Yamane | ............... C09D 183/00 |
| | | | 528/36 |
| 2016/0304665 A1 † | 10/2016 | Sakoh | |
| 2017/0044315 A1 * | 2/2017 | Mitsuhashi | .......... C09D 5/1637 |
| 2018/0186820 A1 * | 7/2018 | Katsukawa | .......... C08G 65/336 |
| 2019/0040266 A1 | 2/2019 | Hoshino et al. | |
| 2020/0002551 A1 | 1/2020 | Mitsuhashi et al. | |

FOREIGN PATENT DOCUMENTS

| | | | |
|---|---|---|---|
| EP | 3 345 912 A1 | | 7/2018 |
| EP | 3 747 930 A1 | | 12/2020 |
| JP | 2002348370 A | † | 12/2002 |
| JP | 2007-197425 A | | 8/2007 |
| JP | 2008-144144 A | | 6/2008 |
| JP | 2012-72272 A | | 4/2012 |
| JP | 2013-150393 A | | 8/2013 |
| JP | 2014214194 A | † | 11/2014 |
| JP | 2016-204656 A | | 12/2016 |
| JP | 2017-2216 A | | 1/2017 |
| JP | 2017002216 A | † | 1/2017 |
| JP | 3209878 U | | 4/2017 |
| KR | 20140004035 | * | 1/2014 |
| WO | 2012/081519 A1 | | 6/2012 |
| WO | 2015/166760 | * | 5/2015 |
| WO | WO 2016208587 | * | 12/2016 |
| WO | 2017/187775 A1 | | 11/2017 |
| WO | 2018/143433 A1 | | 8/2018 |

OTHER PUBLICATIONS

Keun et al. (electronic translation of KR 20140004035), Jan. 2014.*
"What is a Touch Panel?", Zebra, 2022, pp. 1-5 (5 pages); [online] URL: <https://www.zebra.com/us/en/resource-library/faq/mobile-computing/what-is-a-touch-panel.html>.
"How can a screen sense touch? A basic understanding of touch panels", EIZO, 2022, pp. 1-7 (7 pages), [online] URL: <https://www.eizoglobal.com/library/basics/basic_understanding_of_touch_panel/>.
International Search Report for PCT/JP2019/003495 dated Apr. 16, 2019 (PCT/ISA/210).
Extended European Search report dated Nov. 12, 2021 from the European Patent Office in counterpart Application No. 19747233.5.
International Preliminary Report on Patentability with the translation of Written Opinion dated Aug. 13, 2020 from the International Bureau in International application No. PCT/JP2019/003495.

* cited by examiner
† cited by third party

*Primary Examiner* — Margaret G Moore
(74) *Attorney, Agent, or Firm* — Sughrue Mion, PLLC

(57) ABSTRACT

An electronic device comprising a surface-treating layer formed on at least a part of a surface thereof, the surface-treating layer being formed of a (poly)ether group-containing silane compound represented by any of the formulae (A1), (A2), (B1), (B2), (C1), or (C2). The symbols are as defined in the description.

10 Claims, No Drawings

ELECTRONIC DEVICE

TECHNICAL FIELD

The present disclosure relates to an electronic device.

BACKGROUND ART

Electronic devices, for example, mobile devices such as mobile phones and smartphones, which can be driven by a battery are often driven by a battery pack. For charging such a battery pack, a method using a non-contact power supply technology for making the power transmission side and the power reception side wireless, for example, a method utilizing electromagnetic induction, may be used. For example, Patent Literature 1 discloses a method of charging a battery pack by transferring electric power from a power supply coil built in a charging stand to an inductive coil built in the battery pack. Patent Literature 1 discloses that since the battery-driven device and the charging stand are made of hard plastic, the surface is smooth and slippery when overlapped, and that an anti-slip unit such as a rubber-like sheet is provided on the charging surface.

CITATION LIST

Patent Literature

Patent Literature 1: International Publication No. WO2012/081519

SUMMARY OF INVENTION

Technical Problem

An object of the present disclosure is to suppress lubricity on the surface of an electronic device.

Solution to Problem

According to the present disclosure, the following Embodiments are provided:

Embodiment 1

An electronic device comprising a surface-treating layer formed on at least a part of a surface thereof, the surface-treating layer being formed of a fluoro(poly)ether group-containing silane compound represented by any of the following formulae (A1), (A2), (B1), (B2), (C1), or (C2):

$$(Rf-PFPE)_{\alpha'}-X^1-((CH_2C)_t-R^{11})_\alpha \atop \overset{R^{12}}{\underset{X^2-SiR^{13}{}_nR^{14}{}_{3-n}}{|}} \tag{A1}$$

$$R^{14}{}_{3-n}R^{13}{}_nSi-X^2 \atop \overset{R^{12}}{\underset{(R^{11}-(CCH_2)_t)_\alpha}{|}}-X^1-PFPE-X^1-((CH_2C)_t-R^{11})_\alpha \atop \overset{R^{12}}{\underset{X^2-SiR^{13}{}_nR^{14}{}_{3-n}}{|}} \tag{A2}$$

$$(Rf-PFPE)_{\beta'}-X^3-(SiR^a{}_{k1}R^b{}_{l1}R^c{}_{m1})_\beta \tag{B1}$$

-continued $$(R^c{}_{m1}R^b{}_{l1}R^a{}_{k1}Si)_\beta-X^3-PFPE-X^3-(SiR^a{}_{k1}R^b{}_{l1}R^c{}_{m1})_\beta \tag{B2}$$

$$(Rf-PFPE)_{\gamma'}-X^5-(CR^d{}_{k2}R^e{}_{l2}R^f{}_{m2})_\gamma \tag{C1}$$

$$(R^f{}_{m2}R^e{}_{l2}R^d{}_{k2}C)_\gamma-X^5-PFPE-X^5-(CR^d{}_{k2}R^e{}_{l2}R^f{}_{m2})_\gamma \tag{C2}$$

wherein:

PFPE is each independently at each occurrence a group represented by the formula:

$$-(OC_6F_{12})_a-(OC_5F_{10})_b-(OC_4F_8)_c-(OC_3X^F{}_6)_d- \atop (OC_2F_4)_e-(OCF_2)_f-$$

and having at least one branched structure, wherein a, b, c, d, e, and f are each independently an integer of 0 or more and 200 or less, and the sum of a, b, c, d, e, and f is at least 1, and the occurrence order of the respective repeating units in parentheses with a, b, c, d, e, or f is arbitrary in the formula, and $X^F$ is each independently at each occurrence a hydrogen atom, a fluorine atom, or a chlorine atom, or a group represented by the formula:

$$-(R^{16}-R^{17})_{j1}-$$

wherein $R^{16}$ is $OCF_2$ or $OC_2F_4$;

$R^{17}$ is a group selected from $OC_2F_4$, $OC_3X^F{}_6$, $OC_4F_8$, $OC_5F_{10}$, and $OC_6F_{12}$, or is a combination of two or three groups independently selected from these groups;

j1 is an integer of 2 to 100; and $X^F$ is each independently at each occurrence a hydrogen atom, a fluorine atom, or a chlorine atom;

Rf each independently at each occurrence represents an alkyl group having 1 to 16 carbon atoms which is optionally substituted by one or more fluorine atoms;

$X^1$ each independently at each occurrence represents a single bond or a 2 to 10 valent organic group;

α is each independently at each occurrence an integer of 1 to 9;

α' is each independently an integer of 1 to 9;

$R^{11}$ each independently at each occurrence represents a hydrogen atom or a halogen atom;

$R^{12}$ each independently at each occurrence represents a hydrogen atom or a lower alkyl group;

$X^2$ each independently at each occurrence represents a single bond or a divalent organic group;

$R^{13}$ each independently at each occurrence represents a hydroxyl group or a hydrolyzable group;

$R^{14}$ each independently at each occurrence represents a hydrogen atom or an alkyl group having 1 to 22 carbon atoms;

t is each independently at each occurrence an integer of 2 to 10;

n independently represents an integer of 0 to 3 or more for each ($-SiR^{13}{}_nR^{14}{}_{3-n}$) unit;

in the formulae (A1) and (A2), at least one n is an integer of 1 to 3;

$X^3$ each independently at each occurrence represents a single bond or a 2 to 10 valent organic group;

β is each independently at each occurrence an integer of 1 to 9;

β' is each independently an integer of 1 to 9;

$R^a$ each independently at each occurrence represents $-Z^3-SiR^{71}{}_{p1}R^{72}{}_{q1}R^{73}{}_{r1}$;

$Z^3$ each independently at each occurrence represents an oxygen atom or a divalent organic group;

$R^{71}$ each independently at each occurrence represents $R^{a'}$;

$R^{a'}$ is as defined for $R^a$;

in $R^a$, the number of Si atoms which are linearly linked via the $Z^3$ group is up to five;

$R^{72}$ each independently at each occurrence represents a hydroxyl group or a hydrolyzable group;

$R^{73}$ each independently at each occurrence represents a hydrogen atom or a lower alkyl group;

p1 is each independently at each occurrence an integer of 0 to 3;

q1 is each independently at each occurrence an integer of 0 to 3;

r1 is each independently at each occurrence an integer of 0 to 3;

in each ($-Z^3-SiR^{71}_{p1}R^{72}_{q1}R^{73}_{r1}$), the sum of p1, q1, and r1 is 3;

$R^b$ each independently at each occurrence represents a hydroxyl group or a hydrolyzable group;

$R^c$ each independently at each occurrence represents a hydrogen atom or a lower alkyl group;

k1 is each independently at each occurrence an integer of 0 to 3;

l1 is each independently at each occurrence an integer of 0 to 3;

m1 is each independently at each occurrence an integer of 0 to 3;

in each ($SiR^a_{k1}R^b_{l1}R^c_{m1}$), the sum of k1, l1, and m1 is 3, and in the formulae (B1) and (B2), at least one q1 is an integer of 1 to 3;

$X^5$ each independently represents a single bond or a 2 to 10 valent organic group;

$\gamma$ is each independently an integer of 1 to 9;

$\gamma'$ is each independently an integer of 1 to 9;

$R^d$ each independently at each occurrence represents $-Z^4-CR^{81}_{p2}R^{82}_{q2}R^{83}_{r2}$;

$Z^4$ each independently at each occurrence represents an oxygen atom or a divalent organic group;

$R^{81}$ each independently at each occurrence represents $R^{d'}$;

$R^{d'}$ is as defined for $R^d$;

in $R^d$, the number of C atoms which are linearly linked via the $Z^4$ group is up to five;

$R^{82}$ each independently at each occurrence represents $-Y-SiR^{85}_{n2}R^{86}_{3-n2}$;

Y each independently at each occurrence represents a divalent organic group;

$R^{85}$ each independently at each occurrence represents a hydroxyl group or a hydrolyzable group;

$R^{86}$ each independently at each occurrence represents a hydrogen atom or a lower alkyl group;

n2 independently represents an integer of 0 to 3 for each ($-Y-SiR^{85}_{n2}R^{86}_{3-n2}$) unit;

$R^{83}$ each independently at each occurrence represents a hydrogen atom, a hydroxyl group, or a lower alkyl group;

p2 is each independently at each occurrence an integer of 0 to 3;

q2 is each independently at each occurrence an integer of 0 to 3;

r2 is each independently at each occurrence an integer of 0 to 3;

in each ($-Z^4-CR^{81}_{p2}R^{82}_{q2}R^{83}_{r2}$), the sum of p2, q2, and r2 is 3;

$R^e$ each independently at each occurrence represents $-Y-SiR^{85}_{n2}R^{86}_{3-n2}$;

$R^f$ each independently at each occurrence represents a hydrogen atom, a hydroxyl group, or a lower alkyl group;

k2 is each independently at each occurrence an integer of 0 to 3;

l2 is each independently at each occurrence an integer of 0 to 3;

m2 is each independently at each occurrence an integer of 0 to 3; and in each ($CR^d_{k2}R^e_{l2}R^f_{m2}$), the sum of k2, l2, and m2 is 3, and in the formulae (C1) and (C2), there is at least one group represented by $-Y-SiR^5$;

Embodiment 2

The electronic device according to [Embodiment 1], wherein in the formulae (A1) and (A2), there are at least two $SiR^{13}$;

Embodiment 3

The electronic device according to [Embodiment 1] or [Embodiment 2], wherein in the formulae (B1) and (B2), there are at least two Si atoms bonded to a hydroxyl group or a hydrolyzable group;

Embodiment 4

The electronic device according to any one of [Embodiment 1] to [Embodiment 3], wherein in the formulae (C1) and (C2), there are two or more groups represented by $-Y-SiR^{85}$;

Embodiment 5

The electronic device according to any one of [Embodiment 1] to [Embodiment 4], wherein $X^F$ is a fluorine atom;

Embodiment 6

The electronic device according to any one of [Embodiment 1] to [Embodiment 5], wherein $R^{83}$ and $R^f$ are each independently at each occurrence a hydrogen atom or a lower alkyl group;

Embodiment 7

The electronic device according to any one of [Embodiment 1] to [Embodiment 6], wherein the electronic device is a device capable of being driven by a rechargeable battery;

Embodiment 8

The electronic device according to any one of [Embodiment 1] to [Embodiment 7], wherein the electronic device is a mobile phone or a smartphone;

Embodiment 9

The electronic device according to [Embodiment 7] or [Embodiment 8], wherein the electronic device has a first main surface and a second main surface facing the first main surface, and has a surface-treating layer on the second main surface;

Embodiment 101

The electronic device according to any one of [Embodiment 1] to [Embodiment 6], wherein the electronic device is a charging stand;

Embodiment 11

An electronic device comprising a surface-treating layer on a surface, wherein a contact angle of water on the surface is 100 degrees or more and a dynamic friction coefficient on the surface is in the range of 0.1 to 0.5;

Embodiment 12

The electronic device according to [Embodiment 11], wherein the contact angle of water is 110 degrees or more and the dynamic friction coefficient is in the range of 0.15 to 0.35;

Embodiment 13

A set device comprising an electronic device and a charging stand, wherein at least one of the electronic device and the charging stand comprises a surface-treating layer formed on at least a part of a surface thereof, the surface-treating layer being formed of a fluoro(poly)ether group-containing silane compound represented by any of the following formulae (A1), (A2), (B1), (B2), (C1), or (C2):

$$(Rf\!-\!PFPE)_{\alpha'}\!-\!X^1\!-\!((CH_2C)_t\!-\!R^{11})_\alpha \quad \substack{R^{12} \\ | \\ X^2\!-\!SiR^{13}{}_nR^{14}{}_{3\text{-}n}} \tag{A1}$$

$$(R^{11}\!-\!(CCH_2)_t)_\alpha\!-\!X^1\!-\!PFPE\!-\!X^1\!-\!((CH_2C)_t\!-\!R^{11})_\alpha \\ R^{14}{}_{3\text{-}n}R^{13}{}_nSi\!-\!X^2 \qquad X^2\!-\!SiR^{13}{}_nR^{14}{}_{3\text{-}n} \tag{A2}$$

$$(Rf\!-\!PFPE)_{\beta'}\!-\!X^3\!-\!(SiR^a{}_{k1}R^b{}_{l1}R^c{}_{m1})_\beta \tag{B1}$$

$$(R^c{}_{m1}R^b{}_{l1}R^a{}_{k1}Si)_\beta\!-\!X^3\!-\!PFPE\!-\!X^3\!-\!(SiR^a{}_{k1}R^b{}_{l1}R^c{}_{m1})_\beta \tag{B2}$$

$$(Rf\!-\!PFPE)_{\gamma'}\!-\!X^5\!-\!(CR^d{}_{k2}R^e{}_{l2}R^f{}_{m2})_\gamma \tag{C1}$$

$$(R^f{}_{m2}R^e{}_{l2}R^d{}_{k2}C)_\gamma\!-\!X^5\!-\!PFPE\!-\!X^5\!-\!(CR^d{}_{k2}R^e{}_{l2}R^f{}_{m2})_\gamma \tag{C2}$$

wherein:

PFPE is each independently at each occurrence a group represented by the formula:

$$-(OC_6F_{12})_a\!-\!(OC_5F_{10})_b\!-\!(OC_4F_8)_c\!-\!(OC_3X^F{}_6)_d\!- \\ (OC_2F_4)_e\!-\!(OCF_2)_f\!-$$

and having at least one branched structure, wherein a, b, c, d, e, and f are each independently an integer of 0 or more and 200 or less, and the sum of a, b, c, d, e, and f is at least 1, and the occurrence order of the respective repeating units in parentheses with a, b, c, d, e, or f is arbitrary in the formula, and $X^F$ is each independently at each occurrence a hydrogen atom, a fluorine atom, or a chlorine atom, or a group represented by the formula:

$$-(R^{16}\!-\!R^{17})_{j1}-$$

wherein $R^{16}$ is $OCF_2$ or $OC_2F_4$;

$R^{17}$ is a group selected from $OC_2F_4$, $OC_3X^F{}_6$, $OC_4F_8$, $OC_5F_{10}$, and $OC_6F_{12}$, or is a combination of two or three groups independently selected from these groups;

j1 is an integer of 2 to 100; and $X^F$ is each independently at each occurrence a hydrogen atom, a fluorine atom, or a chlorine atom;

Rf each independently at each occurrence represents an alkyl group having 1 to 16 carbon atoms which is optionally substituted by one or more fluorine atoms;

$X^1$ each independently at each occurrence represents a single bond or a 2 to 10 valent organic group;

$\alpha$ is each independently at each occurrence an integer of 1 to 9;

$\alpha'$ is each independently an integer of 1 to 9;

$R^{11}$ each independently at each occurrence represents a hydrogen atom or a halogen atom;

$R^{12}$ each independently at each occurrence represents a hydrogen atom or a lower alkyl group;

$X^2$ each independently at each occurrence represents a single bond or a divalent organic group;

$R^{13}$ each independently at each occurrence represents a hydroxyl group or a hydrolyzable group;

$R^{14}$ each independently at each occurrence represents a hydrogen atom or an alkyl group having 1 to 22 carbon atoms;

t is each independently at each occurrence an integer of 2 to 10;

n independently represents an integer of 0 to 3 or more for each ($-SiR^{13}{}_nR^{14}{}_{3\text{-}n}$) unit;

in the formulae (A1) and (A2), at least one n is an integer of 1 to 3;

$X^3$ each independently at each occurrence represents a single bond or a 2 to 10 valent organic group;

$\beta$ is each independently at each occurrence an integer of 1 to 9;

$\beta'$ is each independently an integer of 1 to 9;

$R^a$ each independently at each occurrence represents $-Z\!-\!SiR^{71}{}_{p1}R^{72}{}_{q1}R^{73}{}_{r1}$;

$Z^3$ each independently at each occurrence represents an oxygen atom or a divalent organic group;

$R^{71}$ each independently at each occurrence represents $R^{a'}$;

$R^{a'}$ is as defined for $R^a$;

in $R^a$, the number of Si atoms which are linearly linked via the $Z^3$ group is up to five;

$R^{72}$ each independently at each occurrence represents a hydroxyl group or a hydrolyzable group;

$R^{73}$ each independently at each occurrence represents a hydrogen atom or a lower alkyl group;

p1 is each independently at each occurrence an integer of 0 to 3;

q1 is each independently at each occurrence an integer of 0 to 3;

r1 is each independently at each occurrence an integer of 0 to 3;

in each ($-Z^3\!-\!SiR^{71}{}_{p1}R^{72}{}_{q1}R^{73}{}_{r1}$), the sum of p1, q1, and r1 is 3;

$R^b$ each independently at each occurrence represents a hydroxyl group or a hydrolyzable group;

$R^c$ each independently at each occurrence represents a hydrogen atom or a lower alkyl group;

k1 is each independently at each occurrence an integer of 0 to 3;

l1 is each independently at each occurrence an integer of 0 to 3;

m1 is each independently at each occurrence an integer of 0 to 3;

in each $(SiR^a{}_{k1}R^b{}_{l1}R^c{}_{m1})$, the sum of k1, l1, and m1 is 3, and in the formulae (B1) and (B2), at least one q1 is an integer of 1 to 3;

$X^5$ each independently represents a single bond or a 2 to 10 valent organic group;

γ is each independently an integer of 1 to 9;

γ' is each independently an integer of 1 to 9;

$R^d$ each independently at each occurrence represents —Z—$CR^{81}{}_{p2}R^{82}{}_{q2}R^{83}{}_{r2}$;

$Z^4$ each independently at each occurrence represents an oxygen atom or a divalent organic group;

$R^{81}$ each independently at each occurrence represents $R^{d'}$;

$R^{d'}$ is as defined for $R^d$;

in $R^d$, the number of C atoms which are linearly linked via the $Z^4$ group is up to five;

$R^{82}$ each independently at each occurrence represents —Y—$SiR^{85}{}_{n2}R^{86}{}_{3-n2}$;

Y each independently at each occurrence represents a divalent organic group;

$R^{85}$ each independently at each occurrence represents a hydroxyl group or a hydrolyzable group;

$R^{86}$ each independently at each occurrence represents a hydrogen atom or a lower alkyl group;

n2 independently represents an integer of 0 to 3 for each (—Y—$SiR^{85}{}_{n2}R^{86}{}_{3}$-n2) unit;

$R^{83}$ each independently at each occurrence represents a hydrogen atom, a hydroxyl group, or a lower alkyl group;

p2 is each independently at each occurrence an integer of 0 to 3;

q2 is each independently at each occurrence an integer of 0 to 3;

r2 is each independently at each occurrence an integer of 0 to 3;

in each (—$Z^4$—$CR^{81}{}_{p2}R^{82}{}_{q2}R^{83}{}_{r2}$), the sum of p2, q2, and r2 is 3;

$R^e$ each independently at each occurrence represents —Y—$SiR^{85}{}_{n2}R^{86}{}_{3-n2}$;

$R^f$ each independently at each occurrence represents a hydrogen atom, a hydroxyl group, or a lower alkyl group;

k2 is each independently at each occurrence an integer of 0 to 3;

l2 is each independently at each occurrence an integer of 0 to 3;

m2 is each independently at each occurrence an integer of 0 to 3; and in each $(CR^d{}_{k2}R^e{}_{l2}R^f{}_{m2})$, the sum of k2, l2, and m2 is 3, and in the formulae (C1) and (C2), there is at least one group represented by —Y—$SiR^{85}$;

Embodiment 14

The set device according to [Embodiment 13], wherein in the formulae (A1) and (A2), there are at least two $SiR^{13}$;

Embodiment 15

The set device according to [Embodiment 13] or [Embodiment 14], wherein in the formulae (B1) and (B2), there are at least two Si atoms bonded to a hydroxyl group or a hydrolyzable group;

Embodiment 16

The set device according to any one of [Embodiment 13] to [Embodiment 15], wherein in the formulae (C1) and (C2), there are two or more groups represented by —Y—$SiR^{85}$;

Embodiment 17

The set device according to any one of [Embodiment 13] to [Embodiment 16], wherein $X^F$ is a fluorine atom;

Embodiment 18

The set device according to any one of [Embodiment 13] to [Embodiment 17], wherein $R^{83}$ and $R^f$ are each independently at each occurrence a hydrogen atom or a lower alkyl group;

Embodiment 19

The set device according to any one of [Embodiment 13] to [Embodiment 18], wherein the electronic device has a first main surface and a second main surface facing the first main surface, the charging stand has a surface on which the electronic device is disposed during charging, the second main surface of the electronic device is a surface that comes into contact with the surface of the charging stand during charging of the electronic device, and the surface-treating layer is located on at least one of the first main surface and the second main surface of the electronic device and the surface of the charging stand;

Embodiment 20

The set device according to [Embodiment 19], wherein the surface-treating layer is located on at least one of the second main surface of the electronic device and the surface of the charging stand;

Embodiment 21

The set device according to [Embodiment 20], wherein the surface-treating layer is located on the second main surface of the electronic device;

Embodiment 22

A set device comprising an electronic device and a charging stand, wherein at least one of the electronic device and the charging stand comprises a surface-treating layer on a surface, a contact angle of water on the surface is 100 degrees or more, and a dynamic friction coefficient on the surface is in the range of 0.1 to 0.5; and

Embodiment 23

The set device according to [Embodiment 22], wherein the contact angle of water is 110 degrees or more and the dynamic friction coefficient is in the range of 0.15 to 0.35.

Advantageous Effects of Invention

According to the present disclosure, it is possible to suppress lubricity on the surface of an electronic device.

DESCRIPTION OF EMBODIMENTS

The electronic device of the present disclosure will be described below.

In one embodiment, in the electronic device of the present disclosure, the contact angle of water on at least a part of the surface thereof is preferably 100 degrees or more, and the dynamic friction coefficient is preferably in the range of 0.1 to 0.5.

By having such a surface, the electronic device not only has water-repellency, oil-repellency, and antifouling property (for example, preventing adhesion of fouling such as fingerprints), but can also suppress lubricity. Further, the article may have hydrolysis resistance, ultraviolet (UV) durability, chemical resistance, high friction durability, heat resistance, moisture-proof property, and the like.

The contact angle of water refers to a static contact angle of water on at least a part of the surface of the electronic device, and is a numerical value measured with 2 μL of water in an environment of 21° C. and 65% humidity. The contact angle of water is preferably 100 degrees or more, and more preferably 110 degrees or more.

The dynamic friction coefficient is a value measured in accordance with ASTM D4917. The dynamic friction coefficient is preferably 0.1 or more, more preferably 0.2 or more, and preferably 0.5 or less, more preferably 0.4 or less. The dynamic friction coefficient may be, for example, in the range of 0.1 to 0.5, or may be in the range of 0.15 to 0.35.

More preferably, in the electronic device of the present disclosure, the contact angle of water on at least a part of the surface thereof is 110 degrees or more, and the dynamic friction coefficient is in the range of 0.15 to 0.35. The contact angle of water and the dynamic friction coefficient are as defined above.

The contact angle of n-hexadecane on at least a part of the surface thereof is preferably 50 degrees or more, and more preferably 60 degrees or more. The contact angle of n-hexadecane refers to a static contact angle of n-hexadecane on at least a part of the surface of the electronic device, and is a numerical value measured with 2 μL of water in an environment of 21° C. and 65 humidity.

The ratio of the contact angle of water on the at least a part of the surface after irradiation with ultraviolet rays of 310 nm at an illumination intensity of 0.63 W/m² for 96 hours to the contact angle of water on the surface (contact angle of water on the surface before ultraviolet irradiation), i.e., value of contact angle after 96 hours of cumulative UV irradiation time/value of contact angle after 0 hours of UV irradiation time, is preferably 78% or more, more preferably 80% or more, still more preferably 83% or more, and particularly preferably 85% or more. The method of measuring the contact angle of water is as described above.

In one embodiment, the electronic device of the present disclosure has a layer (hereinafter also referred to as "surface-treating layer") formed of a fluoro(poly)ether group-containing silane compound (hereinafter referred to as "PFPE-containing silane compound"), described later, on at least a part of the surface thereof. In the PFPE-containing silane compound, the fluoro(poly)ether group has a branched structure. That is, a part of the surface of the electronic device of the present disclosure has a base material and a surface-treating layer formed of the PFPE-containing silane compound on the surface of the base material. The surface-treating layer formed of the PFPE-containing silane compound is preferably provided on the outermost layer of the electronic device.

The base material may be composed of any suitable material such as a glass, a resin (may be a natural or synthetic resin such as a common plastic material, and may be in form of a plate, a film, or others), a metal (may be a simple substance of a metal such as aluminum, copper, or iron, or a complex such as alloy or the like), a ceramic, a semiconductor (silicon, germanium, or the like), a fiber (a fabric, a non-woven fabric, or the like), a fur, a leather, a wood, a pottery, a stone, an architectural member or the like.

The glass is preferably a sapphire glass, a soda-lime glass, an alkali aluminosilicate glass, a borosilicate glass, a non-alkaline glass, a crystal glass, or a quartz glass, and particularly preferably a chemically strengthened soda-lime glass, a chemically strengthened alkali aluminosilicate glass, and a chemically bound borosilicate glass.

The resin is preferably vinyl chloride resin, acrylic resin, ABS resin (copolymer resin of acrylonitrile, butadiene, and styrene), epoxy resin, phenol resin, nylon, fluororesin, polycarbonate resin, polypropylene, polyethylene resin, polystyrene resin, or silicone rubber.

The base material may be that of which at least a surface portion thereof is made of a material originally having a hydroxyl group. Examples of the material include a glass, in addition, a metal (in particular, a base metal) having a natural oxidized layer or a thermal oxidized layer formed on the surface thereof, ceramics, and a semiconductor. When the hydroxyl groups are present but not sufficient as in the case of a resin or the like, or when the hydroxyl group is originally absent, the hydroxyl group may be introduced on the surface of the base material, or the number of the hydroxyl group may be increased by subjecting the base material to any pretreatment. Examples of the pretreatment include a plasma treatment (for example, corona discharge) or an ion beam irradiation. The plasma treatment can introduce or increase hydroxyl groups on the surface of the base material, and can also be suitably used for cleaning the surface of the base material (removing foreign matters and the like). Further, other examples of the pretreatment include a method in which a surface adsorbent having a carbon-carbon unsaturated bond group is formed on the surface of a base material in the form of a monolayer by a Langmuir-Blodgett method (LB method) or a chemical adsorption method in advance, and then the unsaturated bond is cleaved in an atmosphere containing oxygen, nitrogen, or the like.

In one embodiment, the base material may be that of which at least a surface portion thereof is made of a silicone compound having one or more other reactive groups such as Si—H groups, or a material containing an alkoxysilane.

The surface-treating layer is formed, for example, by forming a coating formed of a surface treatment composition containing a PFPE-containing silane compound having a branched structure in the fluoro(poly)ether groups thereof on the surface of the base material, and subjecting the coating to post-treatment as necessary.

The formation of the coating of the surface treatment composition may be performed by applying the surface treatment composition on the surface of the base material so as to coat the surface. The method of coating is not limited. Examples thereof include a wet coating method and a dry coating method.

Examples of the wet coating method include dip coating, spin coating, flow coating, spray coating, roll coating, gravure coating, and similar methods.

Examples of the dry coating method include deposition (usually, vacuum deposition), sputtering, CVD, and similar methods. Specific examples of the deposition method (usually, vacuum deposition) include resistance heating, electron beam, high-frequency heating using microwave, etc., ion beam, and similar methods. Specific examples of the CVD method include plasma-CVD, optical CVD, thermal CVD and similar methods.

Additionally, coating may also be performed by an atmospheric pressure plasma method.

The coating formation is preferably performed such that the surface treatment composition is present in the coating together with a catalyst for hydrolysis and dehydration condensation. Conveniently, when the wet coating method is used, after diluting the surface treatment composition with a solvent and immediately before application to the surface of the base material, a catalyst may be added to the dilute solution of the surface treatment composition. When the dry coating method is used, the surface treatment composition to which a catalyst has been added may be directly used for deposition (usually, vacuum deposition) treatment or may be used as a substance in the form of a pellet for deposition (usually, vacuum deposition), wherein the substance in the form of a pellet is obtained by impregnating a porous body made of a metal such as iron or copper with the surface treatment composition to which a catalyst has been added.

The catalyst to be used may be any suitable acid or base. The acid catalyst to be used may acetic acid, formic acid, trifluoroacetic acid, or the like. The base catalyst to be used may be ammonia, an organic amine, or the like.

Next, the coating is post-treated as necessary. This post-treatment may be, but not limited to, a treatment in which water supply and dry heating are performed sequentially or simultaneously.

After the coating of the surface treatment composition is formed on the surface of the base material as mentioned above, water is supplied to this coating (hereinafter, referred to as precursor coating). The method for supplying water is not limited, and for example, a method such as dew condensation due to a temperature difference between the precursor coating (and the base material) and the ambient atmosphere or spraying of steam may be used.

The water may be supplied under an atmosphere, for example, at a temperature of 0 to 250° C., preferably 60° C. or more, more preferably 100° C. or more, and preferably 180° C. or less, more preferably 150° C. or less. Hydrolysis can be promoted by supplying water in such a temperature range. The pressure at this time is not limited but can be conveniently atmospheric pressure.

Then, the precursor coating is heated on the surface of the base material under a dry atmosphere over 60° C. The dry heating method is not limited, and the precursor coating may be disposed together with the base material at a temperature in excess of 60° C., preferably in excess of 100° C., for example at a temperature of 250° C. or less, preferably at 180° C. or less, and in an atmosphere of an unsaturated steam pressure. The pressure at this time is not limited but can be conveniently atmospheric pressure.

The above water supply and dry heating may be continuously performed by using superheated steam.

The post-treatment may be performed as described above. It is noted that though the post-treatment may be performed in order to further increase friction durability, it is not essential for production of articles. For example, the surface treatment composition may be applied to the surface of the base material, and then left as it is.

As described above, the surface-treating layer which is a layer derived from the coating of the surface treatment composition is formed on the surface of the base material. The layer derived from the surface treatment composition thus obtained can have good UV durability, water-repellency, oil-repellency, antifouling property (for example, preventing adhesion of fouling such as fingerprints), chemical resistance, hydrolysis resistance, an effect of suppressing lubricity, high friction durability, heat resistance, moisture-proof property, and the like.

The electronic device of the present disclosure will be described below in more detail.

In one embodiment, the electronic device is an electronic device that can be driven by a battery, specifically, a device that can be driven by a rechargeable battery (or a battery pack including a battery), and preferably a device including the battery. The rechargeable battery to be used may be a battery that can be normally used.

In this embodiment, examples of the electronic device include portable information terminals such as mobile phones, smartphones, and tablet terminals; electronic dictionaries, portable music players, audio recorders and players (IC recorders), and watches.

In this embodiment, preferably, the electronic device is a wirelessly rechargeable device. Here, "wirelessly rechargeable" means that charging can be performed between the power transmission side (for example, a charging stand) and the power reception side (electronic device) without using a cable.

In this embodiment, the electronic device has a housing, and has a configuration usually used in the electronic device, such as a battery pack, a board, or the like inside the housing. The housing may usually have a configuration (for example, a display, a touch panel, a power switch, or the like) that may be provided in the electronic device.

In this embodiment, the shape of the housing is not limited, and may be a shape usually used (for example, a shape having a flat surface in part).

In this embodiment, as the material constituting the housing, for example, the material described above may be used as the base material.

The electronic device preferably has a surface-treating layer formed of a PFPE-containing silane compound described later on at least a part of the surface of the housing. The PFPE-containing silane compound has a branched structure in the fluoropolyether group.

By having the surface-treating layer, the surface of the electronic device of this embodiment can exhibit good UV durability, water-repellency, oil-repellency, antifouling property (for example, preventing adhesion of fouling such as fingerprints), chemical resistance, hydrolysis resistance, an effect of suppressing lubricity, high friction durability, heat resistance, moisture-proof property, and the like. In particular, in the electronic device of this embodiment, it is possible to prevent the surface that comes into contact with the surface-treating layer (for example, the surface of a desk, the charging surface of a charging stand, etc.) from being displaced from the surface-treating layer. That is, in the electronic device of this embodiment, it is possible to prevent the relative position between the surface that comes into contact with the surface-treating layer and the surface-treating layer from changing due to any external force (for example, gravity, vibration, etc.). For example, when the electronic device is placed on a desk, a charging stand, or the like, it is possible to prevent the electronic device from being displaced from the desk, the charging stand, or the like, so that the electronic device can be placed more stably. This eliminates the need to provide the housing with a concavo-convex shape or a rubber sheet to prevent its slippage.

In this embodiment, the surface-treating layer formed of the PFPE-containing silane compound may be provided on the entire area of the housing or may be provided on a part thereof.

In this embodiment, the surface-treating layer formed of the PFPE-containing silane compound is preferably provided on the surface that comes into contact with the charging stand when the electronic device is charged. The surface-treating layer may be provided on the entire area of the surface that comes into contact with the charging stand or may be provided on a part thereof. Since the charging surface of the charging stand is not easily displaced from the surface-treating layer formed of the PFPE-containing silane compound, the electronic device can be charged more efficiently, and the electronic device can be placed more stably.

In one embodiment, the electronic device is a communication device such as a mobile phone or a smartphone. In this embodiment, even when an external force is applied to the electronic device by vibration for notifying an incoming call or the like, since the surface-treating layer formed of the PFPE-containing silane compound is provided, the displacement in position between the surface-treating layer and a surface that comes into contact with the surface-treating layer (for example, the surface of a desk, the charging surface of a charging stand, etc.) is unlikely to occur. That is, when the electronic device is placed on a desk, a charging stand, or the like, it is possible to prevent the electronic device from being displaced therefrom, so that the electronic device can be placed more stably.

The thickness of the surface-treating layer formed of the PFPE-containing silane compound is preferably, but not limited to, in the range of 1 to 50 nm, more preferably 1 to 30 nm, and particularly preferably 1 to 15 nm. By having the surface-treating layer with such a thickness, the electronic device of this embodiment can exhibit better UV durability, water-repellency, oil-repellency, antifouling property (for example, preventing adhesion of fouling such as fingerprints), chemical resistance, hydrolysis resistance, an effect of suppressing lubricity, high friction durability, heat resistance, moisture-proof property, and the like.

In one embodiment, the housing has a first main surface (front surface) and a second main surface (rear surface) facing the first main surface.

In this embodiment, it is preferable that a display portion or an operation portion such as a display or a touch panel be provided on the first main surface. The display, touch panel, and the like may be those that can be usually used.

In this embodiment, the second main surface is a surface that comes into contact with the charging stand when the electronic device is charged. The surface-treating layer formed of the PFPE-containing silane compound described later is located on the second main surface. The surface-treating layer formed of the PFPE-containing silane compound may be formed on the entire area of the second main surface or may be formed on a part thereof.

That is, the housing has a first main surface and a second main surface facing the first main surface, and has a surface-treating layer on the second main surface. The surface-treating layer is preferably located on the outermost layer of the second main surface.

In this embodiment, examples of the electronic device include communication devices such as a mobile phone and a smartphone.

In one embodiment, the electronic device is a charging stand. The charging stand may be used to charge portable information terminals such as mobile phones, smartphones, and tablet terminals; electronic dictionaries, portable music recorders, audio recorders and players, and watches, and other electronic devices that can be driven by a battery.

The charging stand has a charging surface (a surface on which an electronic device can be charged) on a surface thereof. The charging stand may further include a configuration that a normal charging stand may have, such as a power outlet and a board. These structures are not limited, and those which can be usually used may be used.

In one embodiment, the charging stand may be a device capable of being driven by a rechargeable battery.

The shape of the charging stand is not limited.

The charging surface may be provided on the entire surface of the charging stand or may be provided only on a part thereof.

The surface shape of the charging surface is not limited, and examples thereof include a circular shape, an elliptical shape, a rectangular shape, and a polygonal shape.

The size of the charging surface is not limited as long as the electronic device can be charged. It is also possible to place and charge a plurality of electronic devices on one charging surface. Further, a plurality of charging surfaces may be provided on the surface of the charging stand.

The charging surface is preferably a smooth surface. Here, the term "smooth" refers to smoothness enough for normal use of the charging surface.

Preferably, the charging stand is installed with the charging surface as an upper surface, and the charging surface is installed in a substantially horizontal state. The substantially horizontal state includes not only a horizontal state in a strict sense but also a state in which a slight inclination is allowed, and for example, there may be an inclination of about 3 degrees, and specifically, there may be an inclination of about 1 degree.

In the above charging stand, the electronic device is preferably charged wirelessly. That is, the electronic device may be charged by being placed on the charging stand (on the charging surface). The charging method may be a method that can be usually used and is not limited, and examples thereof include an electromagnetic induction method, an electrolytic coupling method, and a magnetic field resonance method.

In one embodiment, the surface-treating layer formed of the PFPE-containing silane compound is located on the charging surface. By having the surface-treating layer, the charging surface can exhibit better UV durability, water-repellency, oil-repellency, antifouling property (for example, preventing adhesion of fouling such as fingerprints), chemical resistance, hydrolysis resistance, an effect of suppressing lubricity, high friction durability, heat resistance, and moisture-proof property. By having the surface-treating layer formed of the PFPE-containing silane compound, the charging stand can prevent the electronic device placed on the charging surface from being displaced. That is, the charging stand can place the electronic device more stably, and can more efficiently charge the device that can be driven by a battery. This eliminates the need to provide the charging surface with a concavo-convex shape or a rubber sheet for preventing slippage of an electronic device placed on the charging surface.

In this embodiment, the charging stand has a base material and a surface-treating layer formed of the PFPE-containing silane compound on the surface of the base material. In this embodiment, the base material may be any of the base materials described above, and at least one selected from the group consisting of vinyl chloride resin, acrylic resin, ABS resin, epoxy resin, phenol resin, nylon resin, fluororesin, polycarbonate resin, polypropylene resin, polyethylene resin, polystyrene resin, and silicone rubber is preferably used, and at least one selected from the group consisting of polycarbonate, polyethylene, and silicone rubber is more preferably used.

In this embodiment, the thickness of the surface-treating layer formed of the PFPE-containing silane compound is preferably, but not limited to, in the range of 1 to 50 nm, more preferably 1 to 30 nm, and particularly preferably 1 to 15 nm.

A set device of the present disclosure will be described below.

The set device of the present disclosure has an electronic device and a charging stand. At least one of the electronic device and the charging stand has a surface-treating layer formed of the PFPE-containing silane compound on at least a part of the surface. The PFPE-containing silane compound will be described later. The electronic device is a device that can be charged by a charging stand. The electronic device can be driven by a battery.

That is, the electronic device has a first main surface and a second main surface facing the first main surface, the charging stand has a surface (charging surface) for installing (or placing) the electronic device when charging the electronic device, and a surface-treating layer formed of the PFPE-containing silane compound is located on at least one of the first main surface of the electronic device, the second main surface of the electronic device, and the charging surface of the charging stand. Here, the second main surface of the electronic device is a surface that comes into contact with the charging surface of the charging stand during charging of the electronic device. Preferably, the surface-treating layer is located on at least one of the second main surface of the electronic device and the charging surface of the charging stand. The surface-treating layer formed of the PFPE-containing silane compound may be located on both the second main surface of the electronic device and the charging surface of the charging stand.

The surface-treating layer may be provided on the entire area of the first main surface and the second main surface of the electronic device, or the charging surface of the charging stand, or may be provided on a part thereof.

The surface-treating layer may be provided on the entire area of the second main surface of the electronic device, or the charging surface of the charging stand, or may be provided on a part thereof.

In one embodiment, the electronic device is the electronic device of the present disclosure having a surface-treating layer formed of the PFPE-containing silane compound on at least a part of the surface.

In the embodiment, the surface-treating layer is preferably located on at least one of the first main surface and the second main surface of the electronic device, and more preferably located on the second main surface. Here, the second main surface is a surface that comes into contact with the charging surface of the charging stand when the electronic device is charged by the charging stand.

In one embodiment, the charging stand is the charging stand of the present disclosure having a surface-treating layer formed of the PFPE-containing silane compound on at least a part of the charging surface.

In one embodiment, the electronic device is the electronic device of the present disclosure having a surface-treating layer formed of the PFPE-containing silane compound on at least a part of the surface, and the charging stand is the charging stand of the present disclosure having a surface-treating layer formed of the PFPE-containing silane compound on at least a part of the charging surface. In this embodiment, both the electronic device and the charging stand can exhibit better friction durability, UV durability, water-repellency, oil-repellency, hydrolysis resistance, an effect of suppressing lubricity, moisture-proof property, and the like. In this embodiment, the displacement of the electronic device that can be driven by a battery and the charging stand is particularly unlikely to occur.

In one embodiment, the set device of the present disclosure has an electronic device and a charging stand, and at least one of the electronic device that can be driven by a battery and the charging stand comprises a surface-treating layer on a surface, and the contact angle of water on the surface is 100 degrees or more and the dynamic friction coefficient on the surface is in the range of 0.1 to 0.5. The methods of measuring the contact angle of water and the dynamic friction coefficient are as defined above.

In this embodiment, the contact angle of water is preferably 100 degrees or more, and more preferably 110 degrees or more.

In this embodiment, the dynamic friction coefficient may be, for example, in the range of 0.1 to 0.5, or in the range of 0.15 to 0.35.

In this embodiment, more preferably, the contact angle of water is 110 degrees or more and the dynamic friction coefficient is in the range of 0.15 to 0.35.

In this embodiment, the ratio of the contact angle of water on the surface after irradiation with ultraviolet rays of 310 nm at an illumination intensity of 0.63 $W/m^2$ for 96 hours to the contact angle of water on the surface, i.e., value of contact angle after 96 hours of cumulative UV irradiation time/value of contact angle after 0 hours of UV irradiation time, is preferably 78% or more, more preferably 80% or more, still more preferably 83% or more, and particularly preferably 85% or more. The method of measuring the contact angle of water is as described above.

In this embodiment, the contact angle of the n-hexadecane on the surface is preferably 50 degrees or more, and more preferably 60 degrees or more. The method of measuring the contact angle of n-hexadecane may be performed in the same manner as described above.

(PFPE-Containing Silane Compound)

The PFPE-containing silane compound will be described below. The PFPE-containing silane compound has a branched structure in the fluoropolyether part. The surface-treating layer is formed of the PTFE-containing silane compound.

The "2 to 10 valent organic group" as used herein refers to a 2 to 10 valent group containing a carbon atom. Examples of the 2 to 10 valent organic group include, but are not limited to, a 2 to 10 valent group obtained by removing 1 to 9 hydrogen atoms from a hydrocarbon group. Examples of the divalent organic group include, but are not limited to, a divalent group obtained by removing one hydrogen atom from a hydrocarbon group.

The "hydrocarbon group" as used herein refers to a group containing a carbon atom and a hydrogen atom which is obtained by removing a hydrogen atom from the molecule. Examples of the hydrocarbon group include, but are not limited to, a hydrocarbon group having 1 to 20 carbon atoms which is optionally substituted by one or more substituents, for example, an aliphatic hydrocarbon group and an aromatic hydrocarbon group. The "aliphatic hydrocarbon group" may be linear, branched or cyclic, and may be saturated or unsaturated. The hydrocarbon group may contain one or more ring structures. It is noted that the hydrocarbon group may have one or more N, O, S, Si, amide, sulfonyl, siloxane, carbonyl, carbonyloxy, or the like at the end or in the molecular chain thereof.

As used herein, examples of the substituent of the "hydrocarbon group" include, but are not limited to, a halogen atom; and one or more groups selected from a $C_{1-6}$ alkyl group, a $C_{2-6}$ alkenyl group, a $C_{2-6}$ alkynyl group, a $C_{3-10}$ cycloalkyl group, a $C_{3-10}$ unsaturated cycloalkyl group, a 5 to 10 membered heterocyclyl group, a 5 to 10 membered unsaturated heterocyclyl group, a $C_{6-10}$ aryl group, and a 5 to 10 membered heteroaryl group, which are optionally substituted by one or more halogen atoms.

The alkyl group and the phenyl group herein are optionally unsubstituted or substituted unless otherwise specified. Examples of the substituent for such groups include, but are not limited to, one or more groups selected from a halogen atom, a $C_{1-6}$ alkyl group, a $C_{2-6}$ alkenyl group, and a $C_{2-6}$ alkynyl group.

The alkylene group herein refers to a group having a $-(C_\delta H_{2\delta})-$ structure, and is optionally substituted or unsubstituted, and may be linear or branched unless otherwise specified.

Hereinafter, the PFPE-containing silane compound having a branched structure in the fluoropolyether portion will be described.

Formulae (A1) and (A2):

$$\text{(A1)}$$

$$\underset{\substack{| \\ X^2-SiR^{13}{}_nR^{14}{}_{3-n}}}{(Rf\!\!-\!\!PFPE)_{\alpha'}\!\!-\!\!X^1\!\!-\!\!((CH_2C)_t\overset{\overset{\textstyle R^{12}}{|}}{}\!\!-\!\!R^{11})_\alpha}$$

$$\text{(A2)}$$

$$\underset{\substack{R^{14}{}_{3-n}R^{13}{}_nSi\!-\!X^2 \qquad\qquad\qquad X^2\!-\!SiR^{13}{}_nR^{14}{}_{3-n}}}{(R^{11}\!\!-\!\!(CCH_2)_t)_\alpha\!\!-\!\!X^1\!\!-\!\!PFPE\!\!-\!\!X^1\!\!-\!\!((CH_2C)_t\!\!-\!\!R^{11})_\alpha}$$

In the formula, Rf independently at each occurrence represents an alkyl group having 1 to 16 carbon atoms which is optionally substituted by one or more fluorine atoms.

The "alkyl group having 1 to 16 carbon atoms" in the alkyl group having 1 to 16 carbon atoms which is optionally substituted by one or more fluorine atoms may be linear or branched, and preferably is a linear or branched alkyl group having 1 to 6 carbon atoms, in particular 1 to 3 carbon atoms, and more preferably a linear alkyl group having 1 to 3 carbon atoms.

Rf is preferably an alkyl group having 1 to 16 carbon atoms substituted by one or more fluorine atoms, more preferably a $CF_2H-C_{1-15}$ fluoroalkylene group or a $C_{1-16}$ perfluoroalkyl group, and still more preferably a $C_{1-16}$ perfluoroalkyl group.

The perfluoroalkyl group having 1 to 16 carbon atoms may be linear or branched, and preferably is a linear or branched perfluoroalkyl group having 1 to 6 carbon atoms, in particular 1 to 3 carbon atoms, and more preferably a linear perfluoroalkyl group having 1 to 3 carbon atoms, specifically $-CF_3$, $-CF_2CF_3$, or $-CF_2CF_2CF_3$.

In the formula, PFPE is each independently at each occurrence a group represented by the formula:

$$-(OC_6F_{12})_a-(OC_5F_{10})_b-(OC_4F_8)_c-(OC_3X^F{}_6)_d-$$
$$(OC_2F_4)_e-(OCF_2)_f-,$$

and having at least one branched structure, or a group represented by the formula:

$$-(R^{16}-R^{17})_{j1}-.$$

Each symbol will be described later.

In one embodiment, in the formula, PFPE is independently at each occurrence a group represented by:

$$-(OC_6F_{12})_a-(OC_5F_{10})_b-(OC_4F_8)_c-(OC_3X^F{}_6)_d-$$
$$(OC_2F_4)_e-(OCF_2)_f-$$

and having at least one branched structure in PFPE. That is, the PFPE has at least one $CF_3$ end (specifically, $-CF_3$, $-C_2F_5$, etc., more specifically $-CF_3$). In the formula (A1), in the PFPE, the oxygen atom at the left end of the formula is bonded to the Rf group, and the carbon atom at the right end of the formula is bonded to the $X^1$ group. By having the PFPE having such a structure, the layer (for example, surface-treating layer) formed by using a PFPE-containing silane compound (or a surface-treating agent containing a PFPE-containing silane compound) can be further improved in UV durability, water-repellency, oil-repellency, antifouling property (for example, preventing adhesion of fouling such as fingerprints), chemical resistance, hydrolysis resistance, an effect of suppressing lubricity, high friction durability, heat resistance, moisture-proof property, and the like. This embodiment is particularly useful from the viewpoint of the effect of suppressing lubricity and high friction durability.

$X^F$ is each independently at each occurrence a hydrogen atom, a fluorine atom, or a chlorine atom, preferably a hydrogen atom or a fluorine atom, and more preferably a fluorine atom.

In the formula, a, b, c, d, e, and f are each independently an integer of 0 or more and 200 or less, and the sum of a, b, c, d, e, and f is at least 1. Preferably, a, b, c, d, e, and f are each independently an integer of 0 or more and 100 or less. Preferably, the sum of a, b, c, d, e, and f is 5 or more, and more preferably 10 or more. Preferably, the sum of a, b, c, d, e, and f is 200 or less, more preferably 100 or less, for example, 10 or more and 200 or less, and more specifically 10 or more and 100 or less. The occurrence order of the respective repeating units in parentheses with a, b, c, d, e, or f is arbitrary in the formula.

The PFPE structure preferably has at least 5 branched structures, more preferably 10 branched structures, and particularly preferably 20 branched structures.

In the PFPE structure, the number of repeating units having a branched structure is preferably 40 or more, more preferably 60 or more, and particularly preferably 80 or more, with respect to the total number of repeating units (for example, the sum of a, b, c, d, e, and f) of 100. In the PFPE structure, the number of repeating units having a branched structure may be 100 or less, for example, 90 or less, with respect to the total number of repeating units of 100.

In the PFPE structure, the number of repeating units having a branched structure is preferably in the range of 40 to 100, more preferably in the range of 60 to 100, and particularly preferably in the range of 80 to 100, with respect to the total number of repeating units of 100.

Examples of the branched chain in the branched structure include $CF_3$.

As the repeating unit having a branched structure, examples of $—(OC_6F_{12})—$ include $—(OCF(CF_3)CF_2CF_2CF_2CF_2)—$, $—(OCF_2CF(CF_3)CF_2CF_2CF_2)—$, $—(OCF_2CF_2CF(CF_3)CF_2CF_2)—$, $—(OCF_2CF_2CF_2CF(CF_3)CF_2)—$, and $—(OCF_2CF_2CF_2CF_2CF(CF_3))—$. Examples of $—(OC_5F_{10})—$ include $—(OCF(CF_3)CF_2CF_2CF_2)—$, $—(OCF_2CF(CF_3)CF_2CF_2)—$, $—(OCF_2CF_2CF(CF_3)CF_2)—$, and $—(OCF_2CF_2CF_2CF(CF_3))—$. Examples of $—(OC_4F_8)—$ include $—(OCF(CF_3)CF_2CF_2)—$, $—(OCF_2CF(CF_3)CF_2)—$, $—(OCF_2CF_2CF(CF_3)—$, $—(OC(CF_3)_2CF_2)—$, $—(OCF_2C(CF_3)_2)—$, $—(OCF(CF_3)CF(CF_3))—$, $—(OCF(C_2F_5)CF_2)—$, and $—(OCF_2CF(C_2F_5))—$. Examples of $—(OC_3F_6)—$ (i.e., in the formula, $X^F$ is a fluorine atom) include $—(OCF(CF_3)CF_2)—$ and $—(OCF_2CF(CF_3))—$. Examples of $—(OC_2F_4)—$ include $—(OCF(CF_3))—$.

The PFPE may include a linear repeating unit as well as the repeating units having a branched structure. Examples of the linear repeating unit include $—(OCF_2CF_2CF_2CF_2CF_2CF_2)—$, $—(OCF_2CF_2CF_2CF_2CF_2)—$, $—(OCF_2CF_2CF_2CF_2)—$, $—(OCF_2CF_2CF_2)—$, and $—(OCF_2CF_2)—$.

Preferably, in the PFPE, the repeating units $—(OC_6F_{12})—$, $—(OC_5F_{10})—$, $—(OC_4F_8)—$, and $—(OC_3F_6)—$ have a branched structure.

More preferably, the PFPE consists of repeating units $OC_6F_{12}$, $OC_5F_{10}$, $OC_4F_8$, and $OC_3F_6$ having a branched structure.

In one embodiment, the PFPE is $—(OC_3F_6)_d—$ (wherein d is an integer of 1 or more and 200 or less, preferably 5 or more and 200 or less, more preferably 10 or more and 200 or less), and has at least one branched structure in PFPE.

In this embodiment, the PFPE may further contain a linear repeating unit $—(OCF_2CF_2CF_2)—$.

In the embodiment, the PFPE preferably consists of repeating units $OC_3F_6$ having a branched structure. The PFPE is more preferably represented by the formula: $—(OCF_2CF(CF_3))_d—$. In the formula, d is an integer of 1 or more and 200 or less, preferably 5 or more and 200 or less, and more preferably 10 or more and 200 or less.

In another embodiment, PFPE is $—(OC_4F_8)_c—(OC_3F_6)_d—(OC_2F_4)_e—(OCF_2)_f—$ (wherein c and d are each independently an integer of 0 or more and 30 or less, e and f are each independently an integer of 1 or more and 200 or less, preferably 5 or more and 200 or less, more preferably 10 or more and 200 or less, the sum of c, d, e, and f is at least 5 or more, preferably 10 or more, and the occurrence order of the respective repeating units in parentheses with the subscript c, d, e, or f is arbitrary in the formula) and has at least one branched structure in PFPE.

In yet another embodiment, PFPE is a group represented by $—(R^6—R^7)_j—$ and has at least one branched structure in PFPE. In the formula, $R^6$ is $OCF_2$ or $OC_2F_4$, and preferably $OC_2F_4$. In the formula, $R^7$ is a group selected from $OC_2F_4$, $OC_3F_6$, $OC_4F_8$, $OC_5F_{10}$, and $OC_6F_{12}$, or is a combination of two or three groups independently selected from these groups. Preferably, $R^7$ is a group selected from $OC_2F_4$, $OC_3F_6$, and $OC_4F_8$, or is a group selected from $OC_3F_6$, $OC_4F_8$, $OC_5F_{10}$, and $OC_6F_{12}$, or is a combination of two or three groups independently selected from these groups, and more preferably a group selected from $OC_3F_6$ and $OC_4F_8$. Examples of the combination of two or three groups independently selected from $OC_2F_4$, $OC_3F_6$, and $OC_4F_8$ include, but are not limited to, $—OC_2F_4OC_3F_6—$, $—OC_2F_4OC_4F_8—$, $—OC_3F_6OC_2F_4—$, $—OC_3F_6OC_3F_6—$, $—OC_3F_6OC_4F_8—$, $—OC_4F_8OC_4F_8—$, $—OC_4F_8OC_3F_6—$, $—OC_4F_8OC_2F_4—$, $—OC_2F_4OC_2F_4OC_3F_6—$, $—OC_2F_4OC_2F_4OC_4F_8—$, $—OC_2F_4OC_3F_6OC_2F_4—$, $—OC_2F_4OC_3F_6OC_3F_6—$, $—OC_2F_4OC_4F_8OC_2F_4—$, $—OC_3F_6OC_2F_4OC_2F_4—$, $—OC_3F_6OC_2F_4OC_3F_6—$, $—OC_3F_6OC_3F_6OC_2F_4—$, and $—OC_4F_8OC_2F_4OC_2F_4—$. j is an integer of 2 or more, preferably 3 or more, and more preferably 5 or more, and is an integer of 100 or less, and preferably 50 or less. In the formula, $OC_2F_4$, $OC_3F_6$, $OC_4F_8$, $OC_5F_{10}$, and $OC_6F_{12}$ preferably have a branched structure.

More preferably, in the embodiment, PFPE consists of repeating units $OC_6F_{12}$, $OC_5F_{10}$, $OC_4F_8$, and $OC_3F_6$ having a branched structure.

In one embodiment, PFPE is a group represented by $—(R^{16}—R^{17})_{j1}—$. In the formula, $R^{16}$ is $OCF_2$ or $OC_2F_4$, and preferably $OC_2F_4$. In the formula, $R^{17}$ is a group selected from $OC_2F_4$, $OC_3X^F_6$, $OC_4F_8$, $OC_5F_{10}$, and $OC_6F_{12}$, or is a combination of two or three groups independently selected from these groups. $X^F$ is as defined above and is preferably a fluorine atom. Preferably, $R^{17}$ is a group selected from $OC_2F_4$, $OC_3F_6$, and $OC_4F_8$, or is a group selected from $OC_3F_6$, $OC_4F_8$, $OC_5F_{10}$, and $OC_6F_{12}$, or is a combination of two or three groups independently selected from these groups. Examples of the combination of two or three groups independently selected from $OC_2F_4$, $OC_3F_6$, and $OC_4F_8$ include, but are not limited to, $—OC_2F_4OC_3F_6—$, $—OC_2F_4OC_4F_8—$, $—OC_3F_6OC_2F_4—$, $—OC_3F_6OC_3F_6—$, $—OC_3F_6OC_4F_8—$, $—OC_4F_8OC_4F_8—$, $—OC_4F_8OC_3F_6—$, $—OC_4F_8OC_2F_4—$, $—OC_2F_4OC_2F_4OC_3F_6—$, $—OC_2F_4OC_2F_4OC_4F_8—$, $—OC_2F_4OC_3F_6OC_2F_4—$, $—OC_2F_4OC_3F_6OC_3F_6—$, $—OC_2F_4OC_4F_8OC_2F_4—$, $—OC_3F_6OC_2F_4OC_2F_4—$, $—OC_3F_6OC_2F_4OC_3F_6—$, $—OC_3F_6OC_3F_6OC_2F_4—$, and $—OC_4F_8OC_2F_4OC_2F_4—$. j1 is preferably an integer of 2 to 100; more preferably 3 or more, and still more preferably 5 or more; and more preferably an integer of 50 or less. In the formula, $OC_2F_4$, $OC_3F_6$, $OC_4F_8$, $OC_5F_{10}$, and $OC_6F_{12}$ may be linear or branched, and is preferably linear. In this embodiment, PFPE is preferably $—(OC_2F_4—OC_3F_6)_{j1}—$ or $—(OC_2F_4—OC_4F_8)_{j1}—$. By having such a PFPE structure, the layer (for example, surface-treating layer) formed by using a PFPE-containing silane compound (or a surface-treating agent containing a PFPE-containing silane compound) can be further improved in UV durability, heat resistance, hydrolysis resistance, water-repellency, oil-repellency, friction durability, slip suppression effect, and moisture-proof property.

In the formula, $R^{13}$ each independently at each occurrence represents a hydroxyl group or a hydrolyzable group.

As used herein, the "hydrolyzable group" refers to a group capable of undergoing a hydrolysis reaction, that is, a group capable of being removed from the main backbone of compound by a hydrolysis reaction. Examples of the hydrolyzable group include $—OR$, $—OCOR$, $—O—N—CR_2$, $—NR_2$, $—NHR$, halogen (wherein R is a substituted or non-substituted alkyl group having 1 to 4 carbon atoms), preferably $—OR$ (i.e., an alkoxy group). Examples of R include a non-substituted alkyl group such as a methyl group, an ethyl group, a propyl group, an isopropyl group, an n-butyl group, and an isobutyl group; and a substituted alkyl group such as a chloromethyl group. Among them, an alkyl group, in particular a non-substituted alkyl group is preferred, a methyl group or an ethyl group is more preferred. The hydroxyl group may be, but is not limited to, a group generated by hydrolysis of a hydrolyzable group.

In the formula, $R^{14}$ each independently at each occurrence represents a hydrogen atom or an alkyl group having 1 to 22 carbon atoms, and preferably an alkyl group having 1 to 4 carbon atoms.

In the formula, $R^{11}$ each independently at each occurrence represents a hydrogen atom or a halogen atom. The halogen atom is preferably an iodine atom, a chlorine atom or a fluorine atom, more preferably a fluorine atom.

In the formula, $R^{12}$ each independently at each occurrence represents a hydrogen atom or a lower alkyl group. The lower alkyl group is preferably an alkyl group having 1 to 20 carbon atoms, and more preferably an alkyl group having 1 to 6 carbon atoms, and examples thereof include a methyl group, an ethyl group, and a propyl group.

In the formula, n is independently an integer of 0 to 3, preferably 1 to 3, and more preferably 3 for each $(-SiR^{13}{}_nR^{14}{}_{3-n})$ unit. In the formula (A1) or (A2), at least one n is 1 or more. In other words, there is at least one $SiR^{13}$ in the formulae (A1) and (A2). By having such a configuration, the PFPE-containing silane compound can form a surface-treating layer having good UV durability, water-repellency, oil-repellency, antifouling property (for example, preventing adhesion of fouling such as fingerprints), heat resistance, high friction durability, hydrolysis resistance, chemical resistance, moisture-proof property, and the like.

In a preferred embodiment, at least two n are 1 or more in the formula (A1) or (A2). In other words, there are at least two $SiR^{13}$ in the formulae (A1) and (A2). By having such a configuration, the PFPE-containing silane compound can form a surface-treating layer having better UV durability, water-repellency, oil-repellency, antifouling property (for example, preventing adhesion of fouling such as fingerprints), heat resistance, high friction durability, hydrolysis resistance, chemical resistance, moisture-proof property, and the like, in particular, good UV durability, high friction durability, chemical resistance, and the like.

Preferably, in the formulae (A1) and (A2), n is 2 or 3, and more preferably n is 3. In other words, in the formulae (A1) and (A2), the Si atom is preferably present as $-SiR^{13}{}_2R^{14}$ or $-SiR^{13}{}_3$ and more preferably present as $-SiR^{13}{}_3$.

In the formula, $X^1$ each independently at each occurrence represents a single bond or a 2 to 10 valent organic group. $X^1$ is recognized to be a linker which connects between a fluoropolyether moiety (i.e., an Rf-PFPE moiety or -PFPE- moiety) providing mainly water-repellency, surface lubricity and the like and a silane moiety (i.e., a group in parentheses with a) providing an ability to bind to a base material in the compound represented by the formulae (A1) and (A2). Therefore, $X^1$ may be a single bond or any organic group as long as the compound represented by the formulae (A1) and (A2) can stably exist. In the present specification, in the group described as $X^1$, the left side of the group is bonded to the group represented by PFPE, and the right side thereof is bonded to the group in parentheses with a.

In the formula, $\alpha$ is an integer of 1 to 9, and $\alpha'$ is an integer of 1 to 9. These $\alpha$ and $\alpha'$ may vary depending on the valence number of $X^1$. In the formula (A1), the sum of $\alpha$ and $\alpha'$ is the same as the valence number of $X^1$. For example, when $X^1$ is a 10 valent organic group, the sum of $\alpha$ and $\alpha'$ is 10, for example, $\alpha$ and $\alpha'$ may be 9 and 1, $\alpha$ and $\alpha'$ may be 5 and 5, or $\alpha$ and $\alpha'$ may be 1 and 9. When $X^1$ is a divalent organic group, $\alpha$ and $\alpha'$ are 1. In the formula (A2), $\alpha$ is a value obtained by subtracting 1 from the valence number of $X^1$.

In one embodiment, $X^1$ is each independently at each occurrence a 2 to 10 valent organic group containing $-CON(R^{34})-$, $C_{1-6}$ alkylene group, or $OR^{35}$.

$R^{34}$ is each independently at each occurrence a hydrogen atom, a phenyl group, or a $C_{1-6}$ alkyl group, preferably a hydrogen atom or a $C_{1-6}$ alkyl group, more preferably a hydrogen atom or a methyl group, and still more preferably a hydrogen atom.

$R^{35}$ is a $C_{1-6}$ alkylene group, and preferably a $C_{1-3}$ alkylene group.

In one embodiment, $X^1$ may be, for example, a divalent group represented by the following formula:

$$-(R^{31})_p-(X^a)_{q'}-$$

wherein:

$R^{31}$ represents a single bond, $-(CH_2)_{s'}-$ which is optionally substituted by one or more fluorine atoms, or an o-, m-, or p-phenylene group, and preferably $-(CH_2)_{s'}-$which is optionally substituted by one or more fluorine atoms, s' is an integer of 1 to 20, preferably an integer of 1 to 6, more preferably an integer of 1 to 3, and still more preferably 1 or 2, $X^a$ represents $-(X^b)_{1'}-$, $X^b$ each independently at each occurrence represents a group selected from the group consisting of $-O-$, $-(OR^{35})_{n4}-$, $-S-$, an o-, m-, or p-phenylene group, $-C(O)O-$, $-Si(R^{33})_2-$, $-(Si(R^{33})_2O)_{m'}-$ $Si(R^{33})_2-$, $-CON(R^{34})-$, $-O-CON(R^{34})-$, $-N(R^{34})-$, and $-(CH_2)_{n'}-$, $R^{33}$ each independently at each occurrence represents a phenyl group, a $C_{1-6}$ alkyl group, or a $C_{1-6}$ alkoxy group, preferably a phenyl group or a $C_{1-6}$ alkyl group, and more preferably a methyl group, $R^{34}$ each independently at each occurrence represents a hydrogen atom, a phenyl group, or a $C_{1-6}$ alkyl group, preferably a hydrogen atom or a $C_{1-6}$ alkyl group, more preferably a hydrogen atom or a methyl group, and still more preferably a hydrogen atom, $R^{35}$ is each independently at each occurrence a $C_{1-6}$ alkylene group, and preferably a $C_{1-3}$ alkylene group, n4 is each independently at each occurrence an integer of 1 to 5, preferably an integer of 1 to 3, and more preferably 1, m' is each independently at each occurrence an integer of 1 to 100, and preferably an integer of 1 to 20, n' is each independently at each occurrence an integer of 1 to 20, preferably an integer of 1 to 6, and more preferably an integer of 1 to 3, l' is an integer of 1 to 10, preferably an integer of 1 to 5, and more preferably an integer of 1 to 3, p' is 0 or 1, q' is 0 or 1, and at least one of p' and q' is 1, and the occurrence order of the respective repeating units in parentheses with p' or q' is arbitrary in the formula.

Here, $R^{31}$ and $X^a$ (typically, a hydrogen atom in $R^{31}$ and $X^a$) are optionally substituted by one or more substituents selected from a fluorine atom, a $C_{1-3}$ alkyl group, and a $C_{1-3}$ fluoroalkyl group.

In one embodiment, l' is 1.

Preferably, $X^1$ is $-(R^{31})_p-(X^a)_{q'}-R^{32}-$. $R^{32}$ represents a single bond, $-(CH_2)_{t'}-$ or an o-, m-, or p-phenylene group, and preferably $-(CH_2)_{t'}-$. t' is an integer of 1 to 20, preferably an integer of 2 to 6, and more preferably an integer of 2 to 3. Here, $R^{32}$ (typically, a hydrogen atom in $R^{32}$) is optionally substituted by one or more substituents selected from a fluorine atom, a $C_{1-3}$ alkyl group, and a $C_{1-3}$ fluoroalkyl group.

Examples of $X^1$ include, but are not limited to, the following structure:

$$-X^{10}-CON(R^{34})-X^{11}-,$$

$$-X^{10}-(OR^{35})_{n4}-X^{11}-, \text{ and}$$

a $C_{1-6}$ alkylene group (preferably propylene group).

When $X^1$ has the above structure, hydrolysis resistance, friction durability, chemical resistance, moisture-proof property, and the like of the layer formed of the PFPE-containing silane compound is further improved.

$X^{10}$ is each independently at each occurrence a single bond or a divalent organic group, preferably a single bond, $-O-R^{36}-O-$, $-R^{36}-$, or an o-, m-, or p-phenylene group, and more preferably a single bond, $-O-R^{36}-O-$, or $-R^{36}-$.

$R^{36}$ is a $C_{1-20}$ alkylene group which is optionally substituted by one or more fluorine atoms, preferably a $C_{1-3}$ alkylene group which is optionally substituted by one or more fluorine atoms, and still more preferably a $C_{1-2}$ alkylene group which is optionally substituted by one or more fluorine atoms. The alkylene group may be linear or may have a branched structure.

In one embodiment, the alkylene group which is optionally substituted by one or more fluorine atoms in $X^{10}$ is, for example, a $C_{1-3}$ perfluoroalkylene group, a $C_{1-3}$ fluoroalkylene group substituted by one or more fluorine atoms, or a $C_{1-3}$ alkylene group having no substituent, and more specifically a $C_{1-2}$ perfluoroalkylene group, and a $C_{1-2}$ fluoroalkylene group substituted by one or more fluorine atoms, or a $C_{1-2}$ alkylene group having no substituent.

$X^{11}$ is each independently at each occurrence a single bond, an oxygen atom, or a divalent organic group, and preferably a single bond, an oxygen atom, or a $C_{1-20}$ alkylene group which is optionally substituted by one or more fluorine atoms.

In one embodiment, $X^{11}$ is preferably a single bond or a $C_{1-20}$ alkylene group which is optionally substituted by one or more fluorine atoms, more preferably a single bond or a $C_{1-6}$ alkylene group having no substituent, still more preferably a single bond or a $C_{1-3}$ alkylene group having no substituent, and particularly preferably a $C_{1-3}$ alkylene group having no substituent.

The alkylene group which is optionally substituted by one or more fluorine atoms in $X^{11}$ is preferably a $C_{1-6}$ alkylene group which is optionally substituted by one or more fluorine atoms, and more preferably a $C_{1-3}$ alkylene group which is optionally substituted by one or more fluorine atoms. The alkylene group may be linear or may have a branched structure.

More preferably, the alkylene group which is optionally substituted by one or more fluorine atoms in $X^{11}$ is preferably a $C_{1-6}$ alkylene group having no substituent, and more preferably a $C_{1-3}$ alkylene group having no substituent.

$R^{34}$ each independently at each occurrence represents a hydrogen atom, a phenyl group, or a $C_{1-6}$ alkyl group, preferably a hydrogen atom or a $C_{1-6}$ alkyl group, more preferably a hydrogen atom or a methyl group, and still more preferably a hydrogen atom.

$R^{35}$ is each independently at each occurrence a $C_{1-6}$ alkylene group, and preferably a $C_{1-3}$ alkylene group.

n4 is each independently at each occurrence an integer of 1 to 5, preferably an integer of 1 to 3, and more preferably 1.

In one embodiment, $X^1$ is $$-X^{10}-CON(R^{34})-X^{11}-, \text{ or}$$

a $C_{1-6}$ alkylene group (preferably propylene group).

In the formula:

$R^{34}$ is as defined above, and preferably a hydrogen atom or a $C_{1-6}$ alkyl group, more preferably a hydrogen atom or a methyl group, and still more preferably a hydrogen atom;

$X^{10}$ is as defined above, and preferably a single bond, $-R^{36}-$, or an o-, m-, or p-phenylene group, more preferably a single bond or $-R^{36}-$, and still more preferably a single bond;

$R^{36}$ is as defined above, and preferably a $C_{1-20}$ alkylene group which is optionally substituted by one or more fluorine atoms, more preferably a $C_{1-3}$ alkylene group which is optionally substituted by one or more fluorine atoms, and still more preferably a $C_{1-2}$ alkylene group which is optionally substituted by one or more fluorine atoms; and $X^{11}$ is as defined above, and preferably a single bond or a $C_{1-20}$ alkylene group which is optionally substituted by one or more fluorine atoms, more preferably a single bond or a $C_{1-6}$ alkylene group having no substituent, still more preferably a single bond or a $C_{1-3}$ alkylene group having no substituent, and particularly preferably a $C_{1-3}$ alkylene group having no substituent.

In the embodiment, $X^1$ is particularly preferably $-X^{10}-CON(R^{34})-X^{11}-$. In the formula, $R^{34}$, $X^{10}$, and $X^{11}$ are as defined above.

In the embodiment, $X^{10}$ is particularly preferably a single bond and $X^{11}$ is particularly preferably a $C_{1-3}$ alkylene group, and $X^{11}$ is still more preferably a $C_{1-3}$ alkylene group having no substituent.

In one embodiment, $X^{10}$ is a single bond and $X^{11}$ is a $C_{1-3}$ alkylene group, and preferably, $X^{11}$ is a $C_{1-3}$ alkylene group having no substituent.

Specific examples of $X^1$ include:

$-CH_2OCH_2-$,
$-CH_2O(CH_2)_2-$,
$-CH_2O(CH_2)_3-$,
$-CH_2O(CH_2)_6-$,
$-CF_2-CH_2OCH_2-$,
$-CF_2-CH_2O(CH_2)_2-$,
$-CF_2-CH_2O(CH_2)_3-$,
$-CF_2-CH_2O(CH_2)_6-$,
$-O-CFHCF_2-O-CH_2OCH_2-$.
$-O-CFHCF_2-O-CH_2O(CH_2)_2-$,
$-O-CFHCF_2-O-CH_2O(CH_2)_3-$,
$-O-CFHCF_2-O-CH_2O(CH_2)_6-$,
$-CH_2OCF_2CHFOCF_2-$,
$-CH_2OCF_2CHFOCF_2CF_2-$,
$-CH_2OCF_2CHFOCF_2CF_2CF_2-$,
$-CH_2OCH_2CF_2CF_2OCF_2-$,
$-CH_2OCH_2CF_2CF_2OCF_2CF_2-$,
$-CH_2OCH_2CF_2CF_2OCF_2CF_2CF_2-$,
$-CH_2OCH_2CF_2CF_2OCF(CF_3)CF_2OCF_2-$,
$-CH_2OCH_2CF_2CF_2CF(CF_3)CF_2OCF_2CF_2-$,
$-CH_2OCH_2CF_2CF_2CF(CF_3)CF_2OCF_2CF_2CF_2-$,
$-CH_2OCH_2CHFCF_2OCF_2-$,
$-CH_2OCH_2CHFCF_2OCF_2CF_2-$,
$-CH_2OCH_2CHFCF_2OCF_2CF_2CF_2-$,
$-CH_2OCH_2CHFCF_2CF(CF_3)CF_2OCF_2-$,
$-CH_2OCH_2CHFCF_2OCF(CF_3)CF_2OCF_2CF_2-$,
$-CH_2OCH_2CHFCF_2CF(CF_3)CF_2OCF_2CF_2CF_2-$,
$-CH_2OCF_2CHFOCF_2CF_2CF_2-C(O) NH-CH_2-$,
$-CH_2-$,

—(CH$_2$)$_2$—,
—(CH$_2$)$_3$—,
—(CH$_2$)$_4$—,
—(CH$_2$)$_5$—,
—(CH$_2$)$_6$—,
—CF$_2$—,
—(CF$_2$)$_2$—,
—CF$_2$—CH$_2$—,
—CF$_2$—(CH$_2$)$_2$—,
—CF$_2$—(CH$_2$)$_3$—,
—CF$_2$—(CH$_2$)$_4$—,
—CF$_2$—(CH$_2$)$_5$—,
—CF$_2$—(CH$_2$)$_6$—,
—CONH—,
—CONH—CH$_2$—,
—CONH— (CH$_2$)$_2$—,
—CONH— (CH$_2$)$_3$—,
—CONH— (CH$_2$)$_6$—,
—CF$_2$—CONH—,
—CF$_2$—CONH—CH$_2$—,
—CF$_2$—CONH— (CH$_2$)$_2$—,
—CF$_2$—CONH— (CH$_2$)$_3$—,
—CF$_2$—CONH— (CH$_2$)$_6$—,
—O—CFHCF$_2$—O—CONH—,
—O—CFHCF$_2$—O—CONH—CH$_2$—,
—O—CFHCF$_2$—O—CONH— (CH$_2$)$_2$—,
—O—CFHCF$_2$—O—CONH— (CH$_2$)$_3$—,
—O—CFHCF$_2$—O—CONH— (CH$_2$)$_6$—,
—CON(CH$_3$)—,
—CON(CH$_3$)—CH$_2$—,
—CON(CH$_3$)—(CH$_2$)$_2$—,
—CON(CH$_3$)—(CH$_2$)$_3$—,
—CON(CH$_3$)—(CH$_2$)$_6$,
—CON(CH$_3$)—C$_6$H$_4$—,
—CON(Ph)-(CH$_2$)$_3$— (wherein Ph is phenyl),
—CON(Ph)-(CH$_2$)$_6$— (wherein Ph is phenyl),
—CF$_2$—CON(CH$_3$)—,
—CF$_2$—CON(CH$_3$)—CH$_2$—,
—CF$_2$—CON(CH$_3$)—(CH$_2$)$_2$—,
—CF$_2$—CON(CH$_3$)—(CH$_2$)$_3$—,
—CF$_2$—CON(CH$_3$)—(CH$_2$)$_6$—,
—CF$_2$—CON(CH$_3$)—C$_6$H$_4$—,
—CF$_2$—CON(Ph)-(CH$_2$)$_3$— (wherein Ph is phenyl),
—CF$_2$—CON(Ph)-(CH$_2$)$_6$— (wherein Ph is phenyl),
—CH$_2$—CON(CH$_3$)—CH$_2$—,
—CH$_2$—CON(CH$_3$)—(CH$_2$)$_2$—,
—CH$_2$—CON(CH$_3$)—(CH$_2$)$_3$—,
—CH$_2$O—CONH— (CH$_2$)—,
—CH$_2$O—CONH— (CH$_2$)$_6$—,
—OCH$_2$—,
—O(CH$_2$)$_3$—,
—OCFHCF$_2$—,
—O—CFHCF$_2$—O—,
—O—CFHCF$_2$—O—CH$_2$—,
—O—CFHCF$_2$—O— (CH$_2$)$_2$—,
—O—CFHCF$_2$—O— (CH$_2$)$_3$—,
—O—CFHCF$_2$—O— (CH$_2$)$_6$—,
—O—CFHCF$_2$—O—C$_6$H$_4$—,
or -continued Examples of more preferred X$^1$ include:
—O—CFHCF$_2$—O—CONH—,
—O—CFHCF$_2$—O—CONH—CH$_2$—,
—O—CFHCF$_2$—O—CONH— (CH$_2$)$_2$—,
—O—CFHCF$_2$—O—CONH— (CH$_2$)$_3$—,
—O—CFHCF$_2$—O—CONH— (CH$_2$)$_6$—,
—CONH—,
—CONH— CH$_2$—,
—CONH— (CH$_2$)$_2$—,
—CONH— (CH$_2$)$_3$—,
—CONH— (CH$_2$)$_6$—,
—CF$_2$—CONH—,
—CF$_2$—CONH—CH$_2$—,
—CF$_2$—CONH— (CH$_2$)$_2$—,
—CF$_2$—CONH— (CH$_2$)$_3$—,
—CF$_2$—CONH— (CH$_2$)$_6$—,
—O—CFHCF$_2$—O—CH$_2$OCH$_2$—,
—O—CFHCF$_2$—O—CH$_2$O(CH$_2$)$_2$—,
—O—CFHCF$_2$—O—CH$_2$O(CH$_2$)$_3$—,
—O—CFHCF$_2$—O—CH$_2$O(CH$_2$)$_6$—,
—CH$_2$OCH$_2$—,
—CH$_2$O(CH$_2$)$_2$—,
—CH$_2$O(CH$_2$)$_3$—,
—CH$_2$O(CH$_2$)$_6$—,
—CF$_2$— CH$_2$OCH$_2$—,
—CF$_2$—CH$_2$O(CH$_2$)$_2$—,
—CF$_2$— CH$_2$O(CH$_2$)$_3$—,
—CF$_2$—CH$_2$O(CH$_2$)$_6$—,
—O—CFHCF$_2$—O—,
—O—CFHCF$_2$—O— (CH$_2$)$_2$—,
—O—CFHCF$_2$—O— (CH$_2$)$_3$—,
—O—CFHCF$_2$—O— (CH$_2$)$_6$—,
—CH$_2$—,
—(CH$_2$)$_2$—,
—(CH$_2$)$_3$—,
—(CH$_2$)$_6$—
—CF$_2$—,
—(CF$_2$)$_2$—,
—CF$_2$—CH$_2$—,
—CF$_2$—(CH$_2$)$_2$—,
—CF$_2$—(CH$_2$)$_3$—, and
—CF$_2$—(CH$_2$)$_6$—.

In yet another embodiment, examples of the X$^1$ group include the following groups:

-continued wherein:

$R^{41}$ is each independently a hydrogen atom, a phenyl group, an alkyl group having 1 to 6 carbon atoms, or a $C_{1-6}$ alkoxy group, and preferably a methyl group; and in each $X^1$ group, some of T are the following group which binds to PFPE of the main backbone:

—CH$_2$O(CH$_2$)$_2$,

—CH$_2$O(CH$_2$)$_3$—,

—CF$_2$O(C$_2$)$_3$—,

—CH$_2$—,

—(CH$_2$)$_2$—,

—(CH$_2$)$_3$—,

—(CH$_2$)$_4$—,

—CONH— (CH$_2$)$_3$—,

—CON(CH$_3$)—(CH$_2$)$_3$—,

—CON(Ph)-(CH$_2$)$_3$— (wherein Ph is phenyl), or wherein $R^{42}$ each independently represents a hydrogen atom, a $C_{1-6}$ alkyl group, or a $C_{1-6}$ alkoxy group, preferably a methyl group or a methoxy group, and more preferably a methyl group, some of the other T are —(CH$_2$)$_{n''}$— (wherein n″ is an integer of 2 to 6) bonded to the group opposite to PFPE which is a main backbone, and the others T are each independently a methyl group, a phenyl group, or a $C_{1-6}$ alkoxy or a radical scavenging group or a UV absorbing group, if present.

The radical scavenging group is not limited as long as it can trap a radical generated by light irradiation, and examples thereof include a residue of benzophenones, benzotriazoles, benzoic esters, phenyl salicylates, crotonic acids, malonic esters, organoacrylates, hindered amines, hindered phenols, or triazines.

The UV absorbing group is not limited as long as it can absorb ultraviolet rays, and examples thereof include residues of benzotriazoles, hydroxybenzophenones, esters of substituted and unsubstituted benzoic acid or salicylic acid compounds, acrylate or alkoxycinnamates, oxamides, oxanilides, benzoxazinones, and benzoxazoles.

In a preferred embodiment, examples of the radical scavenging group or the UV absorbing group include:

In this embodiment, $X^1$ (and $X^3$ and $X^5$ described below) may be a 3 to 10 valent organic group.

In the formula, $X^2$ each independently at each occurrence represents a single bond or a divalent organic group. $X^2$ is preferably an alkylene group having 1 to 20 carbon atoms, and more preferably —$(CH_2)_u$— (wherein u is an integer of 0 to 2).

In the formula, t is each independently an integer of 2 to 10. In a preferred embodiment, t is an integer of 2 to 6.

In a preferred embodiment, in the formulae (A1) and (A2),

PFPE is each independently a group represented by the formula:

—$(OCF(CF_3)CF_2)_d$—

(wherein d is an integer of 1 or more and 200 or less, preferably 5 or more and 200 or less, and more preferably 10 or more and 200 or less);

$X^1$ is each independently at each occurrence a group represented by
—$X^f$—$X^{10}$—$CON(R^{34})$—$X^{11}$—,
—$X^f$—$X^{10}$—$(OR^{35})_{n4}$—$X^{11}$—, or
—$X^f$—$C_{1-6}$ alkylene group (preferably propylene group);

$X^f$ is each independently at each occurrence a single bond or an alkylene group having 1 to 6 carbon atoms, preferably a single bond or an alkylene group having 1 to 4 carbon atoms, and more preferably a single bond or an alkylene group having 1 to 2 carbon atoms (for example, a methylene group), wherein the hydrogen atom in $X^f$ is optionally substituted by one or more substituents selected from a fluorine atom, a $C_{1-3}$ alkyl group, and a $C_{1-3}$ fluoroalkyl group, and preferably substituted;

$X^{10}$ is each independently at each occurrence a single bond, —O—$R^{36}$—O—, —$R^{36}$—, or an o-, m-, or p-phenylene group, preferably a single bond, —O—$R^{36}$—O—, or —$R^{36}$—, more preferably a single bond or —$R^{36}$—, and still more preferably a single bond;

$R^{36}$ is a $C_{1-20}$ alkylene group which is optionally substituted by one or more fluorine atoms, preferably a $C_{1-3}$ alkylene group which is optionally substituted by one or more fluorine atoms, and still more preferably a $C_{1-2}$ alkylene group which is optionally substituted by one or more fluorine atoms, wherein the alkylene group in $R^{36}$ may be linear or may have a branched structure;

$R^{34}$ is each independently at each occurrence a hydrogen atom, a phenyl group, or a $C_{1-6}$ alkyl group, preferably a hydrogen atom or a $C_{1-6}$ alkyl group, more preferably a hydrogen atom or a methyl group, and still more preferably a hydrogen atom;

$R^{35}$ is each independently at each occurrence a $C_{1-6}$ alkylene group, and preferably a $C_{1-3}$ alkylene group;

n4 is each independently at each occurrence an integer of 1 to 5, preferably an integer of 1 to 3, and more preferably 1;

$X^{11}$ is each independently at each occurrence a single bond, an oxygen atom, or a $C_{1-20}$ alkylene group which is optionally substituted by one or more fluorine atoms, preferably a single bond or a $C_{1-6}$ alkylene group having no substituent, more preferably a single bond or a $C_{1-3}$ alkylene group having no substituent, and particularly preferably a $C_{1-3}$ alkylene group having no substituent;

$X^2$ is —$(CH_2)_u$—; and
u is each independently at each occurrence an integer of 0 to 2.

In a preferred embodiment, the compounds represented by the formulae (A1) and (A2) are compounds represented by the following formulae (A1') and (A2'):

$$\text{Rf}—\text{PFPE}—X^1—(CH_2C)_t—R^{11} \quad \overset{R^{12}}{|} \quad \underset{X^2—SiR^{13}_nR^{14}_{3-n}}{|}\tag{A1'}$$

$$R^{11}—(CCH_2)_t—X^1—\text{PFPE}—X^1—(CH_2C)_t—R^{11}\tag{A2'}$$
$$R^{14}_{3-n}R^{13}_nSi—X^2 \qquad\qquad X^2—SiR^{13}_nR^{14}_{3-n}$$

wherein:
PFPE is each independently a group represented by the formula:

—$(OCF(CF_3)CF_2)_d$—

(wherein d is an integer of 0 or more and 200 or less);

Rf each independently at each occurrence represents an alkyl group having 1 to 16 carbon atoms which is optionally substituted by one or more fluorine atoms;

$R^{13}$ each independently at each occurrence represents a hydroxyl group or a hydrolyzable group;

$R^{14}$ each independently at each occurrence represents a hydrogen atom or an alkyl group having 1 to 22 carbon atoms;

$R^{11}$ each independently at each occurrence represents a hydrogen atom or a halogen atom;

$R^{12}$ each independently at each occurrence represents a hydrogen atom or a lower alkyl group;

n is 2 or 3, and preferably 3;

$X^1$ is each independently at each occurrence —$X^{10}$—$CONH$—$X^{11}$—, —$X^{10}$—$(OR^{35})_{n4}$—$X^{11}$—($R^{35}$ is a $C_{1-3}$ alkylene group; n4 is an integer of 1 to 5, preferably an integer of 1 to 3, and more preferably 1) or a $C_{1-6}$ alkylene group (preferably propylene group);

$X^{10}$ is each independently at each occurrence a single bond, —O—$R^{36}$—O—, or —$R^{36}$—;

$R^{36}$ is a $C_{1-3}$ alkylene group which is optionally substituted by one or more fluorine atoms;

$X^{11}$ is each independently at each occurrence a single bond, an oxygen atom, or a $C_{1-3}$ alkylene group;

$X^2$ is —$(CH_2)_u$—;

u is each independently at each occurrence an integer of 0 to 2; and t is each independently at each occurrence an integer of 2 to 10.

In another embodiment, the compounds represented by the formulae (A1) and (A2) are compounds represented by the following formulae (A1') and (A2'):

$$\text{Rf}—\text{PFPE}—X^1—(CH_2C)_t—R^{11} \quad \overset{R^{12}}{|} \quad \underset{X^2—SiR^{13}_nR^{14}_{3-n}}{|}\tag{A1'}$$

-continued (A2′)

$$R^{11}-(CCH_2)_t-X^1-PFPE-X^1-(CH_2C)_t-R^{11}$$

(with $R^{12}$ above each $(CCH_2)_t$ / $(CH_2C)_t$ group, and $R^{14}{}_{3-n}R^{13}{}_nSi-X^2$ below the left and $X^2-SiR^{13}{}_nR^{14}{}_{3-n}$ below the right)

wherein:

PFPE is each independently a group represented by the formula:

$$-(R^{16}-R^{17})_{j1}-$$

(wherein $R^{16}$ is $OCF_2$ or $OC_2F_4$;

$R^{17}$ is a group selected from $OC_2F_4$, $OC_3F_6$, $OC_4F_8$, $OC_5F_{10}$, and $OC_6F_{12}$, or is a combination of two or three groups independently selected from these groups; and j1 is an integer of 2 to 100);

Rf each independently at each occurrence represents an alkyl group having 1 to 16 carbon atoms which is optionally substituted by one or more fluorine atoms;

$R^{13}$ each independently at each occurrence represents a hydroxyl group or a hydrolyzable group;

$R^{14}$ each independently at each occurrence represents a hydrogen atom or an alkyl group having 1 to 22 carbon atoms;

$R^{11}$ each independently at each occurrence represents a hydrogen atom or a halogen atom;

$R^{12}$ each independently at each occurrence represents a hydrogen atom or a lower alkyl group;

n is 2 or 3, and preferably 3;

$X^1$ is each independently at each occurrence $-X^{10}-$ CONH$-X^{11}-$, $-X^{10}-(OR^{35})_{n4}-X^{11}-$ ($R^{35}$ is a $C_{1-3}$ alkylene group) or a $C_{1-6}$ alkylene group (preferably propylene group);

$X^{10}$ is each independently at each occurrence a single bond, $-O-R^{36}-O-$, or $-R^{36}-$;

$R^{36}$ is a $C_{1-3}$ alkylene group which is optionally substituted by one or more fluorine atoms;

$X^{11}$ is each independently at each occurrence a single bond, an oxygen atom, or a $C_{1-3}$ alkylene group;

$X^2$ is $-(CH_2)_u-$;

u is each independently at each occurrence an integer of 0 to 2; and t is each independently at each occurrence an integer of 2 to 10.

In another preferred embodiment, the compounds represented by the formulae (A1) and (A2) are represented by the formulae (A1′) and (A2′);

PFPE each independently at each occurrence represents a group represented by $-(R^{16}-R^{17})_{j1}-$;

$R^{16}$ is $OCF_2$ or $OC_2F_4$;

$R^{17}$ is a group selected from $OC_2F_4$, $OC_3F_6$, $OC_4F_8$, $OC_5F_{10}$, and $OC_6F_{12}$, or is a combination of two or three groups independently selected from these groups;

j1 is an integer of 2 to 100; and

Rf, $X^1$, $X^2$, $R^{11}$ to $R^{14}$, n, t, α, and α′ are as defined above.

The number average molecular weight of the compounds represented by the formulae (A1) and (A2) is, for example, but not limited to, 1,000 to 40,000, preferably 1,000 to 32,000, more preferably 1,000 to 20,000, and still more preferably 1,000 to 12,000. The number average molecular weight is a value measured by 19F-NMR and ¹H-NMR.

In one embodiment, the compounds represented by the formulae (A1) and (A2) have a number average molecular weight of 1,000 to 8,000, and preferably 1,000 to 4,000. By having such a number average molecular weight, a layer (for example, a surface-treating layer) formed by using the compound (or a surface-treating agent containing the compound) has particularly good slip suppression effect, abrasion resistance, and the like.

In one embodiment, the compounds represented by the formulae (A1) and (A2) have a weight average molecular weight Mw of 3,000 or more and less than 6,000, and the molecular weight distribution (Mw/Mn) of the compounds is 1.2 or less. The weight average molecular weight and the molecular weight distribution are determined, for example, based on gel filtration chromatography (GPC) measurement.

In a preferred embodiment, the compounds represented by the formulae (A1) and (A2) are compounds represented by the formula (A1), and more preferably compounds represented by the formula (A1′).

In one embodiment, the compounds represented by the formulae (A1) and (A2) may be obtained, for example, by introducing a hydroxyl group in the end of a fluoropolyether derivative corresponding to the Rf-PFPE moiety as a raw material, and subjecting it to a Williamson reaction with a compound having an alkyl halide at the end thereof, or the like.

Formulae (B1) and (B2):

$$(Rf\text{-}PFPE)_{\beta'}-X^3-(SiR^a{}_{k1}R^b{}_{l1}R^c{}_{m1})_{\beta} \tag{B1}$$

$$(R^c{}_{m1}R^b{}_{l1}R^a{}_{k1}Si)_{\beta}-X^3-PFPE\text{-}X^3- (SiR^a{}_{k1}R^b{}_{l1}R^c{}_{m1})_{\beta} \tag{B2}$$

In the formulae (B1) and (B2), Rf and PFPE are as defined for the formulae (A1) and (A2). Here, the "formula (A1)" is to be read as "formula (B1)" and the "$X^1$ group" is to be read as "$X^3$ group".

In the formula, $X^3$ each independently represents a single bond or a 2 to 10 valent organic group. $X^3$ in the compounds represented by the formulae (B1) and (B2) is recognized to be a linker which connects a fluoropolyether moiety (i.e., an Rf-PFPE moiety or -PFPE-moiety) providing mainly good UV durability, water-repellency, oil-repellency, antifouling property (for example, preventing adhesion of fouling such as fingerprints), chemical resistance, hydrolysis resistance, an effect of suppressing lubricity, high friction durability, heat resistance, moisture-proof property, and the like and a silane moiety (specifically, $-SiR^a{}_{k1}R^b{}_{l1}R^c{}_{m1}$ group) providing an ability to bind to a base material. Therefore, $X^3$ may be a single bond or any organic group as long as the compounds represented by the formulae (B1) and (B2) can stably exist. In the present specification, in the structure described as $X^3$, the left side of the structure is bonded to the group represented by PFPE, and the right side thereof is bonded to the group in parentheses with β.

In the formula, β is an integer of 1 to 9, and β′ is an integer of 1 to 9. These β and β′ may vary depending on the valence number of $X^3$. In the formula (B1), the sum of β and β′ is the same as the valence number of $X^3$. For example, when $X^3$ is a 10 valent organic group, the sum of β and β′ is 10, for example, β and β′ may be 9 and 1, β and β′ may be 5 and 5, or β and β′ may be 1 and 9. When $X^3$ is a divalent organic group, β and β′ are 1. In the formula (B2), β is a value obtained by subtracting 1 from the valence number of $X^3$.

$X^3$ is preferably a 2 to 7 valent, more preferably a 2 to 4 valent, and still more preferably a divalent organic group.

In one embodiment, $X^3$ is a 2 to 4 valent organic group, P is 1 to 3, and s′ is 1.

In another embodiment, $X^3$ is a divalent organic group, $\beta$ is 1, and $\beta'$ is 1. In this case, the formulae (B1) and (B2) are represented by the following formulae (B1') and (B2').

$$Rf\text{-}PFPE\text{-}X^3\text{---}SiR^a{}_{k1}R^b{}_{l1}R^c{}_{m1} \qquad (B1')$$

$$R^c{}_{m1}R^b{}_{l1}R^a{}_{k1}Si\text{---}X^3\text{---}PFPE\text{---}X^3\text{---}SiR^a{}_{k1}R^b{}_{l1}R^c{}_{m1} \qquad (B2')$$

Examples of $X^3$ include, but are not limited to, the same groups as those described for $X^1$.

Examples of preferred $X^3$ include:
—$X^{10}$—CON($R^{34}$)—$X^{11}$—,
—$X^{10}$—($OR^{35}$)$_{n4}$—$X^{11}$—, and
a $C_{1-6}$ alkylene group (preferably propylene group). In the formula, $R^{34}$, $R^{35}$, $X^{10}$, $X^{11}$, and n4 are as defined above.

Specific examples of particularly preferred $X^3$ include:
—O—$CFHCF_2$—O—CONH—,
—O—$CFHCF_2$—O—CONH—$CH_2$—,
—O—$CFHCF_2$—O—CONH—$(CH_2)_2$—,
—O—$CFHCF_2$—O—CONH—$(CH_2)$—,
—O—$CFHCF_2$—O—CONH—$(CH_2)_6$—,
—CONH—,
—CONH—$CH_2$—,
—CONH—$(CH_2)_2$—,
—CONH—$(CH_2)_3$—,
—CONH—$(CH_2)_6$—,
—$CF_2$CONH—,
—$CF_2$CONHCH_2—,
—$CF_2$CONH$(CH_2)_2$,
—$CF_2$CONH$(CH_2)_3$—,
—$CF_2$CONH$(CH_2)_6$—,
—O—$CFHCF_2$—O—$CH_2OCH_2$—,
—O—$CFHCF_2$—O—$CH_2O(CH_2)_2$—,
—O—$CFHCF_2$—O—$CH_2O(CH_2)_3$—,
—O—$CFHCF_2$—O—$CH_2O(CH_2)_6$—,
—$CH_2OCH_2$—,
—$CH_2O(CH_2)_2$—,
—$CH_2O(CH_2)_3$—,
—$CH_2O(CH_2)_6$—,
—$CF_2$—$CH_2$—O—$CH_2$—,
—$CF_2$—$CH_2$—O—$(CH_2)_2$,
—$CF_2$—$CH_2$—O—$(CH_2)_3$—,
—$CF_2$—$CH_2$—O—$(CH_2)_6$—,
—O—$CFHCF_2$—O—,
—O—$CFHCF_2$—O—$(CH_2)_2$,
—O—$CFHCF_2$—O—$(CH_2)_3$—,
—O—$CFHCF_2$—O—$(CH_2)_6$—,
—$CH_2$—,
—$(CH_2)_2$—,
—$(CH_2)_3$—,
—$(CH_2)$—,
—$CF_2$—,
—$(CF_2)_2$—,
—$CF_2$—$CH_2$—,
—$CF_2$—$(CH_2)_2$—,
—$CF_2$—$(CH_2)_3$—,
—$CF_2$—$(CH_2)_4$—,
—$CF_2$—$(CH_2)_5$—, and
—$CF_2$—$(CH_2)_6$—.

In a preferred embodiment, $X^3$ is

—$X^{10}$—CON($R^{34}$)—$X^{11}$—, or a $C_{1-6}$ alkylene group (preferably propylene group). In the formula:
$R^{34}$ is as defined above, and preferably a hydrogen atom or a $C_{1-6}$ alkyl group, more preferably a hydrogen atom or a methyl group, and still more preferably a hydrogen atom;

$X^{10}$ is as defined above, and preferably a single bond, —$R^{36}$—, or an o-, m-, or p-phenylene group, more preferably a single bond or —$R^{36}$—, and still more preferably a single bond;

$R^{36}$ is as defined above, and preferably a $C_{1-20}$ alkylene group which is optionally substituted by one or more fluorine atoms, more preferably a $C_{1-3}$ alkylene group which is optionally substituted by one or more fluorine atoms, and still more preferably a $C_{1-2}$ alkylene group which is optionally substituted by one or more fluorine atoms; and $X^{11}$ is as defined above, and preferably a single bond or a $C_{1-20}$ alkylene group which is optionally substituted by one or more fluorine atoms, more preferably a single bond or a $C_{1-6}$ alkylene group having no substituent, still more preferably a single bond or a $C_{1-3}$ alkylene group having no substituent, and particularly preferably a $C_{1-3}$ alkylene group having no substituent.

In the embodiment, $X^3$ is particularly preferably —$X^{10}$—CON($R^{34}$)—$X^{11}$—. In the formula, $R^{34}$, $X^{10}$, and $X^{11}$ are as defined above.

In the embodiment, $X^{10}$ is particularly preferably a single bond and $X^{11}$ is particularly preferably a $C_{1-3}$ alkylene group, and $X^{11}$ is still more preferably a $C_{1-3}$ alkylene group having no substituent.

In one embodiment, examples of $X^3$ include, but are not limited to, the following structure:

$$-X^f-X^{10}-CON(R^{34})-X^{11}-,$$

$$-X^f-X^{10}-(OR^{35})_{n4}-X^{11}-, \text{ and}$$

—$X^f$—$C_{1-6}$ alkylene group (preferably propylene group). In the formula, $X^f$, $X^{10}$, $R^{34}$, $X^{11}$, $R^{35}$, and n4 are as defined above.

In the formula, $R^a$ each independently at each occurrence represents —$Z^3$—$SiR^{71}{}_{p1}R^{72}{}_{q1}R^{73}{}_{r1}$.

In the formula, $Z^3$ each independently at each occurrence represents an oxygen atom or a divalent organic group.

$Z^3$ is preferably a divalent organic group, and does not include a group which forms a siloxane bond together with a Si atom (the Si atom binding to $R^a$) present in the end of the molecular backbone of the formula (B1) or the formula (B2).

$Z^3$ is preferably a $C_{1-6}$ alkylene group, —$(CH_2)_g$—O—$(CH_2)_h$— (wherein g is an integer of 1 to 6, h is an integer of 1 to 6) or -phenylene-$(CH_2)_i$— (wherein i is an integer of 0 to 6), and more preferably a $C_{1-3}$ alkylene group. These groups are optionally substituted by, for example, one or more substituents selected from a fluorine atom, a $C_{1-6}$ alkyl group, a $C_{2-6}$ alkenyl group, and a $C_{2-6}$ alkynyl group. From the viewpoint of particularly good UV durability, $Z^3$ is more preferably a linear or branched alkylene group, and still more preferably a linear alkylene group. The number of carbon atoms constituting the alkylene group for $Z^3$ is preferably in the range of 1 to 6, and more preferably 1 to 3. The alkylene group is as described above.

In one embodiment, $Z^3$ may be a $C_{1-6}$ alkylene group or -phenylene-$(CH_2)_i$—. When $Z^3$ is a group as described above, light resistance, especially ultraviolet resistance can be further increased. In the formula, i is an integer of 0 to 6.

In the embodiment, $Z^3$ is preferably a $C_{1-6}$ alkylene group, and more preferably a $C_{1-3}$ alkylene group.

In one embodiment, $X^3$ is preferably —$X^{10}$—CON($R^{34}$)—$X^{11}$— or a $C_{1-6}$ alkylene group (preferably propylene group), and more preferably —$X^{10}$—CON($R^{34}$)—$X^{11}$—; and $Z^3$ is preferably a $C_{1-6}$ alkylene group or -phenylene-$(CH_2)_i$—, more preferably a $C_{1-6}$ alkylene group, and still more preferably a $C_{1-3}$ alkylene group.

$R^{34}$, $X^{10}$, $X^{11}$, and i are as defined above.

In one embodiment, $X^3$ is preferably —$X^{10}$—CON($R^{34}$)—$X^{11}$— or a $C_{1-6}$ alkylene group (preferably propylene group), and more preferably —$X^{10}$—CON($R^{34}$)—$X^{11}$—; and $Z^3$ is preferably a $C_{1-6}$ alkylene group or -phenylene-$(CH_2)_i$—, more preferably a $C_{1-6}$ alkylene group, and still more preferably a $C_{1-3}$ alkylene group.

In the formula:

$R^{34}$ is a hydrogen atom, or a $C_{1-6}$ alkyl group, preferably a hydrogen atom, or a methyl group, and more preferably a hydrogen atom;

$X^{10}$ is a single bond, —$R^{36}$—, or an o-, m-, or p-phenylene group, preferably a single bond or —$R^{36}$—, and more preferably a single bond;

$R^{36}$ is a $C_{1-20}$ alkylene group which is optionally substituted by one or more fluorine atoms, preferably a $C_{1-3}$ alkylene group which is optionally substituted by one or more fluorine atoms, and more preferably a $C_{1-2}$ alkylene group which is optionally substituted by one or more fluorine atoms;

$X^{11}$ is a single bond or a $C_{1-2}$ alkylene group which is optionally substituted by one or more fluorine atoms, preferably a single bond or a $C_{1-6}$ alkylene group having no substituent, more preferably a single bond or a $C_{1-3}$ alkylene group having no substituent, and particularly preferably a $C_{1-3}$ alkylene group having no substituent; and i is an integer of 0 to 6.

In the embodiment, $X^{10}$ is particularly preferably a single bond and $X^{11}$ is particularly preferably a $C_{1-3}$ alkylene group, and $X^{11}$ is still more preferably a $C_{1-3}$ alkylene group having no substituent. $X^3$ is more preferably —$X^{10}$—CON($R^3$)—$X^{11}$—.

In one embodiment, $X^3$ is a group represented by —$X^f$—$X^{10}$—($OR^{35}$)$_{n4}$—$X^{11}$—;

$Z^3$ is a $C_{1-6}$ alkylene group, and still more preferably a $C_{1-3}$ alkylene group. In the formula, $X^f$, $X^{10}$, $X^{11}$, $R^{35}$, and n4 are as defined above.

In the formula, $R^{71}$ each independently at each occurrence represents $R^{a'}$. $R^{a'}$ is as defined for $R^a$.

In $R^a$, the number of Si atoms which are linearly connected via the $Z^3$ group is up to five. That is, in $R^a$, when there is at least one $R^{71}$, there are two or more Si atoms which are linearly connected via the $Z^3$ group in $R^a$. The number of such Si atoms which are linearly connected via the $Z^3$ group is up to five. It is noted that "the number of Si atoms which are linearly connected via the $Z^3$ group in $R^{a''}$ is equal to the repeating number of —$Z^3$—Si— which are linearly connected in $R^a$.

For example, one example in which Si atoms are connected via the $Z^3$ group in $R^a$ is shown below.

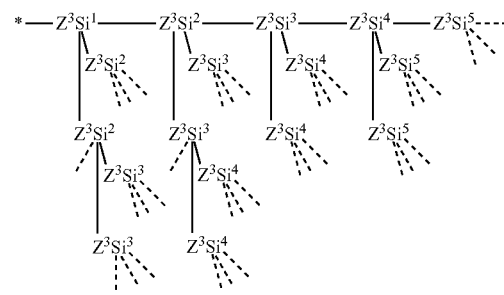

In the formula, * represents a position binding to Si of the main backbone, and . . . represents that a predetermined group other than $Z^3$Si binds thereto. that is, all three bonds of the Si atom being . . . means the end point of the repeat of $Z^3$Si. The number on the right shoulder of Si means the number of occurrences of Si which is linearly connected via the $Z^3$ group from *. In other words, in the chain in which the repeat of $Z^3$Si is completed at $Si^2$, "the number of Si atoms which are linearly connected via the $Z^3$ group in $R^{a''}$ is 2. Similarly, in the chain in which the repeat of $Z^3$Si is completed at $Si^3$, $Si^4$ and $Si^5$, "the number of Si atoms which are linearly connected via the $Z^3$ group in $R^{a''}$ is 3, 4, and 5, respectively. As seen from the formula, there are a plurality of $Z^3$Si chains in $R^a$, but they need not have the same length and may have arbitrary length.

In a preferred embodiment, as shown below, "the number of Si atoms which are linearly connected via the $Z^3$ group in $R^{a''}$ is 1 (left formula) or 2 (right formula) in all chains.

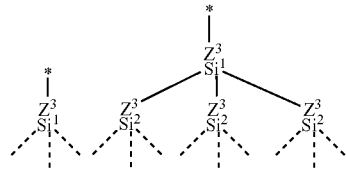

In one embodiment, the number of Si atoms which are linearly connected via the $Z^3$ group in $R^a$ is 1 or 2, and preferably 1.

In the formula, $R^{72}$ each independently at each occurrence represents a hydroxyl group or a hydrolyzable group. The "hydrolyzable group" is as defined above.

$R^{72}$ is preferably a hydrolyzable group, and more preferably —OR (wherein R represents a substituted or unsubstituted $C_{1-3}$ alkyl group, and more preferably a methyl group).

In the formula, $R^{73}$ each independently at each occurrence represents a hydrogen atom or a lower alkyl group. The lower alkyl group is preferably an alkyl group having 1 to 20 carbon atoms, more preferably an alkyl group having 1 to 6 carbon atoms, and still more preferably a methyl group.

In one embodiment, $R^{73}$ is a lower alkyl group. The lower alkyl group is as defined above.

In the formula, p1 is each independently at each occurrence an integer of 0 to 3; q1 is each independently at each occurrence an integer of 0 to 3; and r1 is each independently at each occurrence an integer of 0 to 3. In each (—$Z^3$—$SiR^{71}_{p1}R^{72}_{q1}R^{73}_{r1}$), the sum of p1, q1, and r1 is 3, and in the formulae (B1) and (B2), at least one q1 is an integer of 1 to 3, that is, there is at least one $R^{72}$. By having such a configuration, the PFPE-containing silane compound can form a surface-treating layer capable of being favorably bonded to the surface of a base material or the like. Further, by having such a configuration, the PFPE-containing silane compound can form a surface-treating layer having good UV durability, water-repellency, oil-repellency, antifouling property (for example, preventing adhesion of fouling such as fingerprints), heat resistance, high friction durability, hydrolysis resistance, chemical resistance, moisture-proof property, and the like.

In a preferred embodiment, in the formulae (B1) and (B2), there are at least two Si atoms binding to the hydroxyl group or the hydrolyzable group. That is, in the formulae (B1) and (B2), there are at least two —$SiR^{72}$ and/or —$SiR^b$. By having such a configuration, the PFPE-containing silane compound can form a surface-treating layer capable of being favorably bonded to the surface of a base material or the like. Further, by having such a configuration, the PFPE-containing silane compound can form a surface-treating layer having better UV durability, water-repellency, oil-repellency, antifouling property (for example, preventing adhesion of fouling such as fingerprints), heat resistance, high friction durability, hydrolysis resistance, chemical resistance, moisture-proof property, and the like, in particular, good UV durability, high friction durability, chemical resistance, and the like.

Preferably, in the formulae (B1) and (B2), there is —$SiR^{72}_2$ (specifically, —$SiR^{72}_2R^{73}$ or —$SiR^{72}_2$) or —$SiR^b_2$ (specifically, —$SiR^aR^b_2$, —$SiR^b_2R^c$, or —$SiR^b_3$).

In a preferred embodiment, in $R^{a'}$ at the end of $R^a$ ($R^a$ when there is no $R^{a'}$), q1 is preferably 2 or 3, and more preferably 3.

In a preferred embodiment, at least one of the ends in $R^a$ may be —$Si(—Z^3—SiR^{72}_{q1}R^{73}_{r1})_2$ (specifically, —$Si(—Z^3—SiR^{72}_{q1}R^{73}_{r1})_2R^{73})$ or —$Si(—Z^3—SiR^{72}_{q1}R^{73}_{r1})$ a, and preferably —$Si(—Z^3—SiR^{72}_{q1}R^{73}_{r1})_3$. Here, q1 is an integer of 1 or more, and preferably q1 is 2 or 3. Here, the sum of q1 and r1 is 3. In the formula, the unit (—$Z^3—SiR^{72}_{q1}R^{73}_{r1}$) is preferably (—$Z^3—SiR^{72}_3$). In a still more preferred embodiment, all ends in $R^a$ may be —$Si(—Z^3—SiR^{72}_{q1}R^{73}_{r1})$ 3, and preferably —$Si(—Z^3—SiR^{72}_3)_3$.

In the formula, $R^b$ each independently at each occurrence represents a hydroxyl group or a hydrolyzable group.

> $R^b$ is preferably a hydroxyl group, —OR, —OCOR, —O—N—$C(R)_2$, —$N(R)_2$, —NHR, halogen (wherein R is a substituted or unsubstituted alkyl group having 1 to 4 carbon atoms), and more preferably —OR. R includes an unsubstituted alkyl group such as a methyl group, an ethyl group, a propyl group, an isopropyl group, an n-butyl group, and an isobutyl group; and a substituted alkyl group such as a chloromethyl group. Among them, an alkyl group, in particular a non-substituted alkyl group is preferred, a methyl group or an ethyl group is more preferred. The hydroxyl group may be, but is not limited to, a group generated by hydrolysis of a hydrolyzable group. More preferably, $R^b$ is —OR (wherein R represents a substituted or unsubstituted $C_{1-3}$ alkyl group, and more preferably a methyl group).

In the formula, $R^c$ each independently at each occurrence represents a hydrogen atom or a lower alkyl group. The lower alkyl group is preferably an alkyl group having 1 to 20 carbon atoms, more preferably an alkyl group having 1 to 6 carbon atoms, and still more preferably a methyl group.

In the formula, k1 is each independently at each occurrence an integer of 0 to 3; l1 is each independently at each occurrence an integer of 0 to 3; and m1 is each independently at each occurrence an integer of 0 to 3. In each ($SiR^a_{k1}R^b_{l1}R^c_{m1}$), the sum of k1, l1, and m1 is 3.

In one embodiment, k1 is preferably 1 to 3, more preferably 2 or 3, and particularly preferably 3. In this embodiment, q1 is 1 to 3, preferably 2 or 3, and more preferably 3.

In one embodiment, preferably, k1 is an integer of 1 to 3 and q1 is 2 or 3, more preferably, k1 is 2 or 3 and q1 is 2 or 3, and still more preferably, k1 is 3 and q1 is 2 or 3.

In one embodiment, preferably, k1 is an integer of 1 to 3 and q1 is 3, more preferably, k1 is 2 or 3 and q1 is 3, and still more preferably, k1 is 3 and q1 is 3.

In one embodiment, k1 is an integer of 1 to 3 and $Z^3$ is a divalent organic group. Preferably, $Z^3$ does not include a group which forms a siloxane bond together with a Si atom (the Si atom binding to $R^a$) present at the end of the molecular backbone of the formula (B1) or the formula (B2). More preferably, $Z^3$ is preferably a $C_{1-6}$ alkylene group, —$(CH_2)_g$—O—$(CH_2)_h$— (wherein g is an integer of 1 to 6, h is an integer of 1 to 6) or -phenylene-$(CH_2)_i$— (wherein i is an integer of 0 to 6), and more preferably a $C_{1-3}$ alkylene group.

Examples of preferable PFPE-containing silane compounds represented by the formula (B1) include the following compounds. In the following, Rf is as defined above and d is 5 to 40.

Rf—$(OCF(CF_3)CF_2)_d$—$OCF(CF_3)$—$CH_2CH_2CH_2$—Si$(CH_2CH_2SiCH_3 (OCH_3) 2) 3$,

Rf—$(OCF(CF_3)CF_2)_d$—$OCF(CF_3)$—$CH_2CH_2CH_2$—Si$(CH_2CH_2CH_2SiCH_3 (OCH_3) 2) 3$,

Rf—$(OCF(CF_3)CF_2)_d$—$OCF(CF_3)$—$CH_2OCH_2CH_2CH_2$—Si$(CH_2CH_2SiCH_3 (OCH_3) 2) 3$,

Rf—$(OCF(CF_3)CF_2)_d$—$OCF(CF_3)$—$CH_2CH_2CH_2$—Si$(CH_2CH_2CH_2SiCH_3 (OCH_3)_2)_3$,

Rf—$(OCF(CF_3)CF_2)_d$—$OCF(CF_3)$—CONH—$CH_2$—Si$(CH_2CH_2SiCH_3 (OCH_3) 2) 3$,

Rf—$(OCF(CF_3)CF_2)_d$—$OCF(CF_3)$—CONH—$CH_2$—Si$(CH_2CH_2CH_2SiCH_3 (OCH_3) 2) 3$,

Rf—$(OCF(CF_3)CF_2)_d$—$OCF(CF_3)$—CONH—$CH_2CH_2CH_2$—Si$(CH_2CH_2SiCH_3 (OCH_3) 2) 3$,

Rf—$(OCF(CF_3)CF_2)_d$—$OCF(CF_3)$—CONH—$CH_2CH_2CH_2$—Si$(CH_2CH_2CH_2SiCH_3 (OCH_3) 2) 3$,

Rf—$(OCF(CF_3)CF_2)_d$—$OCF(CF_3)$—$CH_2CH_2CH_2$—Si$(CH_2CH_2Si(OCH_3)_3)_3$,

Rf—$(OCF(CF_3)CF_2)_d$—$OCF(CF_3)$—$CH_2CH_2CH_2$—Si$(CH_2CH_2CH_2Si(OCH_3)_3)_3$,

Rf—$(OCF(CF_3)CF_2)_d$—$OCF(CF_3)$—$CH_2CH_2CH_2CH_2$—Si$(CH_2CH_2Si(OCH_3)_3)_3$,

Rf—$(OCF(CF_3)CF_2)_d$—$OCF(CF_3)$—$CH_2CH_2CH_2CH_2$—Si$(CH_2CH_2CH_2Si(OCH_3) 3) 3$,

Rf—$(OCF(CF_3)CF_2)_d$—$OCF(CF_2)$—CONH—$CH_2$—Si$(CH_2CH_2Si(OCH_3)_3)_3$,

Rf—$(OCF(CF_3)CF_2)_d$—$OCF(CF_3)$—CONH—$CH_2$—Si$(CH_2CH_2CH_2Si(OCH_3) 3) 3$,

Rf—$(OCF(CF_3)CF_2)_d$—$OCF(CF_3)$—CONH—$CH_2CH_2CH_2$—Si$(CH_2CH_2Si(OCH_3) 3)_3$,

Rf—$(OCF(CF_3)CF_2)_d$—$OCF(CF_3)$—CONH—$CH_2CH_2CH_2$—Si$(CH_2CH_2CH_2Si(OCH_3) 3) 3$

The number average molecular weight of the compounds represented by the formulae (B1) and (B2) may be, for example, but not limited to, a number average molecular weight of $5 \times 10^2$ to $1 \times 10^5$. Within this range, the number average molecular weight is preferably 1,000 to 30,000, more preferably 1,000 to 12,000, and still more preferably 1,000 to 6,000. In the present disclosure, the number average molecular weight is a value measured by $^{19}$F-NMR.

In a preferred embodiment, in the formulae (B1) and (B2), PFPE is each independently a group represented by the formula:

$$-(OCF(CF_3)CF_2)_d-,$$

(wherein d is an integer of 1 or more and 200 or less, preferably 5 or more and 200 or less, and more preferably 10 or more and 200 or less);

$X^3$ is each independently at each occurrence $-X^f-$ $X^{10}-CON(R^{34})-X^{11}-$, $-X^f-X^{10}-(OR^{35})_{n4}-$ $X^{11}-$, or $-X^f-C_{1-6}$ alkylene group (preferably propylene group), and preferably $-X^f-X^{10}-CON(R^{34})-X^{11}-$;

$X^f$ is each independently at each occurrence a single bond or an alkylene group having 1 to 6 carbon atoms, preferably a single bond or an alkylene group having 1 to 4 carbon atoms, and more preferably a single bond or an alkylene group having 1 to 2 carbon atoms (for example, a methylene group), wherein the hydrogen atom in $X^f$ is optionally substituted by one or more substituents selected from a fluorine atom, a $C_{1-3}$ alkyl group, and a $C_{1-3}$ fluoroalkyl group, and preferably substituted;

$X^{10}$ is each independently at each occurrence a single bond, $-O-R^{36}-O-$, $-R^{36}-$, or an o-, m-, or p-phenylene group, preferably a single bond, $-O-R^{36}-O-$, or $-R^{36}-$, more preferably a single bond or $-R^{36}-$, and still more preferably a single bond;

$R^{36}$ is a $C_{1-20}$ alkylene group which is optionally substituted by one or more fluorine atoms, preferably a $C_{1-3}$ alkylene group which is optionally substituted by one or more fluorine atoms, and still more preferably a $C_{1-2}$ alkylene group which is optionally substituted by one or more fluorine atoms, wherein the alkylene group in $R^{36}$ may be linear or may have a branched structure;

$X^{11}$ is each independently at each occurrence a single bond, an oxygen atom, or a $C_{1-20}$ alkylene group which is optionally substituted by one or more fluorine atoms, preferably a single bond or a $C_{1-6}$ alkylene group having no substituent, more preferably a single bond or a $C_{1-3}$ alkylene group having no substituent, and particularly preferably a $C_{1-3}$ alkylene group having no substituent;

$R^{34}$ is each independently at each occurrence a hydrogen atom, a phenyl group, or a $C_{1-6}$ alkyl group, preferably a hydrogen atom or a $C_{1-6}$ alkyl group, more preferably a hydrogen atom or a methyl group, and still more preferably a hydrogen atom;

$R^{35}$ is each independently at each occurrence a $C_{1-6}$ alkylene group, and preferably a $C_{1-3}$ alkylene group;

n4 is each independently at each occurrence an integer of 1 to 5, preferably an integer of 1 to 3, and more preferably 1;

$Z^3$ is preferably a $C_{1-6}$ alkylene group or -phenylene-$(CH_2)_i-$, more preferably a $C_{1-6}$ alkylene group, and still more preferably a $C_{1-3}$ alkylene group; and i is an integer of 0 to 6.

In one embodiment, the compounds represented by the formulae (B1) and (B2) have a number average molecular weight of 1,000 to 8,000, and preferably 1,000 to 4,000. By having such a number average molecular weight, a layer (for example, a surface-treating layer) formed by using the compound (or a surface-treating agent containing the compound) can be further improved in slip suppression effect, friction durability, and the like.

In a preferred embodiment, the compounds represented by the formulae (B1) and (B2) are compounds represented by the formula (B1).

In one embodiment, the compounds represented by the formulae (B1) and (B2) may be prepared, for example, by introducing a hydroxyl group in the end of a fluoropolyether derivative corresponding to the Rf-PFPE moiety as a raw material, followed by further introducing a group having an unsaturated bond in the end thereof, and reacting the group having an unsaturated bond with a silyl derivative having a halogen atom, further introducing a hydroxyl group in the end and then a group having an unsaturated bond into the silyl group, and finally reacting the group having an unsaturated bond with a silyl derivative. For example, it may be synthesized as described in International Publication No. WO2014/069592.

Formulae (C1) and (C2):

$$(Rf\text{-}PFPE)_\gamma\text{-}X^5-(CR^d_{k2}R^e_{l2}R^f_{m2})_{\gamma'} \quad (C1)$$

$$(R^f_{m2}R^e_{l2}R^d_{k2}C)_{\gamma'}-X^5-PFPE\text{-}X^5-(CR^d_{k2}R^e_{l2}R^f_{m2})_{\gamma'} \quad (C2)$$

In the formulae (C1) and (C2), Rf and PFPE are as defined for the formulae (A1) and (A2). Here, the "formula (A1)" is to be read as "formula (C1)" and the "$X^1$ group" is to be read as "$X^5$ group".

In the formula, $X^5$ each independently represents a single bond or a 2 to 10 valent organic group. $X^5$ is recognized to be a linker which connects between a fluoropolyether moiety (i.e., an Rf-PFPE moiety or -PFPE-moiety) providing mainly water-repellency, surface lubricity and the like and a moiety (i.e., a group in parentheses with $\gamma$) providing an ability to bind to a base material in the compound represented by the formulae (C1) and (C2). Therefore, $X^5$ may be a single bond or any organic group as long as the compounds represented the formulae (C1) and (C2) can stably exist. In the present specification, in the group described as $X^5$, the left side of the group is bonded to the group represented by PFPE, and the right side thereof is bonded to the group in parentheses with $\gamma$.

In the formula, $\gamma$ is an integer of 1 to 9, and $\gamma'$ is an integer of 1 to 9. These $\gamma$ and $\gamma'$ may vary depending on the valence number of $X^5$. In the formula (C1), the sum of $\gamma$ and $\gamma'$ is the same as the valence number of $X^5$. For example, when $X^5$ is a 10 valent organic group, the sum of $\gamma$ and $\gamma'$ is 10, for example, $\gamma$ and $\gamma'$ may be 9 and 1, $\gamma$ and $\gamma'$ may be 5 and 5, or $\gamma$ and $\gamma'$ may be 1 and 9. When $X^5$ is a divalent organic group, $\gamma$ and $\gamma'$ are 1. In the formula (C2), $\gamma$ is a value obtained by subtracting 1 from the valence number of $X^5$.

$X^5$ is preferably a 2 to 7 valent, more preferably a 2 to 4 valent, and still more preferably a divalent organic group.

In one embodiment, $X^5$ is a 2 to 4 valent organic group, $\gamma$ is 1 to 3, and $\gamma'$ is 1.

In another embodiment, $X^5$ is a divalent organic group, $\gamma$ is 1, and $\gamma'$ is 1. In this case, the formulae (C1) and (C2) are represented by the following formulae (C1') and (C2').

$$Rf\text{-}PFPE\text{-}X^5-CR^d_{k2}R^e_{l2}R^f_{m2} \quad (C1')$$

$$R^f_{m2}R^e_{l2}R^d_{k2}C-X^5-PFPE\text{-}X^5-CR^d_{k2}R^e_{l2}R^f_{m2} \quad (C2')$$

Examples of $X^5$ include, but are not limited to, the same group as those described for $X^1$.

Examples of preferred $X^5$ include:

$$-X^{10}-CON(R^{34})-X^{11}-,$$

$$-X^{10}-(OR^{35})_{n4}-X^{11}-, \text{ and}$$

a $C_{1-6}$ alkylene group (preferably propylene group). In the formula, $R^{34}$, $R^{35}$, $X^{10}$, $X^{11}$, and n4 are as defined above.

In one embodiment $X^5$ is a single bond.

In one embodiment, examples of $X^5$ include, but are not limited to, the following structure:

$$-X^f-X^{10}-CON(R^{34})-X^{11}-,$$

$$-X^f-X^{10}-(OR^{35})_{n4}-X^{11}-, \text{ and}$$

$-X^f-C_{1-6}$ alkylene group (preferably propylene group).

In the formula, $X^f$, $X^{10}$, $R^{34}$, $X^{11}$, $R^{35}$, and n4 are as defined above.

Examples of particularly preferred $X^5$ include:

a single bond;

$-O-CFHCF_2-O-CONH-$, $-O-CFHCF_2-O-CONH-CH_2-$, $-O-CFHCF_2-O-CONH-(CH_2)_2-$, $-O-CFHCF_2-O-CONH-(CH_2)_3-$, $-O-CFHCF_2-O-CONH-(CH_2)_6-$, $-CONH-$, $-CONH-CH_2-$, $-CONH-(CH_2)_2-$, $-CONH-(CH_2)_3-$, $-CONH-(CH_2)_6-$, $-CF_2-CONH-$, $-CF_2-CONH-CH_2-$, $-CF_2-CONH-(CH_2)_2-$, $-CF_2-CONH-(CH_2)_3-$, $-CF_2-CONH-(CH_2)_6-$, $-O-CFHCF_2-O-CH_2OCH_2-$, $-O-CFHCF_2-O-CH_2O(CH_2)_2-$, $-O-CFHCF_2-O-CH_2O(CH_2)_3-$, $-O-CFHCF_2-O-CH_2O(CH_2)_6-$, $-CH_2OCH_2-$, $-CH_2O(CH_2)_2$ $-CH_2O(CH_2)_3-$, $-CH_2O(CH_2)_6-$, $-CF_2-CH_2OCH_2-$, $-CF_2-CH_2O(CH_2)_2-$, $-CF_2-CH_2O(CH_2)_3-$, $-CF_2-CH_2O(CH_2)_6-$, $-O-CFHCF_2-O-$, $-O-CFHCF_2-O-(CH_2)_2-$, $-O-CFHCF_2-O-(CH_2)_3-$, $-O-CFHCF_2-O-(CH_2)_6-$, $-CH_2-$, $-(CH_2)_2-$, $-(CH_2)_3-$, $-(CH_2)_6-$ $-CF_2-$, $-(CF_2)_2-$, $-CF_2-CH_2-$, $-CF_2-(CH_2)_2$, $-CF_2-(CH_2)_3-$, $-CF_2-(CH_2)_4-$, $-CF_2-(CH_2)_5-$, and $-CF_2-(CH_2)_6-$.

In a preferred embodiment, $X^5$ is $$-X^{10}-CON(R^{34})-X^{11}-, \text{ or}$$

a $C_{1-6}$ alkylene group (preferably propylene group).

In the formula:

$R^{34}$ is as defined above, and preferably a hydrogen atom or a $C_{1-6}$ alkyl group, more preferably a hydrogen atom or a methyl group, and still more preferably a hydrogen atom;

$X^{10}$ is as defined above, and preferably a single bond, $-R^{36}-$, or an o-, m-, or p-phenylene group, more preferably a single bond or $-R^{36}-$, and still more preferably a single bond;

$R^{36}$ is as defined above, and preferably a $C_{1-20}$ alkylene group which is optionally substituted by one or more fluorine atoms, more preferably a $C_{1-3}$ alkylene group which is optionally substituted by one or more fluorine atoms, and still more preferably a $C_{1-2}$ alkylene group which is optionally substituted by one or more fluorine atoms; and $X^{11}$ is as defined above, and preferably a single bond or a $C_{1-20}$ alkylene group which is optionally substituted by one or more fluorine atoms, more preferably a single bond or a $C_{1-6}$ alkylene group having no substituent, still more preferably a single bond or a $C_{1-3}$ alkylene group having no substituent, and particularly preferably a $C_{1-3}$ alkylene group having no substituent.

In the embodiment, $X^5$ is particularly preferably $-X^{10}-CON(R^{34})-X^{11}-$. In the formula, $R^3$, $X^{10}$, and $X^1$ are as defined above.

In the embodiment, $X^{10}$ is particularly preferably a single bond and $X^{11}$ is particularly preferably a $C_{1-3}$ alkylene group, and $X^{11}$ is still more preferably a $C_{1-3}$ alkylene group having no substituent.

In the formula, $R^d$ each independently at each occurrence represents $-Z^4-CR^{81}_{p2}R^{82}_{q2}R^{83}_{r2}$.

In the formula, $Z^4$ each independently at each occurrence represents an oxygen atom or a divalent organic group.

$Z^4$ is preferably a $C_{1-6}$ alkylene group, $-(CH_2)_g-O-(CH_2)_h-$ (wherein g is an integer of 0 to 6, for example, an integer of 1 to 6, h is an integer of 0 to 6, for example, an integer of 1 to 6) or -phenylene-$(CH_2)_i-$ (wherein i is an integer of 0 to 6), and more preferably a $C_{1-6}$ alkylene group. These groups are optionally substituted by, for example, one or more substituents selected from a fluorine atom, a $C_{1-6}$ alkyl group, a $C_{2-6}$ alkenyl group, and a $C_{2-6}$ alkynyl group.

In the formula, $R^{81}$ each independently at each occurrence represents $R^{d'}$. $R^{d'}$ is as defined for $R^d$.

In $R^d$, the number of C atoms which are linearly linked via the $Z^4$ group is up to five. That is, in $R^d$, when there is at least one $R^{81}$, there are two or more C atoms which are linearly connected via the $Z^4$ group in $R^d$. The number of such C atoms which are linearly connected via the $Z^4$ group is up to five. It is noted that "the number of C atoms which are linearly connected via the $Z^4$ group in $R^d$" is equal to the repeating number of $-Z^4-C-$ which are linearly connected in $R^d$.

In a preferred embodiment, as shown below, "the number of C atoms which are linearly connected via the $Z^4$ group in $R^d$" is 1 (left formula) or 2 (right formula) in all chains.

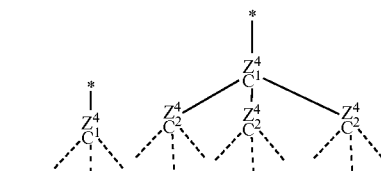

In one embodiment, the number of C atoms which are linearly connected via the $Z^4$ group in $R^d$ is 1 or 2, and preferably 1.

In the formula, $R^{82}$ each independently at each occurrence represents $-Y-SiR^{85}_{n2}R^{86}_{3-n2}$.

Y each independently at each occurrence represents a divalent organic group.

In a preferred embodiment, Y is a $C_{1-6}$ alkylene group, $-(CH_2)_{g'}-O-(CH_2)_{h'}-$ (wherein g' is an integer of 0 to 6, for example, an integer of 1 to 6, h' is an integer of 0 to 6, for example, an integer of 1 to 6) or -phenylene-$(CH_2)_{i'}-$ (wherein i' is an integer of 0 to 6). These groups are optionally substituted by, for example, one or more substituents selected from a fluorine atom, a $C_{1-6}$ alkyl group, a $C_{2-6}$ alkenyl group, and a $C_{2-6}$ alkynyl group.

In one embodiment, Y may be a $C_{1-6}$ alkylene group or -phenylene-$(CH_2)_{i'}-$. When Y is a group as described above, light resistance, especially UV resistance can be further increased. In the formula, i' is an integer of 0 to 6.

Y is preferably a $C_{1-6}$ alkylene group, and more preferably a $C_{2-3}$ alkylene group.

In one embodiment, $X^5$ is preferably $-X^{10}-CON(R^{34})-X^{11}-$ or a $C_{1-6}$ alkylene group (preferably propylene group), and more preferably $-X^{10}-CON(R^{34})-X^{11}-$; and Y is preferably a $C_{1-6}$ alkylene group or -phenylene-$(CH_2)_{i'}-$, and more preferably $C_{1-6}$ alkylene group. $R^{34}$, $X^{10}$, $X^{11}$ and i' are as defined above.

In one embodiment, $X^5$ is preferably $-X^{10}-CON(R^{34})-X^1-$ or a $C_{1-6}$ alkylene group (preferably propylene group), and more preferably $-X^{10}-CON(R^{34})-X^{11}-$; and Y is preferably a $C_{1-6}$ alkylene group or -phenylene-$(CH_2)_{i'}-$, more preferably a $C_{1-6}$ alkylene group, and still more preferably a $C_{2-3}$ alkylene group.

In the formula:

$R^{34}$ is a hydrogen atom, or a $C_{1-6}$ alkyl group, preferably a hydrogen atom, or a methyl group, and more preferably a hydrogen atom;

$X^{10}$ is a single bond, $-R^{36}-$, or an o-, m-, or p-phenylene group, preferably a single bond or $-R^{36}-$, and more preferably a single bond;

$R^{36}$ is a $C_{1-20}$ alkylene group which is optionally substituted by one or more fluorine atoms, preferably a $C_{1-3}$ alkylene group which is optionally substituted by one or more fluorine atoms, and more preferably a $C_{1-2}$ alkylene group which is optionally substituted by one or more fluorine atoms;

$X^{11}$ is a single bond or a $C_{1-20}$ alkylene group which is optionally substituted by one or more fluorine atoms, preferably a single bond or a $C_{1-6}$ alkylene group having no substituent, more preferably a single bond or a $C_{1-3}$ alkylene group having no substituent, and particularly preferably a $C_{1-3}$ alkylene group having no substituent; and i' is an integer of 0 to 6.

In the embodiment, $X^{10}$ is particularly preferably a single bond and $X^{11}$ is particularly preferably a $C_{1-3}$ alkylene group, and $X^{11}$ is still more preferably a $C_{1-3}$ alkylene group having no substituent. More preferably, $X^5$ is $-X^{10}-CON(R^{34})-X^{11}-$.

$R^{85}$ each independently at each occurrence represents a hydroxyl group or a hydrolyzable group. The "hydrolyzable group" is as defined above.

$R^{85}$ is preferably $-OR$ (wherein R represents a substituted or unsubstituted $C_{1-3}$ alkyl group, more preferably a methyl group or an ethyl group, and particularly a methyl group).

$R^{86}$ each independently at each occurrence represents a hydrogen atom or a lower alkyl group. The lower alkyl group is preferably an alkyl group having 1 to 20 carbon atoms, more preferably an alkyl group having 1 to 6 carbon atoms, and still more preferably a methyl group.

n2 independently represents an integer of 0 to 3, preferably an integer of 1 to 3, more preferably 2 or 3, and particularly preferably 3 for each $(-Y-SiR^{85}{}_{n2}R^{86}{}_{3-n2})$ unit.

$R^{83}$ each independently at each occurrence represents a hydrogen atom, a hydroxyl group, or a lower alkyl group, and preferably represents a hydrogen atom or a lower alkyl group. The lower alkyl group is preferably an alkyl group having 1 to 20 carbon atoms, more preferably an alkyl group having 1 to 6 carbon atoms, and still more preferably a methyl group.

In the formula, p2 is each independently at each occurrence an integer of 0 to 3; q2 is each independently at each occurrence an integer of 0 to 3; and r2 is each independently at each occurrence an integer of 0 to 3. In each $(-Z^4-CR^{81}{}_{p2}R^{82}{}_{q2}R^{83}{}_{r2})$, the sum of p2, q2, and r2 is 3.

In the formula, $R^e$ each independently at each occurrence represents $-Y-SiR^{83}{}_{n2}R^{86}{}_{3-n2}$. Here, Y, $R^{85}$, $R^{86}$, and n2 are as described in $R^{82}$.

In the formula, $R^f$ each independently at each occurrence represents a hydrogen atom, a hydroxyl group, or a lower alkyl group, and preferably represents a hydrogen atom or a lower alkyl group. The lower alkyl group is preferably an alkyl group having 1 to 20 carbon atoms, more preferably an alkyl group having 1 to 6 carbon atoms, and still more preferably a methyl group.

In the formula, k2 is each independently at each occurrence an integer of 0 to 3; 12 is each independently at each occurrence an integer of 0 to 3; and m2 is each independently at each occurrence an integer of 0 to 3. The sum of k, 12, and m2 is 3.

In the formulae (C1) and (C2), there is at least one group represented by $-Y-SiR^{85}$. By having such a configuration, the PFPE-containing silane compound can form a surface-treating layer having good UV durability, water-repellency, oil-repellency, antifouling property (for example, preventing adhesion of fouling such as fingerprints), heat resistance, high friction durability, hydrolysis resistance, chemical resistance, moisture-proof property, and the like.

In a preferred embodiment, in the formulae (C1) and (C2), there are two or more groups represented by $-Y-SiR^{85}$. Specifically, there are two or more groups represented by $-Y-SiR^{85}{}_{n2}R^{86}{}_{3-n2}$ (n2 is an integer of 1 to 3). Preferably, in the formulae (C1) and (C2), there are at least two groups represented by $-Y-SiR^{85}{}_{n2}R^{86}{}_{3-n2}$ in which n2 is 2 or more. That is, preferably, in the formulae (C1) and (C2), there are at least two groups represented by $-Y-SiR^{85}{}_2R^{86}$ or $-Y-SiR^{85}{}_3$. By having such a configuration, the PFPE-containing silane compound can form a surface-treating layer having better UV durability, water-repellency, oil-repellency, antifouling property (for example, preventing adhesion of fouling such as fingerprints), heat resistance, high friction durability, hydrolysis resistance, chemical resistance, moisture-proof property, and the like, in particular, good UV durability, high friction durability, chemical resistance, and the like.

In one embodiment, in the formulae (C1) and (C2), n2 is an integer of 1 to 3 and at least one q2 is preferably 2 or 3 or at least one 12 is preferably 2 or 3. That is, in the formula, there are preferably at least two $-Y-SiR^{85}{}_{n2}R^{86}{}_{3-n2}$ groups.

In the formulae (C1) and (C2), the unit $(-Y-SiR^{85}{}_{n2}R^{86}{}_{3-n2})$ is preferably $(-Y-SiR^{86}{}_2R^{86})$ or $(-Y-SiR^{85}{}_3)$, and more preferably $(-Y-SiR^{85}{}_3)$.

In a preferred embodiment, in $R^{d_t}$ at the end of $R^d$ ($R^d$ when there is no $R^{d_t}$), q2 is preferably 2 or more, for example, 2 or 3, and more preferably 3. In this embodiment, more preferably q2 is 2 or more, for example 2 or 3, and n2 is an integer of 2 or 3, still more preferably q2 is 2 or more, for example 2 or 3, and n2 is 3, and particularly preferably q2 is 3 and n2 is 3.

In a preferred embodiment, at least one of the ends of $R^d$ may be $-C(-Y-SiR^{85}{}_{n2}R^{86}{}_{3-n2})_2$ (specifically, $-C(-Y-SiR^{85}{}_{n2}R^{86}{}_{3-n2})_2R^{83}$) or $-C(-Y-SiR^{85}{}_{n2}R^{86}{}_{3-n2})$, and preferably $-C(-Y-SiR^{85}{}_{n2}R^{86}{}_{3-n2})_3$. In the formula, the unit $(-Y-SiR^{85}{}_{n2}R^{86}{}_{3-n2})$ is $(-Y-SiR^{85}{}_2R^{86})$ or $(-Y-SiR^{85}{}_3)$, and preferably $(-Y-SiR^{85}{}_3)$. In a still more preferred embodiment, all ends in $R^d$ may be $-C(-Y-SiR^{85}{}_{n2}R^{86}{}_{3-n2})_3$ and n2 may be an integer of 2 or 3, and preferably $-C(-Y-SiR^{85}{}_3)_3$.

In a more preferred embodiment, the end of groups represented by $(CR^d{}_{k2}R^e{}_{l2}R^f{}_{m2})$ is $C(-Y-SiR^{85}{}_{n2}R^{86}{}_{3-n2})_2R^{83}$, $C(-Y-SiR^{85}{}_{n2}R^{86}{}_{3-n2})_2R^f$, or $C(-Y-SiR^{85}{}_{n2}R^{86}{}_{3-n2})_3$, preferably $C(-Y-SiR^{85}{}_{n2}R^{86}{}_{3-n2})_2R^f$ or $C(-Y-SiR^{85}{}_{n2}R^{86}{}_{3-n2})_3$, and more preferably $C(-Y-SiR^{85}{}_{n2}R^{86}{}_{3-n2})_3$. Here, n2 is an integer of 1 to 3. In the formula, the unit $(-Y-SiR^{85}{}_{n2}R^{86}{}_{3-n2})$ is preferably $(-Y-SiR^{85}{}_3)$. In a still more preferred embodiment, all ends in the group may be $-C(-Y-SiR^{85}{}_{n2}R^{86}{}_{3-n2})_3$, and preferably $-C(-Y-SiR^{85}{}_3)_3$.

In one embodiment, there are one to three $R^e$ (i.e., 12 is an integer of 1 to 3), preferably two or three $R^e$ (i.e., 12 is 2 or 3), and more preferably three $R^e$ (i.e., 12 is 3). In this embodiment, n2 is 2 or 3, and preferably 3. More preferably, 12 is 2 or 3 and n2 is 2 or 3, and still more preferably, 12 is 3 and n2 is 3.

In one embodiment, there are one to three $R^e$ (i.e., 12 is an integer of 1 to 3), preferably two or three $R^e$ (i.e., 12 is 2 or 3), and more preferably three $R^e$ (i.e., 12 is 3). In this embodiment, $R^e$ is $(-Y-SiR^{85}{}_2R^{86})$ or $(-Y-SiR^{85}{}_3)$, and preferably $(-Y-SiR^{85}{}_3)$. More preferably, 12 is 2 or 3, and $R^e$ is $(-Y-SiR^{85}{}_2R^{86})$ or $(-Y-SiR^{85}{}_3)$, and still more preferably, 12 is 3 and $R^e$ is $(-Y-SiR^{85}{}_3)$.

In one embodiment, at least one k2 is 2 or 3, and preferably 3. In this embodiment, in $R^{d_t}$ at the end of $R^d$ ($R^d$ when there is no $R^{d_t}$), there are two or more $R^{82}$ (i.e., q2 is 2 or more), for example, there are two or three $R^{82}$ (i.e., q2 is 2 or 3), and $R^{82}$ is $(-Y-SiR^{85}{}_2R^{86})$ or $(-Y-SiR^{85}{}_3)$, and preferably, $(-Y-SiR^{85}{}_3)$. More preferably, there are three $R^{82}$ (i.e., q2 is 3) and $R^{82}$ is $(-Y-SiR^{85}{}_2R^{86})$ or $(-Y-SiR^{85}{}_3)$, and particularly preferably, there are three $R^{82}$ (i.e., q2 is 3) and $R^{82}$ is $(-Y-SiR^{85}{}_3)$.

In one embodiment, k2 is 2 or 3, and preferably 3. In this embodiment, in $R^{d_t}$ at the end of $R^d$ ($R^d$ when there is no $R^{d_t}$), there are two or three $R^{82}$ and $R^{82}$ is $(-Y-SiR^{85}{}_2R^{86})$ or $(-Y-SiR^{85}{}_3)$. More preferably, there are two or three $R^{82}$ and $R^{82}$ is $(-Y-SiR^{85}{}_3)$, and particularly preferably, there are three $R^{82}$ and $R^{82}$ is $(-Y-SiR^{85}{}_3)$.

Examples of the PFPE-containing silane compound represented by the preferable formula (C1) include the following compounds. In the following, Rf is as defined above (for example, $CF_3CF_2CF_2$), and d is 5 to 40.

$Rf-(OCF(CF_3)CF_2)_dOCF(CF_3)CONHCH_2C(CH_3)$
$(CH_2CH_2CH_2Si(OCH_3)_3)_2$, $Rf-(OCF(CF_3)CF_2)_dOCF(CF_3)CONHCH_2C$
$(CH_2CH_2CH_2Si(OCH_3)_3)_3$, $Rf-(OCF(CF_3)CF_2)_dOCF(CF_3)CH_2OCH_2C(CH_3)$
$(CH_2CH_2CH_2Si(OCH_3)_3)_2$, $Rf-(OCF(CF_3)CF_2)_dOCF(CF_3)CH_2OCH_2C$
$(CH_2CH_2CH_2Si(OCH_3)_3)_3$, $Rf-(OCF(CF_3)CF_2)_dOCF(CF_3)CH_2OCH_2C(CH_3)$
$(CH_2OCH_2CH_2CH_2Si(OCH_3)_3)_2$, $Rf-(OCF(CF_3)CF_2)_dOCF(CF_3)CH_2CH_2C$
$(CH_2OCH_2CH_2CH_2Si(OCH_3)_3)_3$, $Rf-(OCF(CF_3)CF_2)_dOCF(CF_3)-CH_2CH_2CH_2-C$
$(CH_3)(CH_2CH_2CH_2Si(OCH_3)_3)_2$, $Rf-(OCF(CF_3)CF_2)_dOCF(CF_3)-CH_2CH_2CH_2-C$
$(CH_2CH_2CH_2Si(OCH_3)_3)_3$

The number average molecular weight of the compounds represented by the formulae (C1) and (C2) may be, for example, but not limited to, a number average molecular weight of $5\times10^2$ to $1\times10^5$. Within this range, the number average molecular weight is preferably 1,000 to 30,000, more preferably 1,000 to 12,000, and still more preferably 1,000 to 6,000. In the present disclosure, the number average molecular weight is a value measured by $^{19}$F-NMR.

In one embodiment, the compounds represented by the formulae (C1) and (C2) have a number average molecular weight of 1,000 to 8,000, and preferably 1,000 to 4,000. By having such a number average molecular weight, a layer (for example, a surface-treating layer) formed by using the compound (or a surface-treating agent containing the compound) can be further improved in slip suppression effect, abrasion resistance, and the like.

In one embodiment,

PFPE is each independently a group represented by the formula:

$-(OCF(CF_3)CF_2)_d-$ (wherein d is an integer of 1 or more and 200 or less, preferably 5 or more and 200 or less, and more preferably 10 or more and 200 or less);

$X^5$ is a single bond, $-X^f-X^{10}-CON(R^{34})-X^{11}-$, $-X^f-X^{10}-(OR^{35})_{n4}-X^{11}-$, or $-X^f-C_{1-6}$ alkylene group (preferably propylene group);

$X^f$ is each independently at each occurrence a single bond or an alkylene group having 1 to 6 carbon atoms, preferably a single bond or an alkylene group having 1 to 4 carbon atoms, and more preferably a single bond or an alkylene group having 1 to 2 carbon atoms (for example, a methylene group), wherein the hydrogen atom in $X^f$ is optionally substituted by one or more substituents selected from a fluorine atom, a $C_{1-3}$ alkyl group, and a $C_{1-3}$ fluoroalkyl group, and preferably substituted;

$X^{10}$ is each independently at each occurrence a single bond, $-O-R^{36}-O-$, $-R^{36}-$, or an o-, m-, or p-phenylene group, preferably a single bond, $-O-R^{36}-O-$, or $-R^{36}-$, more preferably a single bond or $-R^{36}-$, and still more preferably a single bond;

$R^{36}$ is a $C_{1-20}$ alkylene group which is optionally substituted by one or more fluorine atoms, preferably a $C_{1-3}$ alkylene group which is optionally substituted by one or more fluorine atoms, and still more preferably a $C_{1-2}$ alkylene group which is optionally substituted by one or more fluorine atoms, wherein the alkylene group in $R^{36}$ may be linear or may have a branched structure;

$X^{11}$ is each independently at each occurrence a single bond, an oxygen atom, or a $C_{1-20}$ alkylene group which is optionally substituted by one or more fluorine atoms, preferably a single bond or a $C_{1-6}$ alkylene group having no substituent, more preferably a single bond or a $C_{1-3}$ alkylene group having no substituent, and particularly preferably a $C_{1-3}$ alkylene group having no substituent;

$R^{34}$ is each independently at each occurrence a hydrogen atom, a phenyl group, or a $C_{1-6}$ alkyl group, preferably a hydrogen atom or a $C_{1-6}$ alkyl group, more preferably a hydrogen atom or a methyl group, and still more preferably a hydrogen atom;

$R^{35}$ is each independently at each occurrence a $C_{1-6}$ alkylene group, and preferably a $C_{1-3}$ alkylene group;

n4 is each independently at each occurrence an integer of 1 to 5, preferably an integer of 1 to 3, and more preferably 1;

Y is each independently at each occurrence —$(CH_2)_{g'}$—O—$(CH_2)_{h'}$— (wherein g' is an integer of 0 to 6, h' is an integer of 0 to 6, for example an integer of 1 to 6) or a $C_{1-6}$ alkylene group (preferably a $C_{2-3}$ alkylene group);

l2 is 3; and n2 is 3.

In the embodiment, g' may be 0.

In one embodiment,

PFPE is each independently a group represented by the formula:

$$—(OCF(CF_3)CF_2)_d—$$

(wherein d is an integer of 1 or more and 200 or less, preferably 5 or more and 200 or less, and more preferably 10 or more and 200 or less);

$X^5$ is a single bond;

Y is each independently at each occurrence —$(CH_2)_{g'}$—O—$(CH_2)_{h'}$— (wherein g' is an integer of 0 to 6, for example, g' is 0, h' is an integer of 0 to 6, for example, an integer of 1 to 6) or a $C_{1-6}$ alkylene group (preferably a $C_{2-3}$ alkylene group);

l2 is 3; and n2 is 3.

In a preferred embodiment, in the formulae (C1) and (C2), PFPE is each independently a group represented by the formula:

$$—(OCF(CF_3)CF_2)_d—$$

(wherein d is an integer of 1 or more and 200 or less, preferably 5 or more and 200 or less, and more preferably 10 or more and 200 or less);

$X^5$ is each independently at each occurrence —$X^f$—$X^{10}$—CON($R^{34}$)—$X^{11}$—, —$X^f$—$X^{10}$—$(OR^{35})_{n4}$—$X^{11}$—, or —$X^f$—$C_{1-6}$ alkylene group (preferably propylene group), and preferably —$X^f$—$X^{10}$—CON($R^{34}$)—$X^{11}$—;

$X^f$ is each independently at each occurrence a single bond or an alkylene group having 1 to 6 carbon atoms, preferably a single bond or an alkylene group having 1 to 4 carbon atoms, and more preferably a single bond or an alkylene group having 1 to 2 carbon atoms (for example, a methylene group), wherein the hydrogen atom in $X^f$ is optionally substituted by one or more substituents selected from a fluorine atom, a $C_{1-3}$ alkyl group, and a $C_{1-3}$ fluoroalkyl group, and preferably substituted;

$X^{10}$ is each independently at each occurrence a single bond, —O—$R^{36}$—O—, —$R^{36}$—, or an o-, m-, or p-phenylene group, preferably a single bond, —O—$R^{36}$—O—, or —$R^{36}$—, more preferably a single bond or —$R^{36}$—, and still more preferably a single bond;

$R^{36}$ is a $C_{1-20}$ alkylene group which is optionally substituted by one or more fluorine atoms, preferably a $C_{1-3}$ alkylene group which is optionally substituted by one or more fluorine atoms, and still more preferably a $C_{1-2}$ alkylene group which is optionally substituted by one or more fluorine atoms, wherein the alkylene group in $R^{36}$ may be linear or may have a branched structure;

$X^{11}$ is each independently at each occurrence a single bond, an oxygen atom, or a $C_{1-20}$ alkylene group which is optionally substituted by one or more fluorine atoms, preferably a single bond or a $C_{1-6}$ alkylene group having no substituent, more preferably a single bond or a $C_{1-3}$ alkylene group having no substituent, and particularly preferably a $C_{1-3}$ alkylene group having no substituent;

$R^{34}$ is each independently at each occurrence a hydrogen atom, a phenyl group, or a $C_{1-6}$ alkyl group, preferably a hydrogen atom or a $C_{1-6}$ alkyl group, more preferably a hydrogen atom or a methyl group, and still more preferably a hydrogen atom;

$R^{35}$ is each independently at each occurrence a $C_{1-3}$ alkylene group, and preferably a $C_{1-3}$ alkylene group;

n4 is each independently at each occurrence an integer of 1 to 5, preferably an integer of 1 to 3, and more preferably 1; and Y is a $C_{1-6}$ alkylene group, and preferably a $C_{2-3}$ alkylene group.

In a preferred embodiment, the compounds represented by the formulae (C1) and (C2) are compounds represented by the formula (C1).

In one embodiment, the PFPE-containing silane compound represented by the formula (C1) or the formula (C2) may be produced by combining known methods.

In one embodiment, the PFPE-containing silane compound is a compound represented by the formula (B1), the formula (B2), the formula (C1), or the formula (C2).

In the embodiment, the formula (B1) is preferably represented by the following formula (B").

$$Rf\text{-}PFPE\text{-}X^3—SiR^a_{k1}R^b_{l1}R^c_{m1} \tag{B1''}$$

In the formula (B1''):

Rf is independently at each occurrence a $CF_2H$—$C_{1-15}$ fluoroalkylene group or a $C_{1-16}$ perfluoroalkyl group, and preferably a $C_{1-16}$ perfluoroalkyl group;

PFPE is —$(OC_3F_6)_d$— and has at least one branched structure in PFPE, and preferably —$(OCF_2CF(CF_3))_d$;

d is an integer of 1 or more and 200 or less, preferably 5 or more and 200 or less, and more preferably 10 or more and 200 or less;

$X^3$ is —$X^f$—$X^{10}$—CON($R^{34}$)—$X^{11}$—, —$X^f$—$X^{10}$—$(OR^{35})_{n4}$—$X^{11}$—, or —$X^f$—$C_{1-6}$ alkylene group (preferably propylene group), and preferably —$X^f$—$X^{10}$—CON($R^{34}$)—$X^{11}$—;

$X^f$ is each independently at each occurrence a single bond or an alkylene group having 1 to 6 carbon atoms, preferably a single bond or an alkylene group having 1 to 4 carbon atoms, and more preferably a single bond or an alkylene group having 1 to 2 carbon atoms (for example, a methylene group), wherein the hydrogen atom in $X^f$ is optionally substituted by one or more substituents selected from a fluorine atom, a $C_{1-3}$ alkyl group, and a $C_{1-3}$ fluoroalkyl group, and preferably substituted;

$X^{10}$ is each independently at each occurrence a single bond, —O—$R^{36}$—O—, —$R^{36}$—, or an o-, m-, or p-phenylene group, preferably a single bond, —O—$R^{36}$—O—, or —$R^{36}$—, more preferably a single bond or —$R^{36}$—, and still more preferably a single bond;

$R^{36}$ is a $C_{1-20}$ alkylene group which is optionally substituted by one or more fluorine atoms, preferably a $C_{1-3}$ alkylene group which is optionally substituted by one or more fluorine atoms, and still more preferably a $C_{1-2}$ alkylene group which is optionally substituted by one or more fluorine atoms, wherein the alkylene group in $R^{36}$ may be linear or may have a branched structure;

$X^{11}$ is each independently at each occurrence a single bond, an oxygen atom, or a $C_{1-20}$ alkylene group which is optionally substituted by one or more fluorine atoms, preferably a single bond or a $C_{1-6}$ alkylene group having no substituent, more preferably a single bond or a $C_{1-3}$ alkylene group having no substituent, and particularly preferably a $C_{1-3}$ alkylene group having no substituent;

$R^{34}$ is each independently at each occurrence a hydrogen atom, a phenyl group, or a $C_{1-6}$ alkyl group, preferably a hydrogen atom or a $C_{1-6}$ alkyl group, more preferably a hydrogen atom or a methyl group, and still more preferably a hydrogen atom;

$R^{35}$ is each independently at each occurrence a $C_{1-6}$ alkylene group, and preferably a $C_{1-3}$ alkylene group;

n4 is each independently at each occurrence an integer of 1 to 5, preferably an integer of 1 to 3, and more preferably 1;

$R^a$ each independently at each occurrence represents —$Z^3$—$SiR^{71}_{p1}R^{72}_{q1}R^{73}_{r1}$;

$Z^3$ is preferably a $C_{1-6}$ alkylene group or -phenylene-$(CH_2)_i$—, more preferably a $C_{1-6}$ alkylene group, and still more preferably a $C_{1-3}$ alkylene group;

$R^{72}$ is a hydrolyzable group, and more preferably —OR (wherein R represents a substituted or unsubstituted $C_{1-3}$ alkyl group, and more preferably a methyl group);

p1 is 0, q1 is 3, and r1 is 0; and k1 is 3 and 11 and m1 are 0.

In the embodiment, $X^3$ may be a group represented by —$X^f$—$X^{10}$—$(OR^{35})_{n4}$—$X^{11}$—. In the formula, $X^f$, $X^{10}$, $X^{11}$, $R^{35}$, and n4 are as defined above.

In the embodiment, the formula (B2) is preferably represented by the following formula (B2″).

$$R^c_{m1}R^b_{l1}R^a_{k1}Si—X^3—PFPE-X^3—SiR^a_{k1}R^b_{l1}R^c_{m1} \qquad (B2″)$$

In the formula (B2″), each symbol is as defined in the formula (B1″).

In the embodiment, the formula (C1) is preferably represented by the following formula (C1″).

$$Rf-PFPE-X^5—CR^d_{k2}R^e_{l2}R^f_{m2} \qquad (C1″)$$

In the formula (C1″);

Rf is independently at each occurrence a $CF_2H$—$C_{1-3}$ fluoroalkylene group or a $C_{1-16}$ perfluoroalkyl group, and preferably a $C_{1-16}$ perfluoroalkyl group;

PFPE is —$(OC_3F_6)_d$— and has at least one branched structure in PFPE, and preferably —$(OCF_2CF(CF_3)_d$;

d is an integer of 1 or more and 200 or less, preferably 5 or more and 200 or less, and more preferably 10 or more and 200 or less;

$X^5$ is —$X^f$—$X^{10}$—$CON(R^{34})$—$X^{11}$—, —$X^f$—$X^{10}$—$(OR^{35})_{n4}$—$X^{11}$—, or —$X^f$—$C_{1-6}$ alkylene group (preferably propylene group), and preferably —$X^f$—$X^{10}$—$CON(R^{34})$—$X^{11}$—;

$X^f$ is each independently at each occurrence a single bond or an alkylene group having 1 to 6 carbon atoms, preferably a single bond or an alkylene group having 1 to 4 carbon atoms, and more preferably a single bond or an alkylene group having 1 to 2 carbon atoms (for example, a methylene group), wherein the hydrogen atom in $X^f$ is optionally substituted by one or more substituents selected from a fluorine atom, a $C_{1-3}$ alkyl group, and a $C_{1-3}$ fluoroalkyl group, and preferably substituted;

$X^{10}$ is each independently at each occurrence a single bond, —O—$R^{36}$—O—, —$R^{36}$—, or an o-, m-, or p-phenylene group, preferably a single bond, —O—$R^{36}$—O—, or —$R^{36}$—, more preferably a single bond or —$R^{36}$—, and still more preferably a single bond;

$R^{36}$ is a $C_{1-20}$ alkylene group which is optionally substituted by one or more fluorine atoms, preferably a $C_{1-3}$ alkylene group which is optionally substituted by one or more fluorine atoms, and still more preferably a $C_{1-2}$ alkylene group which is optionally substituted by one or more fluorine atoms, wherein the alkylene group in $R^3$ may be linear or may have a branched structure;

$X^{11}$ is each independently at each occurrence a single bond, an oxygen atom, or a $C_{1-20}$ alkylene group which is optionally substituted by one or more fluorine atoms, preferably a single bond or a $C_{1-6}$ alkylene group having no substituent, more preferably a single bond or a $C_{1-3}$ alkylene group having no substituent, and particularly preferably a $C_{1-3}$ alkylene group having no substituent;

$R^{34}$ is each independently at each occurrence a hydrogen atom, a phenyl group, or a $C_{1-6}$ alkyl group, preferably a hydrogen atom or a $C_{1-6}$ alkyl group, more preferably a hydrogen atom or a methyl group, and still more preferably a hydrogen atom;

$R^{35}$ is each independently at each occurrence a $C_{1-6}$ alkylene group, and preferably a $C_{1-3}$ alkylene group;

n4 is each independently at each occurrence an integer of 1 to 5, preferably an integer of 1 to 3, and more preferably 1;

k2 is 0, l2 is 3, and m2 is 0;

$R^e$ is represented by —Y—$SiR^{85}_{n2}R^{86}_{3-n2}$;

Y is a $C_{1-6}$ alkylene group, and preferably a $C_{2-3}$ alkylene group;

$R^{85}$ each independently at each occurrence represents a hydroxyl group or a hydrolyzable group, and preferably —OR (wherein R represents a substituted or unsubstituted $C_{1-3}$ alkyl group, more preferably a methyl group or an ethyl group, and particularly a methyl group); and n2 is 3.

In the embodiment, the formula (C2) is preferably represented by the following formula (C2″).

$$R^f_{m2}R^e_{l2}R^d_{k2}C—X^5—PFPE-X^5—CR^d_{k2}R^e_{l2}R^f_{m2} \qquad (C2″)$$

In the formula (C2″), each symbol is as defined in the formula (C1″).

In one embodiment, the PFPE-containing silane compound is a compound represented by the formula (C1) or the formula (C2).

In the embodiment, preferably, the compound represented by the formula (C1) is a compound represented by the formula (C1″) and the compound represented by the formula (C2) is a compound represented by the formula (C2″).

In a preferred embodiment, the PFPE-containing silane compound is a compound represented by the formula (B1) or (C1).

More preferably, the PFPE-containing silane compound is a compound represented by the formula (C1).

In the embodiment, preferably, the compound represented by the formula (C1) is a compound represented by the formula (C1″).

Methods suitable for producing PFPE-containing silane compounds are described below by way of example, but the methods of the present disclosure are not limited to the following.

In one embodiment, a method suitable for producing the PFPE-containing silane compound represented by the formula (C1) or (C2) and including the following steps will be described.

Step (3):

a step of reacting a compound represented by the formula (c1-3) or the formula (c2-3):

$$\mathrm{Rf\!-\!\!-\!PFPE\!-\!\!-\!X^{10}\!-\!\underset{\underset{O}{\|}}{C}\!-\!\underset{\underset{R^{34}}{|}}{N}\!-\!X^{11}\!-\!C(Y^{11}\!-\!CH\!=\!CH_2)_3} \quad \text{(c1-3)}$$

$$\mathrm{(CH_2\!=\!CH\!-\!Y^{11})_3C\!-\!X^{11}\!-\!\underset{\underset{R^{34}}{|}}{N}\!-\!\underset{\underset{O}{\|}}{C}\!-\!X^{10}\!-\!PFPE\!-\!X^{10}\!-\!\underset{\underset{O}{\|}}{C}\!-\!\underset{\underset{R^{34}}{|}}{N}\!-\!X^{11}\!-\!C(Y^{11}\!-\!CH\!=\!CH_2)_3} \quad \text{(c2-3)}$$

wherein:

Rf each independently at each occurrence represents an alkyl group having 1 to 16 carbon atoms which is optionally substituted by one or more fluorine atoms;

PFPE is represented by $(-OCF(CF_3)CF_2-)_d$;

d is an integer of 2 or more and 200 or less;

$X^{10}$ is each independently at each occurrence a single bond or a divalent organic group;

$R^{34}$ is each independently at each occurrence a hydrogen atom or a $C_{1-6}$ alkyl group;

$X^{11}$ is each independently at each occurrence a single bond or a divalent organic group; and $Y^{11}$ is each independently at each occurrence a single bond or a divalent organic group, with $HSiM'_3$, wherein:

M' is each independently a halogen atom or a $C_{1-6}$ alkoxy group, and, optionally, a compound represented by the formula: $R^{85}{}_iL'$ wherein:

$R^{85}$ each independently at each occurrence represents a hydroxyl group or a hydrolyzable group;

L' represents a group capable of binding to $R^{85}$; and i is an integer of 1 to 3, and/or a compound represented by the formula: $R^{86'}{}_jL''$ wherein:

$R^{86'}$ represents a $C_{1-22}$ alkyl group;

L'' represents a group capable of binding to $R^{86'}$; and j is an integer of 1 to 3, In the embodiment, preferably, the compound represented by the formula (c1-3) or the formula (c2-3) is produced by a method including the following steps (1) and (2).

Step (1):

a step of reacting a compound represented by the formula (c1-1) or the formula (c2-1):

$$\mathrm{Rf\text{-}PFPE\text{-}X^{10}\!-\!C(O)OH} \quad \text{(c1-1)}$$

$$\mathrm{HOC(O)\!-\!X^{10}\!-\!PFPE\text{-}X^{10}\!-\!C(O)OH} \quad \text{(c2-1)}$$

wherein:

Rf, PFPE, and $X^{10}$ are as defined above, with $SOM_2$, wherein M is each independently at each occurrence a chlorine atom or a fluorine atom, to obtain a compound represented by the formula (c1-2) or the formula (c2-2):

$$\mathrm{Rf\!-\!\!-\!PFPE\!-\!\!-\!X^{10}\!-\!\underset{\underset{O}{\|}}{C}\!-\!M} \quad \text{(c1-2)}$$

$$\mathrm{M\!-\!\underset{\underset{O}{\|}}{C}\!-\!X^{10}\!-\!PFPE\!-\!X^{10}\!-\!\underset{\underset{O}{\|}}{C}\!-\!M} \quad \text{(c2-2)}$$

wherein:

Rf, PFPE, $X^{10}$, and M are as defined above; and

Step (2):

a step of reacting the compound represented by the formula (c1-2) or the formula (c2-2) with a compound represented by the formula:

$$\mathrm{HN(R^{34})\!-\!X^{11}\!-\!C(Y^{11}\!-\!CH\!=\!CH_2)_3,}$$

wherein $R^{34}$, $X^{11}$, and $Y^{11}$ are as defined above, to obtain a compound represented by the formula (c1-3) or the formula (c2-3):

$$\mathrm{Rf\!-\!\!-\!PFPE\!-\!\!-\!X^{10}\!-\!\underset{\underset{O}{\|}}{C}\!-\!\underset{\underset{R^{34}}{|}}{N}\!-\!X^{11}\!-\!C(Y^{11}\!-\!CH\!=\!CH_2)_3} \quad \text{(c1-3)}$$

$$\mathrm{(CH_2\!=\!CH\!-\!Y^{11})_3C\!-\!X^{11}\!-\!\underset{\underset{R^{34}}{|}}{N}\!-\!\underset{\underset{O}{\|}}{C}\!-\!X^{10}\!-\!PFPE\!-\!X^{10}\!-\!\underset{\underset{O}{\|}}{C}\!-\!\underset{\underset{R^{34}}{|}}{N}\!-\!X^{11}\!-\!C(Y^{11}\!-\!CH\!=\!CH_2)_3} \quad \text{(c2-3)}$$

wherein Rf, PFPE, $X^{10}$, $R^{34}$, and $X^{11}$ are as defined above.

The above producing method will be described in detail below.

It is noted that $-X^{10}-C(O)N(R^{34})-X^{11}-$ corresponds to $X^5$ in the formulae (C1) and (C2) and $-Y^{11}-CH_2CH_2-$ corresponds to Y in the formulae (C1) and (C2).

Step (1):

In the formula (c1-1) or the formula (c2-1), Rf is as defined above.

In the formula (c1-1) or the formula (c2-1), PFPE is as defined above, and is preferably a group represented by the formula: $—(OC_3F_6)_d—$, and more preferably a group represented by the formula: $—(OCF(CF_3)CF_2)_d—$. In the formula, d is an integer of 1 or more and 200 or less, preferably 5 or more and 200 or less, and more preferably 10 or more and 200 or less.

In the formula (c1-1) or the formula (c2-1), $X^{10}$ is each independently at each occurrence a single bond or a divalent organic group, preferably a single bond or a $C_{1-6}$ alkylene group which is optionally substituted by one or more fluorine atoms, and more preferably a $C_{1-3}$ alkylene group which is optionally substituted by one or more fluorine atoms.

The compound represented by the formula (c1-1) or the formula (c2-1) is commercially available, or may be produced from a commercially available compound using conventional techniques in the art.

In $SOM_2$ used in step (1), M is each independently at each occurrence a chlorine atom or a fluorine atom, and preferably a chlorine atom. The compound is commercially available, or may be produced from a commercially available compound using conventional techniques in the art.

The amount of $SOM_2$ used in step (1) is preferably 1 mol or more per mol of the terminal COOH group (as the total amount when two or more compounds are used; the same applies below) of the compound represented by the formula (c1-1) and/or the formula (c2-1).

The reaction of step (1) is preferably carried out in the presence of a suitable catalyst in a suitable solvent.

Examples of the suitable catalyst include N,N-dimethylformamide (DMF).

The suitable solvent is not limited as long as it does not adversely affect the reaction, and examples thereof include 1,3-bis(trifluoromethyl)benzene, perfluorobutyl ethyl ether, and perfluorohexyl methyl ether.

The reaction temperature in such a reaction is usually, but not limited to, 0 to 150° C., and preferably 80 to 100° C., and the reaction time is usually, but not limited to, 30 to 600 minutes, and preferably 60 to 120 minutes, and the reaction pressure is, but not limited to, –0.2 to 1 MPa (gauge pressure), and is conveniently atmospheric pressure.

Step (2):

In the compound: $HN(R^{34})—X^{11}—C(Y^{11}—CH=CH_2)_3$ used in step (2), $X^{11}$ is a single bond or a divalent organic group, preferably a single bond or a $C_{1-6}$ alkylene group which is optionally substituted by one or more fluorine atoms, and more preferably a $C_{1-3}$ alkylene group.

In the formula, $R^{34}$ is each independently at each occurrence a hydrogen atom, a phenyl group, or a $C_{1-6}$ alkyl group, preferably a hydrogen atom or a $C_{1-6}$ alkyl group, more preferably a hydrogen atom or a methyl group, and still more preferably a hydrogen atom.

In the formula, $Y^{11}$ is each independently at each occurrence a single bond or a divalent organic group. $Y^{11}$ is preferably an alkylene group having 1 to 6 carbon atoms, and more preferably an alkylene group having 1 to 3 carbon atoms.

Specific examples of the compound: $HN(R^{34})—X^{11}—C(Y^{11}—CH=CH_2)_3$ used in step (2) include $H_2NCH_2C(CH_2—CH=CH_2)_3$, $H_2NCH_2CH_2C(CH_2—CH=CH_2)_3$, and $H_2NCH_2CH_2CH_2C(CH_2—CH=CH_2)_3$.

The amount of the compound represented by the formula: $HN(R^{34})—X^{11}—C(Y^{11}—CH=CH_2)$ is preferably 1 mol or more per mol of the terminal —C(O)M group of the compound represented by the formula (c1-2) and/or the formula (c2-2).

The reaction of step (2) is preferably carried out in the presence of a suitable catalyst in a suitable solvent.

Examples of suitable catalyst include triethylamine and diisopropylethylamine.

The suitable solvent is not limited as long as it does not adversely affect the reaction. Examples of the suitable solvent include 1,3-bis(trifluoromethyl)benzene, perfluorobutyl ethyl ether, and perfluorohexyl methyl ether.

The reaction temperature in such a reaction is usually, but not limited to, 0 to 100° C., and preferably 0 to 40° C., and the reaction time is usually, but not limited to, 30 to 600 minutes, and preferably 60 to 120 minutes, and the reaction pressure is, but not limited to, –0.2 to 1 MPa (gauge pressure), and is conveniently atmospheric pressure.

Step (3):

In step (3), the compound represented by the formula (c1-3) or the formula (c2-3) is reacted with $HSiM'_3$ and, optionally, a compound represented by the formula: $R^{85}{}_iL'$, and/or a compound represented by the formula: $R^{86'}{}_jL''$.

The compound represented by the formula (c1-3) or the formula (c2-3) is preferably the compound obtained in the step (2).

In the compound: $HSiM'_3$ used in step (3), M' is each independently a halogen atom or a $C_{1-6}$ alkoxy group, preferably a halogen atom, and more preferably a chlorine atom.

In the compound represented by the formula: $R^{85}{}_iL'$ used in step (3), $R^{85}$ is as described in the formulae (C1) and (C2); L' represents a group capable of binding to $R^{85}$; and i is an integer of 1 to 3.

In the compound represented by the formula: $R^{86'}{}_jL''$ used in step (3), $R^{86'}$ is a $C_{1-22}$ alkyl group; L'' represents a group capable of binding to $R^{86'}$; and j is an integer of 1 to 3.

The "group capable of binding to $R^{85}$" and the "group capable of binding to $R^{86'}$" represented by L' and L'' above are capable of binding to $R^{85}$ and $R^{86'}$, respectively, and $R^{85}$ and $R^{86'}$ are not limited as long as $R^{85}$ and $R^{86'}$ can leave from these groups in the above reaction, and examples thereof include a hydrogen atom, lithium, and sodium. The "group capable of binding to $R^{85}$" and the "group capable of binding to $R^{86'}$" may be a group which may have a plurality of $R^8$ or $R^{6'}$ groups, for example, $=CH_2$, $≡CH$. Those skilled in the art can select an appropriate group capable of binding to $R^{85}$ and a group capable of binding to $R^{86'}$ depending on the conditions such as the type of compound to be reacted, the solvent, and the temperature.

The amount of $HSiM'_3$ used in step (3) may be 1 mol or more, but is preferably 2 mol, per mol of the terminal —CH=CH_2 group of the compound represented by the formula (c1-3) and/or the formula (c2-3).

When the compound represented by $R^{85}{}_iL'$ is used in step (3), the use amount thereof may vary depending on the amount of $R^{85}$ group to be introduced, and such amount can be appropriately determined by those skilled in the art.

When the compound represented by $R^{86'}{}_jL''$ is used in step (3), the use amount thereof may vary depending on the amount of $R^{86'}$ group to be introduced, and such amount can be appropriately determined by those skilled in the art.

In the reaction of step (3), firstly, the terminal —CH=CH_2 group of the compound represented by the formula (c1-3) and/or the formula (c2-3) is reacted with $HSiM'_3$ to convert its end to the —CH_2CH_2SiM'_3 group. Then, this terminal —CH_2CH_2SiM'_3 group is reacted with the compound represented by $R^{85}{}_iL'$ and/or the compound represented by $R^{86'}{}_jL''$ to replace M' with $R^{85}$ or $R^{86'}$. It is noted that the compound represented by $R^{85}{}_iL'$ and the compound represented by $R^{86'}{}_jL''$ may be reacted simultaneously or separately.

However, in one embodiment of the present disclosure, $HSiM'_3$, the compound represented by $R^{85}_iL'$, and the compound represented by $R^{86'}_jL''$ may be used as a compound of $HSi(R^{85}_i)(R^{86'}_j)$ (in this case, i+j is 3). The compound represented by $HSi(R^{85}_i)(R^{86'}_j)$ may be produced by those skilled in the art using conventional techniques in the art.

In another embodiment, the total amount of the compound represented by $R^{85}_iL'$ and/or the compound represented by $R^{86'}_jL''$ in step (3) is set to 3 mol or more per mol of the terminal —CH=CH$_2$ group of the compound represented by the formula (c1-3) and/or the formula (c2-3). According to such an embodiment, substantially all M' of the terminal —CH$_2$CH$_2$SiM'$_3$ produced in the reaction of the step (3) can be replaced with $R^{85}$ or $R^{86'}$.

The reaction in step (3) is preferably carried out in the presence of a suitable catalyst in a suitable solvent.

Examples of suitable catalyst include Pt, Pd, and Rh. The catalyst is preferably Pt. Such catalyst may be in any form, for example in the form of a complex.

The suitable solvent is not limited as long as it does not adversely affect the reaction, and examples thereof include 1,3-bis(trifluoromethyl)benzene, perfluorobutyl ethyl ether, and perfluorohexyl methyl ether.

The reaction temperature in such a reaction is usually, but not limited to, 0 to 100° C., and preferably 50 to 80° C., and the reaction time is usually, but not limited to, 30 to 600 minutes, and preferably 60 to 240 minutes, and the reaction pressure is, but not limited to, −0.2 to 1 MPa (gauge pressure), and is conveniently atmospheric pressure.

The reaction of step (3) is preferably carried out in the presence of a suitable rearrangement preventing agent.

Examples of the suitable rearrangement preventing agent include, but are not limited to, carboxylic acid compounds. The carboxylic acid compound may include (a) a carboxylic acid, (b) a carboxylic acid anhydride, (c) a silylated carboxylic acid, and/or (d) a substance that produces the carboxylic acid compounds (i.e., (a), (b) or (c)) in the reaction of step (3). These carboxylic acid compounds may be used alone or in combination of two or more.

When the rearrangement preventing agent contains (a) the carboxylic acid, any carboxylic acid having a carboxyl group may be used. Examples of the suitable carboxylic acid include, but are not limited to, saturated carboxylic acids, unsaturated carboxylic acids, monocarboxylic acids, and dicarboxylic acids. Specific examples of the suitable carboxylic acid include, but are not limited to, a saturated monocarboxylic acid such as formic acid, acetic acid, propionic acid, n-butyric acid, isobutyric acid, hexanoic acid, cyclohexanoic acid, lauric acid, and stearic acid; a saturated dicarboxylic acid such as oxalic acid and adipic acid; an aromatic carboxylic acid such as benzoic acid and p-phthalic acid; a carboxylic acid in which the hydrogen atom on the carbon of the hydrocarbon group of these carboxylic acids has been substituted by a halogen atom or an organosilyl group, such as chloroacetic acid, dichloroacetic acid, trifluoroacetic acid, para-chlorobenzoic acid, and trimethylsilylacetic acid; an unsaturated fatty acid such as acrylic acid, methacrylic acid, and oleic acid; and compounds having a hydroxy group, a carbonyl group or an amino group in addition to the carboxyl group, namely, a hydroxy acid such as lactic acid, a keto acid such as acetoacetic acid, an aldehyde acid such as glyoxylic acid, and an amino acid such as glutamic acid.

Examples of (b) the carboxylic acid anhydride include, but are not limited to, acetic acid anhydride, propionic acid anhydride, and benzoic acid anhydride. These carboxylic acid anhydrides may be those generated in the reaction system of step (3), and include acetyl chloride, butyryl chloride, benzoyl chloride, and other carboxylic acid halides; carboxylic acid metal salts such as zinc acetate and thallium acetate; and carboxylic esters decomposable by light or heat, such as (2-nitrobenzyl)propionate.

Examples of (c) the silylated carboxylic acid include, but are not limited to, trialkylsilylated carboxylic acids, such as trimethylsilyl formate, trimethylsilyl acetate, triethylsilyl propionate, trimethylsilyl benzoate, and trimethylsilyl trifluoroacetate; and di-, tri-, or tetracarboxysilylates, such as dimethyldiacetoxysilane, diphenyldiacetoxysilane, methyltriacetoxysilane, ethyltriacetoxysilane, vinyltriacetoxysilane, di-t-butoxydiacetoxysilane, and silicon tetrabenzoate.

The rearrangement preventing agent is used in an amount of 0.001 to 20% by weight, for example 0.01 to 5% by weight, or 0.01 to 1% by weight, but not limited thereto. Those skilled in the art can select the amount of using the rearrangement preventing agent depending on the compound to be reacted, an agent, a solvent, and other conditions. The rearrangement preventing agent is commercially available as DOW CORNING (registered trademark) ETS 900 or XIAMETER (registered trademark) OFS-1579 Silane available from Dow Corning Corporation of Midland, MI.

In a preferred embodiment, the PFPE is —(OCF(CF$_3$) CF$_2$)$_d$— (wherein d is an integer of 1 or more and 200 or less, preferably 5 or more and 200 or less, more preferably 10 or more and 200 or less), and in the production method, the compound represented by the formula (c1-3) is reacted in step (3). More preferably, in the production method, in step (1), the compound represented by the formula (c1-2) is produced from the compound represented by the formula (c1-1); in step (2), the compound represented by step (c1-3) is produced from the compound represented by the formula (c1-2), and in step (3), the compound represented by the formula (c1-3) is reacted. The operation in each step is as described above.

In one embodiment, the present disclosure provides a method for producing a fluoro(poly)ether group-containing silane compound, which includes the following steps (1) to (3).

Step (1):
    a step of reacting a compound represented by the formula (c1-1) or the formula (c2-1):

$$\text{Rf-PFPE-X}^{10}\text{—C(O)OH} \qquad \text{(c1-1)}$$

$$\text{HOC(O)—X}^{10}\text{—PFPE-X}^{10}\text{—C(O)OH} \qquad \text{(c2-1)}$$

wherein Rf, PFPE, and $X^{10}$ are as defined above,
with SOM$_2$,
wherein M is as defined above,
to obtain a compound represented by the formula (c1-2) or the formula (c2-2):

$$\text{Rf—PFPE—X}^{10}\text{–}\underset{\underset{O}{\|}}{C}\text{—M} \qquad \text{(c1-2)}$$

$$\text{M—}\underset{\underset{O}{\|}}{C}\text{—X}^{10}\text{–PFPE—X}^{10}\text{—}\underset{\underset{O}{\|}}{C}\text{—M} \qquad \text{(c2-2)}$$

wherein:
Rf, PFPE, $X^{10}$ and M are as defined above;
Step (2):
    a step of reacting the compound represented by the formula (c1-2) or the formula (c2-2) with a compound represented by the formula:

$$\text{HN(R}^{34}\text{)—X}^{11}\text{—C(Y}^{11}\text{—CH=CH}_2)_3,$$

wherein $R^{34}$, $X^{11}$, and $Y^{11}$ are as defined above,
to obtain a compound represented by the formula (c1-3) or the formula (c2-3):

$$\text{Rf}\text{—}\text{PFPE}\text{—}X^{10}\text{—}\underset{\underset{O}{\parallel}}{C}\text{—}\underset{\underset{R^{34}}{|}}{N}\text{—}X^{11}\text{—}C(Y^{11}\text{—}CH\text{=}CH_2)_3 \quad \text{(c1-3)}$$

$$(CH_2\text{=}CH\text{—}Y^{11})_3C\text{—}X^{11}\text{—}\underset{\underset{R^{34}}{|}}{N}\text{—}\underset{\underset{O}{\parallel}}{C}\text{—}X^{10}\text{—}\text{PFPE}\text{—}X^{10}\text{—}\underset{\underset{O}{\parallel}}{C}\text{—}\underset{\underset{R^{34}}{|}}{N}\text{—}X^{11}\text{—}C(Y^{11}\text{—}CH\text{=}CH_2)_3 \quad \text{(c2-3)}$$

wherein Rf, PFPE, $X^{10}$, $R^{34}$, and $X^{11}$ are as defined above; and

Step (3):

a step of reacting the compound represented by the formula (c1-3) or the formula (c2-3):

$$\text{Rf}\text{—}\text{PFPE}\text{—}X^{10}\text{—}\underset{\underset{O}{\parallel}}{C}\text{—}\underset{\underset{R^{34}}{|}}{N}\text{—}X^{11}\text{—}C(Y^{11}\text{—}CH\text{=}CH_2)_3 \quad \text{(c1-3)}$$

$$(CH_2\text{=}CH\text{—}Y^{11})_3C\text{—}X^{11}\text{—}\underset{\underset{R^{34}}{|}}{N}\text{—}\underset{\underset{O}{\parallel}}{C}\text{—}X^{10}\text{—}\text{PFPE}\text{—}X^{10}\text{—}\underset{\underset{O}{\parallel}}{C}\text{—}\underset{\underset{R^{34}}{|}}{N}\text{—}X^{11}\text{—}C(Y^{11}\text{—}CH\text{=}CH_2)_3 \quad \text{(c2-3)}$$

with $HSiM'_3$, and, optionally, a compound represented by the formula: $R^{85}{}_iL'$ and/or a compound represented by the formula: $R^{86'}{}_jL''$ wherein M', $R^{85}$, L', i, $R^{86'}$, L'', and j are as defined above.

The present disclosure further provides a compound represented by the formula (c1-2) or (c2-2):

$$\text{Rf}\text{—}\text{PFPE}\text{—}X^{10}\text{—}\underset{\underset{O}{\parallel}}{C}\text{—}M \quad \text{(c1-2)}$$

$$M\text{—}\underset{\underset{O}{\parallel}}{C}\text{—}X^{10}\text{—}\text{PFPE}\text{—}X^{10}\text{—}\underset{\underset{O}{\parallel}}{C}\text{—}M \quad \text{(c2-2)}$$

that is, an intermediate in the production method.

In the formula, Rf, PFPE, $X^{10}$, and M are as defined above.

Preferably, the intermediate is a compound represented by the formula (c1-2).

The present disclosure still further provides a compound represented by the formula (c1-3) or (c2-3):

$$\text{Rf}\text{—}\text{PFPE}\text{—}X^{10}\text{—}\underset{\underset{O}{\parallel}}{C}\text{—}\underset{\underset{R^{34}}{|}}{N}\text{—}X^{11}\text{—}C(Y^{11}\text{—}CH\text{=}CH_2)_3 \quad \text{(c1-3)}$$

$$(CH_2\text{=}CH\text{—}Y^{11})_3C\text{—}X^{11}\text{—}\underset{\underset{R^{34}}{|}}{N}\text{—}\underset{\underset{O}{\parallel}}{C}\text{—}X^{10}\text{—}\text{PFPE}\text{—}X^{10}\text{—}\underset{\underset{O}{\parallel}}{C}\text{—}\underset{\underset{R^{34}}{|}}{N}\text{—}X^{11}\text{—}C(Y^{11}\text{—}CH\text{=}CH_2)_3 \quad \text{(c2-3)}$$

that is, an intermediate in the production method.

In the formula, Rf, PFPE, $X^{10}$, $R^{34}$, $X^{11}$, and $Y^{11}$ are as defined above.

Preferably, the intermediate is a compound represented by the formula (c1-3).

(Surface-Treating Agent)

The PFPE-containing silane compound may be used as a surface-treating agent.

The surface-treating agent can contribute to the formation of a surface-treating layer having good UV durability, water-repellency, oil-repellency, antifouling property (for example, preventing adhesion of fouling such as fingerprints), chemical resistance, hydrolysis resistance, an effect of suppressing lubricity, high friction durability, heat resistance, moisture-proof property, and the like.

The surface-treating agent may be diluted with a solvent. Examples of the solvent include, but are not limited to:

a fluorine atom-containing solvent selected from the group consisting of perfluorohexane, $CF_3CF_2CHCl_2$, $CF_3CH_2CF_2CH_3$, $CF_3CHFCHFC_2F_5$, 1,1,1,2,2,3,3,4,4,5,5,6,6-tridecafluorooctane, 1,1,2,2,3,3,4-heptafluorocyclopentane (ZEORORA H (trade name), etc.), $C_4F_9OCH_3$, $C_4F_9OC_2H_5$, $CF_3CH_2OCF_2CHF_2$, $C_6F_{13}CH\text{=}CH_2$, $C_6F_{13}OCH_3$, xylene hexafluoride, perfluorobenzene, methyl pentadecafluoroheptyl ketone, trifluoroethanol, pentafluoropropanol, hexafluoroisopropanol, $HCF_2CF_2CH_2OH$, methyl trifluoromethanesulfonate, trifluoroacetic acid, and $CF_3O$ $(CF_2CF_2O)_{m1}(CF_2O)_{n1}CF_2CF_3$ (wherein m1 and n1 are each independently an integer of 0 or more and 1000 or less, the occurrence order of the respective repeating units in parentheses with m1 or n1 is arbitrary in the formula, with the proviso that the sum of m1 and n1 is 1 or more), 1,1-dichloro-2,3,3,3-tetrafluoro-1-propene, 1,2-dichloro-1,3,3,3-tetrafluoro-1-propene, 1,2-dichloro-3,3,3-trifluoro-1-propene, 1,1-dichloro-3,3,3-trifluoro-1-propene, 1,1,2-trichloro-3,3,3-trifluoro-1-propene, and 1,1,1,4,4,4-hexafluoro-2-butene. These solvents may be used alone or as a mixture of two or more compounds.

The content of moisture contained in the solvent is preferably 20 ppm by mass or less. The content of moisture may be measured using the Karl Fischer method. With such a content of moisture, the storage stability of the surface-treating agent can be improved.

The surface-treating agent may contain other components in addition to the PFPE-containing silane compound represented by the formula (A1), (A2), (B1), (B2), (C1), or (C2). Examples of the other components include, but are not limited to, a (non-reactive) fluoropolyether compound which may be also understood as fluorine-containing oils, preferably perfluoro(poly)ether compounds (hereinafter, referred to as "the fluorine-containing oil"), (non-reactive) silicone compounds which may be also understood as silicone oils (hereinafter referred to as "silicone oil"), catalysts, lower alcohols, transition metals, halide ions, and compounds containing an atom having an unshared electron pair in a molecular structure.

Examples of the fluorine-containing oil include, but are not limited to, a compound represented by the following general formula (1) (a perfluoro(poly)ether compound).

$$\text{Rf}^5\text{---}(\text{OC}_4\text{F}_8)_{a'}\text{---}(\text{OC}_3\text{F}_6)_{b'}\text{---}(\text{OC}_2\text{F}_4)_{c'}\text{---}(\text{OCF}_2)_{d'}\text{---} \text{Rf}^6 \quad (1)$$

In the formula, $\text{Rf}^5$ represents an alkyl group having 1 to 16 carbon atoms which is optionally substituted by one or more fluorine atoms (preferably, a $C_{1-16}$ perfluoroalkyl group), $\text{Rf}^6$ represents an alkyl group having 1 to 16 carbon atoms which is optionally substituted by one or more fluorine atoms (preferably, a $C_{1-16}$ perfluoroalkyl group), a fluorine atom, or a hydrogen atom, and more preferably, $\text{Rf}^5$ and $\text{Rf}^6$ are each independently a $C_{1-3}$ perfluoroalkyl group.

a', b', c', and d' represent the repeating number of each of four repeating units of perfluoro(poly)ether which constitute a main backbone of the polymer, and are each independently an integer of 0 or more and 300 or less, and the sum of a', b', c', and d' is at least 1, preferably 1 to 300, and more preferably 20 to 300. The occurrence order of the respective repeating units in parentheses with the subscript a', b', c', or d' is arbitrary in the formulae. There is at least one branched structure in the repeating units. That is, the repeating units have at least one $CF_3$ end (specifically, $-CF_3$, $-C_2F_5$, etc., more specifically $-CF_3$). Regarding the repeating unit having a branched structure, examples of $-(OC_4F_8)-$ include $-(OCF(CF_3)CF_2CF_2)-$, $-(OCF_2CF(CF_3)CF_2)-$, $-(OCF_2CF_2CF(CF_3))-$, $-(OC(CF_3)_2CF_2)-$, $-(OCF_2C(CF_3)_2)-$, $-(OCF(CF_3)CF(CF_3))-$, $-(OCF(C_2F_5)CF_2)-$, and $-(OCF_2CF(C_2F_5))-$; and examples of $-(OC_3F_6-$ include $-(OCF(CF_3)CF_2)-$ and $-(OCF_2CF(CF_3))-$; and examples of $-(OC_2F_4)-$ include $-(OCF(CF_3))-$.

Examples of the perfluoro(poly)ether compound represented by the general formula (1) include a compound represented by any of the following general formulae (1a) and (1b) (may be one compound or a mixture of two or more compounds).

$$\text{Rf}^5\text{---}(\text{OCF}(\text{CF}_3)\text{CF}_2)_{b''}\text{---}\text{Rf}^6 \quad (1a)$$

$$\text{Rf}^5\text{---}(\text{OC}_4\text{F}_8)_{a''}\text{---}(\text{OC}_3\text{F}_6)_{b''}\text{---}(\text{OCF}(\text{CF}_3))_{c''}\text{---}(\text{OCF}_2)_{d''}\text{---}\text{Rf}^6 \quad (1b)$$

In these formulae, $\text{Rf}^5$ and $\text{Rf}^6$ are as defined above; in the formula (1a), b" is an integer of 1 or more and 100 or less; and in the formula (1b), a" and b" are each independently an integer of 1 or more and 30 or less, and c" and d" are each independently an integer of 1 or more and 300 or less. The occurrence order of the respective repeating units in parentheses with the subscript a", b", c", or d" is arbitrary in the formulae. $-(OC_4F_8)-$ and $-(OC_3F_6)-$ have a branched structure.

The fluorine-containing oil may have a number average molecular weight of 1,000 to 30,000. In particular, the number average molecular weight of the compound represented by the formula (1a) is preferably 2,000 to 8,000. By having such a number average molecular weight, good friction durability can be obtained. In one embodiment, the number average molecular weight of the compound represented by the formula (1b) is preferably 3,000 to 8,000. In another embodiment, the number average molecular weight of the compound represented by the formula (1b) is 8,000 to 30,000.

In the surface-treating agent, the fluorine-containing oil may be contained in an amount of, for example, 0 to 500 parts by mass, preferably 0 to 100 parts by mass, more preferably 1 to 50 parts by mass, and still more preferably 1 to 5 parts by mass based on 100 parts by mass of the PFPE-containing silane compound.

From the other point of view, the fluorine-containing oil may be a compound represented by the general formula Rf—F (wherein Rf' is a $C_{5-16}$ perfluoroalkyl group). In addition, the fluorine-containing oil may be a chlorotrifluoroethylene oligomer. The compound represented by Rf'—F and the chlorotrifluoroethylene oligomer are preferable in that the compound shows high affinity to the above-mentioned perfluoro(poly)ether group-containing silane compound in which Rf is a $C_{1-16}$ perfluoroalkyl group.

The fluorine-containing oil contributes to improving the surface lubricity of the surface-treating layer.

Examples of the silicone oil include a linear or cyclic silicone oil having 2,000 or less siloxane bonds. The linear silicone oil may be so-called a straight silicone oil and a modified silicon oil. Examples of the straight silicone oil include dimethylsilicone oil, methylphenylsilicone oil, and methylhydrogensilicone oil. Examples of the modified silicone oil include that which is obtained by modifying a straight silicone oil with alkyl, aralkyl, polyether, higher fatty acid ester, fluoroalkyl, amino, epoxy, carboxyl, alcohol, or the like. Examples of cyclic silicone oil include cyclic dimethylsiloxane oil.

The silicone oil may be contained in the surface-treating agent, for example, at 0 to 50 parts by mass, and preferably 0 to 5 parts by mass based on 100 parts by mass of the PFPE-containing silane compound (as the total mass when two or more compounds are used; the same applies below).

The silicone oil contributes to improving the surface lubricity of the surface-treating layer.

Examples of the catalyst include an acid (for example, acetic acid, trifluoroacetic acid, etc.), a base (for example, ammonia, triethylamine, diethylamine, etc.), and a transition metal (for example, Ti, Ni, Sn, etc.).

The catalyst facilitates the hydrolysis and dehydration condensation of the fluorine-containing silane compound to facilitate the formation of the surface-treating layer.

Examples of the lower alcohol as the other component include alcohol compounds having 1 to 6 carbon atoms.

Examples of the transition metal include platinum, ruthenium, and rhodium.

Examples of the halide ion include chloride ion.

Examples of the compounds containing an atom having an unshared electron pair in the molecular structure include diethylamine, triethylamine, aniline, pyridine, hexamethylphosphoramide, N,N-diethylacetamide, N,N-diethylformamide, N,N-dimethylacetamide, N-methylformamide, N,N-dimethylformamide, N-methylpyrrolidone, tetramethylurea, dimethylsulfoxide (DMSO), tetramethylenesulfoxide, methylphenylsulfoxide, and diphenylsulfoxide. Among these compounds, it is preferable to use dimethyl sulfoxide or tetramethylene sulfoxide.

In addition to the above, examples of the other component include tetraethoxysilane, methyltrimethoxysilane, 3-aminopropyltrimethoxysilane, 3-glycidoxypropyltrimethoxysilane, and methyltriacetoxysilane.

In addition to the above, examples of the other component include a compound (E) having a fluoro(poly)ether group and a carboxylic acid group in the molecular structure. In the compound (E), the fluoro(poly)ether group contains at least one fluorine atom. By containing such a compound (E), the reaction with glass is facilitated, so that the surface-treating layer can be formed in a shorter time.

Examples of the compound (E) include compounds represented by the following formula (E1) or (E2), and specifically, a compound represented by the formula (E1).

$$Rf^1\text{—}PFPE^1\text{-}X^{f1}\text{—}COOH \tag{E1}$$

$$HOOC\text{—}X^{f1}\text{-}PFPE^1\text{-}X^{f1}\text{—}COOH \tag{E2}$$

In the formulae (E1) and (E2), $Rf^1$ independently at each occurrence represents an alkyl group having 1 to 16 carbon atoms which is optionally substituted by one or more fluorine atoms.

The "alkyl group having 1 to 16 carbon atoms" in the alkyl group having 1 to 16 carbon atoms which is optionally substituted by one or more fluorine atoms may be linear or branched, and preferably is a linear or branched alkyl group having 1 to 6 carbon atoms, in particular 1 to 3 carbon atoms, and more preferably a linear alkyl group having 1 to 3 carbon atoms.

$Rf^1$ is preferably an alkyl group having 1 to 16 carbon atoms substituted by one or more fluorine atoms, more preferably a $CF_2H\text{—}C_{1-15}$ fluoroalkylene group or a $C_{1-16}$ perfluoroalkyl group, and still more preferably a $C_{1-16}$ perfluoroalkyl group.

The perfluoroalkyl group having 1 to 16 carbon atoms may be linear or branched, and preferably is a linear or branched perfluoroalkyl group having 1 to 6 carbon atoms, in particular 1 to 3 carbon atoms, and more preferably a linear perfluoroalkyl group having 1 to 3 carbon atoms, specifically $\text{—}CF_3$, $\text{—}CF_2CF_3$, or $\text{—}CF_2CF_2CF_3$.

In the formulae (E1) and (E2), $PFPE^1$ is independently at each occurrence a group represented by: $\text{—}(OC_6F_{12})_{a1}\text{—}(OC_5F_{10})_{b1}\text{—}(OC_4F_8)_{c1}\text{—}(OC_3X^F_6)_{d1}\text{—}(OC_2F_4)_{e1}\text{—}(OCF_2)_{f1}\text{—}$ and has at least one branched structure in $PFPE^1$. That is, the $PFPE^1$ has at least one $CF_3$ end (specifically, $\text{—}CF_3$, $\text{—}C_2F_5$, etc., more specifically $\text{—}CF_3$). In the formula (E1)″, in the PFPE, the oxygen atom at the left end of the formula is bonded to the $Rf^1$ group, and the carbon atom at the right end of the formula is bonded to the $X^{f1}$ group.

$X^F$ is each independently at each occurrence a hydrogen atom, a fluorine atom, or a chlorine atom, preferably a hydrogen atom or a fluorine atom, and more preferably a fluorine atom.

In the formula, a1, b1, c1, d1, e1, and f1 are each independently an integer of 0 or more and 200 or less, and the sum of a1, b1, c1, d1, e1, and f1 is at least 1. Preferably, a1, b1, c1, d1, e1, and f1 are each independently an integer of 0 or more and 100 or less. Preferably, the sum of a1, b1, c1, d1, e1, and f1 is 5 or more, and more preferably 10 or more. Preferably, the sum of a1, b1, c1, d1, e1, and f1 is 200 or less, more preferably 100 or less, for example, 10 or more and 200 or less, and more specifically 10 or more and 100 or less. The occurrence order of the respective repeating units in parentheses with a1, b1, c1, d1, e1, or f1 is arbitrary in the formula.

$PFPE^1$ preferably has at least 5 branched structures, more preferably 10 branched structures, and particularly preferably 20 branched structures.

In the structure of PFPE, the number of repeating units having a branched structure is preferably 40 or more, more preferably 60 or more, and particularly preferably 80 or more, with respect to the total number of repeating units (for example, the sum of a1, b1, c1, d1, e1, and f1) of 100. In the structure of PFPE, the number of repeating units having a branched structure may be 100 or less, for example, 90 or less, with respect to the total number of repeating units of 100.

In the structure of $PFPE^1$, the number of repeating units having the branched structure is preferably in the range of 40 to 100, more preferably in the range of 60 to 100, and particularly preferably in the range of 80 to 100, with respect to the total number of repeating units of 100.

Examples of the branched chain in the branched structure include $CF_3$.

Regarding the repeating unit having a branched structure, examples of $\text{—}(OC_6F_{12})\text{—}$ include $\text{—}(OCF(CF_3)CF_2CF_2CF_2CF_2)\text{—}$, $\text{—}(OCF_2CF(CF_3)CF_2CF_2CF_2)\text{—}$, $\text{—}(OCF_2CF_2CF(CF_3)CF_2CF_2)\text{—}$, $\text{—}(OCF_2CF_2CF_2CF(CF_3)CF_2)\text{—}$, and $\text{—}(OCF_2CF_2CF_2CF_2CF(CF_3))\text{—}$. Examples of $\text{—}(OC_5F_{10})\text{—}$ include $\text{—}(OCF(CF_3)CF_2CF_2CF_2)\text{—}$, $\text{—}(OCF_2CF(CF_3)CF_2CF_2)\text{—}$, $\text{—}(OCF_2CF_2CF(CF_3)CF_2)\text{—}$, and $\text{—}(OCF_2CF_2CF_2CF(CF_3))\text{—}$. Examples of $\text{—}(OC_4F_8)\text{—}$ include $\text{—}(OCF(CF_3)CF_2CF_2)\text{—}$, $\text{—}(OCF_2CF(CF_3)CF_2)\text{—}$, $\text{—}(OCF_2CF_2CF(CF_3))\text{—}$, $\text{—}(OC(CF_3)_2CF_2)\text{—}$, $\text{—}(OCF_2C(CF_3)_2)\text{—}$, $\text{—}(OCF(CF_3)CF(CF_3))\text{—}$, $\text{—}(OCF(C_2F_5)CF_2)\text{—}$, and $\text{—}(OCF_2CF(C_2F_5))\text{—}$. Examples of $\text{—}(OC_3F_6)\text{—}$ (i.e., in the formula, $X^F$ is a fluorine atom) include $\text{—}(OCF(CF_3)CF_2)\text{—}$ and $\text{—}(OCF_2CF(CF_3))\text{—}$. Examples of $\text{—}(OC_2F_4)\text{—}$ include $\text{—}(OCF(CF_3))\text{—}$.

The $PFPE^1$ may include a linear repeating unit as well as a repeating unit having a branched structure. Examples of the linear repeating unit include $\text{—}(OCF_2CF_2CF_2CF_2CF_2CF_2)\text{—}$, $\text{—}(OCF_2CF_2CF_2CF_2CF_2)\text{—}$, $\text{—}(OCF_2CF_2CF_2CF_2)\text{—}$, $\text{—}(OCF_2CF_2CF_2)\text{—}$, and $\text{—}(OCF_2CF_2)\text{—}$.

Preferably, in the $PFPE^1$, the repeating units $\text{—}(OC_6F_{12})\text{—}$, $\text{—}(OC_5F_{10})\text{—}$, $\text{—}(OC_4F_8)\text{—}$, and $\text{—}(OC_3F_6)\text{—}$ have a branched structure.

More preferably, the $PFPE^1$ consists of repeating units $OC_6F_{12}$, $OC_5F_{10}$, $OC_4F_8$, and $OC_3F_6$ having a branched structure.

In one embodiment, the $PFPE^1$ is $\text{—}(OC_3F_6)_{d1}\text{—}$ (wherein d1 is an integer of 1 or more and 200 or less, preferably 5 or more and 200 or less, more preferably 10 or more and 200 or less), and has at least one branched structure in $PFPE^1$.

In this embodiment, $PFPE^1$ may further contain a linear repeating unit $\text{—}(OCF_2CF_2CF_2)\text{—}$.

In the embodiment, the $PFPE^1$ preferably consists of a repeating unit $OC_3F_6$ having a branched structure. The $PFPE^1$ is more preferably represented by the formula: $\text{—}(OCF_2CF(CF_3))_{d1}$. In the formula, d1 is an integer of 1 or more and 200 or less, preferably 5 or more and 200 or less, and more preferably 10 or more and 200 or less.

In another embodiment, $PFPE^1$ is $\text{—}(OC_4F_8)_{c1}\text{—}(OC_3F_6)_{d1}\text{—}(OC_2F_4)_{e1}\text{—}(OCF_2)_{f1}\text{—}$ (wherein c1 and d1 are each independently an integer of 0 or more and 30 or less, e and f are each independently an integer of 1 or more and 200 or less, preferably 5 or more and 200 or less, more preferably 10 or more and 200 or less, the sum of c1, d1, e1, and f1 is at least 5 or more, preferably 10 or more, and the occurrence order of the respective repeating units in parentheses with the subscript c1, d1, e1, or f1 is arbitrary in the formula) and has at least one branched structure in $PFPE^1$.

In yet another embodiment, $PFPE^1$ is a group represented by $\text{—}(R^{61}\text{—}R^{62})$ j- and has at least one branched structure in PFPE. In the formula, $R^{61}$ is $OCF_2$ or $OC_2F_4$, and preferably $OC_2F_4$. In the formula, $R^{62}$ is a group selected from $OC_2F_4$, $OC_3F_6$, $OC_4F_8$, $OC_5F_{10}$, and $OC_6F_{12}$, or is a combination of two or three groups independently selected from these groups. Preferably, $R^{62}$ is a group selected from $OC_2F_4$, $OC_3F_6$, and $OC_4F_8$, or is a group selected from $OC_3F_6$, $OC_4F_8$, $OC_5F_{10}$, and $OC_6F_{12}$, or is a combination of two or three groups independently selected from these groups, and more preferably a group selected from $OC_3F_6$ and $OC_4F_8$. Examples of the combination of two or three groups independently selected from $OC_2F_4$, $OC_3F_6$, and $OC_4F_8$ include, but are not limited to, $\text{—}OC_2F_4OC_3F_6\text{—}$, —$OC_2F_4OC_4F_8$—, —$OC_3F_6OC_2F_4$—, —$OC_3F_6OC_3F_6$—, —$OC_3F_6OC_4F_8$—, —$OC_4F_8OC_4F_8$—, —$OC_4F_8OC_3F_6$—, —$OC_4F_8OC_2F_4$—, —$OC_2F_4OC_2F_4OC_3F_6$—, —$OC_2F_4OC_2F_4OC_4F_8$—, —$OC_2F_4OC_3F_6OC_2F_4$—, —$OC_2F_4OC_3F_6OC_3F_6$—, —$OC_2F_4OC_4F_8OC_2F_4$—, —$OC_3F_6OC_2F_4OC_2F_4$—, —$OC_3F_6OC_2F_4OC_3F_6$—, —$OC_3F_6OC_3F_6OC_2F_4$—, and —$OC_4F_8OC_2F_4OC_2F_4$—. j1 is 2 or more, preferably 3 or more, more preferably 5 or more, and is an integer of 100 or less, and preferably 50 or less. In the formula, $OC_2F_4$, $OC_3F_6$, $OC_4F_8$, $OC_5F_{10}$, and $OC_6F_{12}$ preferably have a branched structure.

More preferably, in the embodiment, $PFPE^1$ consists of repeating units $OC_6F_{12}$, $OC_5F_{10}$, $OC_4F_8$, and $OC_3F_6$ having a branched structure.

In the formulae (E1) and (E2), $X^{f1}$ is each independently at each occurrence a single bond or an alkylene group having 1 to 6 carbon atoms, preferably a single bond or an alkylene group having 1 to 4 carbon atoms, and more preferably a single bond or an alkylene group having 1 to 2 carbon atoms (for example, a methylene group). The hydrogen atoms in $X^{f1}$ are optionally substituted, preferably substituted, by one or more substituents selected from a fluorine atom, a $C_{1-3}$ alkyl group, and a $C_{1-3}$ fluoroalkyl group. $X^{f1}$ may be linear or branched, and is preferably linear.

It is preferable that $Rf^1$ and $PFPE^1$ each have the same structure as Rf or PFPE in the PFPE-containing silane compound contained in the surface-treating agent.

The compound (E) is preferably a compound represented by the formula (E1).

In the surface-treating agent, the ratio of the PFPE-containing silane compound of the present disclosure to the compound represented by the formula (E) may be, for example, PFPE-containing silane compound: Compound represented by the formula (E)=99.9:0.1 to 85.0:15.0, 99.9:0.1 to 90.0:10.0, 99.9:0.1 to 95.0:5.0 in molar ratio.

In one embodiment, the surface-treating agent does not contain the other components: fluorine-containing oils, silicone oils, catalysts, lower alcohols, transition metals, halide ions, and compounds containing an atom having an unshared electron pair in the molecular structure.

In one embodiment, the surface-treating agent contains a PFPE-containing silane compound represented by the formula (B1), the formula (B2), the formula (C1), or the formula (C2).

In one embodiment, the surface-treating agent contains a PFPE-containing silane compound represented by the formula (C1) or the formula (C2).

In one embodiment, the surface-treating agent contains a PFPE-containing silane compound represented by the formula (C1).

In one embodiment, the surface-treating agent contains a PFPE-containing silane compound represented by the formula (B1) or (C1), and preferably a PFPE-containing silane compound represented by (C1).

In one embodiment, the surface-treating agent contains a PFPE-containing silane compound represented by the formula (C1) and does not contain fluorine-containing oil (for example, the content of the fluorine-containing oil is 1 part by mass or less, more specifically 0 part by mass, based on 100 parts by mass of the surface-treating agent) which is the other component.

The surface-treating agent of the present invention is impregnated into a porous material, such as a porous ceramic material, a metal fiber, such as a flocculated steel wool to obtain a pellet. The pellet may be used, for example, in vacuum deposition.

EXAMPLES

The present invention will be described in more detail through the following Examples, but the present disclosure is not limited to these examples.

Synthesis Example 1

To a four necked flask of 200 mL equipped with a reflux condenser, a thermometer, and a stirrer, 32 g of perfluoropolyether modified carboxylic acid represented by the average compositional formula $CF_3CF_2CF_2O$ [$CF(CF_3)CF_2O]_{22}CF$ ($CF_3$) COOH, 16 g of 1,3-bis(trifluoromethyl)benzene, 0.13 g of N,N-dimethylformamide, and 2.17 g of thionyl chloride were charged, and the mixture was stirred at 90° C. for 1 hour under a nitrogen gas flow. Subsequently, volatile content was distilled off under reduced pressure, 16 g of 1,3-bis(trifluoromethyl)benzene, 1.35 g of triethylamine, and 1.73 g of $NH_2CH_2C(CH_2CH=CH_2)_3$ were charged, and the mixture was stirred under a nitrogen gas flow at room temperature for 6 hours. Subsequently, 30 g of perfluorohexane, 10 g of acetone, and 20 g of 3 mol/L hydrochloric acid were added and stirred for 30 minutes, and thereafter the perfluorohexane phase was separated using a separating funnel. Thereafter, the separated perfluorohexane phase was filtered, and then the volatile content was distilled off under reduced pressure to give 29.6 g of the perfluoropolyether group-containing allyl compound (A) of the following formula having an allyl group at the end.

Perfluoropolyether group-containing allyl compound (A):
$CF_3CF_2CF_2O[CF(CF_3)CF_2O]_{22}CF(CF_3)$ $CONHCH_2C$ $(CH_2CH=CH_2)_3$

Synthesis Example 2

To a four necked flask of 200 mL equipped with a reflux condenser, a thermometer, and a stirrer, 29 g of the perfluoropolyether group-containing allyl compound (A) having an allyl group at the end synthesized in Synthesis Example 1, 35 ml of 1,3-bis(trifluoromethyl)benzene, and 6.7 g of trichlorosilane were charged, and the mixture was stirred at 5° C. for 30 minutes under a nitrogen gas flow. Subsequently, 0.3 ml of a xylene solution containing 2% of a Pt complex of 1,3-divinyl-1,1,3,3-tetramethyldisiloxane was added, and then the temperature was raised to 60° C. and the mixture was stirred for 6 hours. Thereafter, the volatile content was distilled off under reduced pressure. Subsequently, 30 ml of 1,3-bis(trifluoromethyl)benzene was added and stirred at 55° C. for 10 minutes, and then a mixed solution of 0.73 g of methanol and 16.8 g of trimethyl orthoformate was added and stirred at this temperature for 2 hours. Thereafter, the volatile content was distilled off under reduced pressure to give 30.1 g of the following perfluoropolyether group-containing silane compound (B) having a trimethylsilyl group at the end.

Perfluoropolyether group-containing silane compound (B)
$CF_3CF_2CF_2O$ [$CF(CF_3)CF_2O]_{22}CF(CF_3)$ $CONHCH_2C$ $[CH_2CH_2CH_2Si(OCH_3)_3]_3$

Synthesis Example 3

To a four necked flask of 200 mL equipped with a reflux condenser, a thermometer, and a stirrer, 32 g of perfluoropolyether modified carboxylic acid represented by the average compositional formula $CF_3CF_2CF_2O$ [$CF(CF_3)CF_2O]_{28}CF$ ($CF_3$) COOH, 16 g of 1,3-bis(trifluoromethyl)benzene, 0.10 g of N,N-dimethylformamide, and 1.69 g of thionyl chloride were charged, and the mixture was stirred at 90° C. for 1 hour under a nitrogen gas flow. Subsequently, volatile content was distilled off under reduced pressure, 16 g of 1,3-bis(trifluoromethyl)benzene, 1.05 g of triethylamine, and 1.36 g of $NH_2CH_{2C}(CH_2CH=CH_2)_3$ were charged, and the mixture was stirred under a nitrogen gas flow at room temperature for 6 hours. Subsequently, 30 g of perfluorohexane, 10 g of acetone, and 20 g of 3 mol/L hydrochloric acid were added and stirred for 30 minutes, and thereafter the perfluorohexane phase was separated using a separating funnel. Thereafter, the separated perfluorohexane phase was filtered, and then the volatile content was distilled off under reduced pressure to give 29.2 g of the perfluoropolyether group-containing allyl compound (C) of the following formula having an allyl group at the end.

Perfluoropolyether group-containing allyl compound (C): $CF_3CF_2CF_2O$ $[CF(CF_3)CF_2O]_{28}CF(CF_3)$ $CONHCH_2C$ $(CH_2CH=CH_2)_3$

Synthesis Example 4

To a four necked flask of 200 mL equipped with a reflux condenser, a thermometer, and a stirrer, 29 g of the perfluoropolyether group-containing allyl compound (C) having an allyl group at the end synthesized in Synthesis Example 3, 35 ml of 1,3-bis(trifluoromethyl)benzene, and 5.2 g of trichlorosilane were charged, and the mixture was stirred at 5° C. for 30 minutes under a nitrogen gas flow. Subsequently, 0.23 ml of a xylene solution containing 2% of a Pt complex of 1,3-divinyl-1,1,3,3-tetramethyldisiloxane was added, and then the temperature was raised to 60° C. and the mixture was stirred for 6 hours. Thereafter, the volatile content was distilled off under reduced pressure. Subsequently, 30 ml of 1,3-bis(trifluoromethyl)benzene was added and stirred at 55° C. for 10 minutes, and then a mixed solution of 0.57 g of methanol and 13.1 g of trimethyl orthoformate was added and stirred at this temperature for 2 hours. Thereafter, the volatile content was distilled off under reduced pressure to give 29.6 g of the following perfluoropolyether group-containing silane compound (D) having a trimethylsilyl group at the end.

Perfluoropolyether group-containing silane compound (D) $CF_3CF_2CF_2O$ $[CF(CF_3)CF_2O]_{28}CF(CF_3)$ $CONHCH_2C$ $[CH_2CH_2CH_2Si(OCH_3)_3]_3$

Synthesis Example 5

To a four necked flask of 200 mL equipped with a reflux condenser, a thermometer, and a stirrer, 32 g of perfluoropolyether modified carboxylic acid represented by the average compositional formula $CF_3CF_2CF_2O[CF(CF_3)CF_2O]_{11}CF$ $(CF_3)$ COOH, 16 g of 1,3-bis(trifluoromethyl)benzene, 0.23 g of N,N-dimethylformamide, and 3.81 g of thionyl chloride were charged, and the mixture was stirred at 90° C. for 1 hour under a nitrogen gas flow. Subsequently, volatile content was distilled off under reduced pressure, 16 g of 1,3-bis(trifluoromethyl)benzene, 2.43 g of triethylamine, and 3.04 g of $NH_2CH_2C(CH_2CH=CH_2)_3$ were charged, and the mixture was stirred under a nitrogen gas flow at room temperature for 6 hours. Subsequently, 30 g of perfluorohexane, 10 g of acetone, and 20 g of 3 mol/L hydrochloric acid were added and stirred for 30 minutes, and thereafter the perfluorohexane phase was separated using a separating funnel. Thereafter, the separated perfluorohexane phase was filtered, and then the volatile content was distilled off under reduced pressure to give 29.4 g of the perfluoropolyether group-containing allyl compound (E) of the following formula having an allyl group at the end.

Perfluoropolyether group-containing allyl compound (E): $CF_3CF_2CF_2O[CF(CF_3)CF_2O]_{11}CF(CF_3)$ $CONHCH_2C$ $(CH_2CH=CH_2)_3$

Synthesis Example 6

To a four necked flask of 200 mL equipped with a reflux condenser, a thermometer, and a stirrer, 29 g of the perfluoropolyether group-containing allyl compound (E) having an allyl group at the end synthesized in Synthesis Example 5, 29.0 ml of 1,3-bis(trifluoromethyl)benzene, and 11.8 g of trichlorosilane were charged, and the mixture was stirred at 5° C. for 30 minutes under a nitrogen gas flow. Subsequently, 0.8 ml of a xylene solution containing 2% of a Pt complex of 1,3-divinyl-1,1,3,3-tetramethyldisiloxane was added, and then the temperature was raised to 60° C. and the mixture was stirred for 6 hours. Thereafter, the volatile content was distilled off under reduced pressure. Subsequently, 29.0 ml of 1,3-bis(trifluoromethyl)benzene was added and stirred at 55° C. for 10 minutes, and then a mixed solution of 1.30 g of methanol and 29.2 g of trimethyl orthoformate was added and stirred at this temperature for 2 hours. Thereafter, the volatile content was distilled off under reduced pressure to give 30.0 of the following perfluoropolyether group-containing silane compound (F) having a trimethylsilyl group at the end.

Perfluoropolyether group-containing silane compound (F) $CF_3CF_2CF_2O[CF(CF_3)CF_2O]_{11}CF(CF_3)$ $CONHCH_2C$ $[CH_2CH_2CH_2Si(OCH_3)_3]_3$

Example 1

The compound (B) obtained in Synthesis Example 2 was dissolved in hydrofluoroether (Novec HFE7200 manufactured by 3M Co., Ltd.) to a concentration of 20 wt % to prepare a surface-treating agent.

Example 2

A surface-treating agent was prepared in the same manner as in Example 1 except that the compound (D) obtained in Synthesis Example 4 was used instead of the compound (B).

Example 3

A surface-treating agent was prepared in the same manner as in Example 1 except that the compound (F) obtained in Synthesis Example 6 was used instead of the compound (B).

Example 4

A surface-treating agent was prepared in the same manner as in Example 1 except that the compound (G) was used instead of the compound (B).

Compound (G) $CF_3CF_2CF_2O[CF(CF_3)CF_2O]_{28}CF(CF_3)$ $CONHCH_2CH_2CH_2Si(OCH_3)_3$

Example 5

A surface-treating agent was prepared in the same manner as in Example 1 except that the compound (H) was used instead of the compound (B).

Compound (H) $CF_3CF_2CF_2O[CF(CF_3)CF_2O]_{22}CF(CF_3)$ $CH_2CH_2CH_2CH_2Si[CH_2CH_2CH_2Si(OCH_3)_3]_3$

Example 6

A surface-treating agent was prepared in the same manner as in Example 1 except that the compound (I) was used instead of the compound (B).

Compound (I) $CF_3CF_2CF_2O[CF(CF_3)CF_2O]_{22}CF(CF_3)$ C $[OCH_2CH_2CH_2Si(OCH_3)$ $3][C$ $H_2CH_2CH_2Si(OCH_3)_3]_2$

Comparative Examples 1 and 2

Surface-treating agents were prepared in the same manner as in Example 1 except that the control compound 1 or 2 was used instead of the compound (B).

Control compound 1

$CF_3CF_2CF_2O(CF_2CF_2CF_2O)_{30}CF_2CF_2CONHCH_2C$ $[CH_2CH_2CH_2Si(OCH_3) \ 3]_3$

Control compound 2

$CF_3O(CF_2CF_2O)_{22}$     $(CF_2O)_{23}CF_2CONHCH_2C$ $[CH_2CH_2CH_2Si(OCH_3)_3]_3$

EVALUATION

The surface-treating agents prepared in Examples 1 to 6 and Comparative Examples 1 and 2 were vacuum-deposited on chemically strengthened glass ("Gorilla" glass manufactured by Corning, thickness 0.7 mm). The processing condition for the vacuum deposition was a pressure of $3.0\times10^{-3}$ Pa, a 5 nm silicon dioxide layer was formed on the surface of the chemically strengthened glass, and then 4 mg of a surface-treating agent (i.e., it contains 0.8 mg of any of compound (B), compound (D), compound (F), compound (G), compound (H), compound (I), or control compounds 1, 2) was deposited per sheet of the chemically strengthened glass (55 mm×100 mm). Next, the chemically strengthened glass with a deposition coating was allowed to stand for 30 minutes in an atmosphere at a temperature of 150° C. and then allowed to cool to room temperature to form a surface-treating layer.

(Evaluation of Water-Repellency)

The static contact angle was measured using a contact angle measurement apparatus (manufactured by Kyowa Interface Science Co., Ltd.). The static contact angle of water was measured with 2 μL of water. The results are shown in the table below.

TABLE 1

|  |  | Water |
|---|---|---|
| Example 1 | Contact angle (degrees) | 115 |
| Example 2 | Contact angle (degrees) | 115 |
| Example 3 | Contact angle (degrees) | 114 |
| Example 4 | Contact angle (degrees) | 114 |
| Example 5 | Contact angle (degrees) | 114 |
| Example 6 | Contact angle (degrees) | 114 |
| Comparative Example 1 | Contact angle (degrees) | 114 |
| Comparative Example 2 | Contact angle (degrees) | 114 |

(UV Resistance Evaluation)

With respect to the surface-treating layer formed above, the static contact angles of water before and after UV irradiation were measured. UV irradiation was performed using a UVB-313 lamp (manufactured by Q-Lab Corporation, 0.63 W/m² irradiance at 310 nm), with the black panel temperature of the base material being 63° C. and the distance between the lamp and the surface-treating layer being 5 cm. The static contact angle of water was measured for 2 μL of water by using a contact angle measurement apparatus (manufactured by Kyowa Interface Science Co., Ltd.).

Firstly, as an initial evaluation, the static contact angle of water was measured after the surface-treating layer was formed and before UV irradiation (UV irradiation time of 0 hours). Thereafter, the static contact angle of water was measured for each surface-treating layer after UV irradiation for a predetermined time. The evaluation was performed up to a cumulative irradiation time of 96 hours. The results are shown in Table 2. Table 3 shows the ratio of the contact angle value after the cumulative UV irradiation time of 96 hours to the contact angle value after the UV irradiation time of 0 hours (value of contact angle after 96 hours of cumulative UV irradiation time/value of contact angle after 0 hours of UV irradiation time).

TABLE 2

|  |  | Cumulative UV irradiation time (hours) | | | | |
|---|---|---|---|---|---|---|
|  |  | 0 | 24 | 48 | 72 | 96 |
| Example 1 | Contact angle (degrees) | 115 | 115 | 112 | 110 | 98 |
| Example 2 | Contact angle (degrees) | 115 | 115 | 113 | 111 | 100 |
| Example 3 | Contact angle (degrees) | 114 | 114 | 111 | 108 | 95 |
| Example 4 | Contact angle (degrees) | 114 | 114 | 111 | 107 | 92 |
| Example 5 | Contact angle (degrees) | 114 | 114 | 111 | 107 | 93 |
| Example 6 | Contact angle (degrees) | 114 | 114 | 111 | 107 | 94 |
| Comparative Example 1 | Contact angle (degrees) | 114 | 114 | 111 | 105 | 86 |
| Comparative Example 2 | Contact angle (degrees) | 114 | 114 | 98 | 83 | 70 |

TABLE 3

|  |  | Cumulative UV irradiation time (hours) | | | | |
|---|---|---|---|---|---|---|
|  |  | 0 | 24 | 48 | 72 | 96 |
| Example 1 | Ratio of contact angle(%) | 100.0 | 100.0 | 97.4 | 95.7 | 85.2 |
| Example 2 | Ratio of contact angle(%) | 100.0 | 100.0 | 98.3 | 96.5 | 87.0 |
| Example 3 | Ratio of contact angle(%) | 100.0 | 100.0 | 97.4 | 94.7 | 83.3 |
| Example 4 | Ratio of contact angle(%) | 100.0 | 100.0 | 97.4 | 93.9 | 80.7 |
| Example 5 | Ratio of contact angle(%) | 100.0 | 100.0 | 97.4 | 93.9 | 81.6 |
| Example 6 | Ratio of contact angle(%) | 100.0 | 100.0 | 97.4 | 93.9 | 82.4 |
| Comparative Example 1 | Ratio of contact angle(%) | 100.0 | 100.0 | 97.4 | 92.1 | 75.4 |
| Comparative Example 2 | Ratio of contact angle(%) | 100.0 | 100.0 | 86.0 | 72.8 | 61.4 |

Surface lubricity evaluation (measurement of dynamic friction coefficient)

The dynamic friction coefficient (−) of the base material having the surface-treating layer on the surface formed above was measured in accordance with ASTM D4917 using paper as a friction block using a surface measuring instrument (manufactured by Labthink Instruments Co. Ltd., FPT-1).

Specifically, the base material having the surface-treating layer was disposed horizontally, paper (2 cm×2 cm) serving as a friction block was brought into contact with the exposed upper surface of the surface-treating layer, and a load of 200 gf was applied thereon. Thereafter, the paper serving as a friction block was moved in parallel at a speed of 200 mm/sec under the load, and the dynamic friction coefficient was measured. The results are shown in the table below.

TABLE 4

| | Dynamic friction coefficient (−) |
|---|---|
| Example 1 | 0.26 |
| Example 2 | 0.23 |
| Example 3 | 0.28 |
| Example 4 | 0.22 |
| Example 5 | 0.24 |
| Example 6 | 0.23 |
| Comparative Example 1 | 0.07 |
| Comparative Example 2 | 0.03 |

As described above, by using the surface-treating agents of Examples 1 to 6, surface-treating layers having a high dynamic friction coefficient, that is, surface-treating layers with suppressed lubricity on the surface were obtained.

INDUSTRIAL APPLICABILITY

The present disclosure can be suitably used for various electronic devices, particularly electronic devices requiring slip suppression on the surface thereof.

The invention claimed is:

1. A mobile phone or a smartphone comprising a surface-treating layer formed on at least a part of a surface thereof, wherein the mobile phone or the smartphone is an electronic device that is driven by a battery, and the surface-treating layer is formed of a fluoro (poly) ether group-containing silane compound represented by any of the following formulae (B1), (B2), (C1), or (C2):

$$(Rf - PFPE)_{\beta'} - X^3 - (SiR^a_{k1}R^b_{11}R^c_{m1})_{\beta} \quad (B1)$$

$$(R^c_{m1}R^b_{11}R^a_{k1}Si)_{\beta} - X^3 - PFPE - X^3 - (SiR^a_{k1}R^b_{11}R^c_{m1})_{\beta} \quad (B2)$$

$$(Rf - PFPE)_{\gamma'} - X^5 - (CR^d_{k2}R^e_{12}R^f_{m2})_{\beta} \quad (C1)$$

$$(R^f_{m2}R^e_{12}R^d_{k2}C)_{\gamma} - X^5 - PFPE - X^5 - (CR^d_{k2}R^e_{12}R^f_{m2})_{\gamma}, \quad (C2)$$

wherein:

PFPE is each independently at each occurrence a group represented by the formula:

$$-(OC_6F_{12})_a - (OC_5F_{10})_b - (OC_4F_8)_c - (OC_3X^F_6)_d - (OC_2F_4)_e - (OCF_2)_f -$$

and having at least one branched structure, wherein a, b, c, d, e, and f are each independently an integer of 0 or more and 200 or less, and the sum of a, b, c, d, e, and f is at least 1, and the occurrence order of the respective repeating units in parentheses with a, b, c, d, e, or f is arbitrary in the formula, and $X^F$ is each independently at each occurrence a hydrogen atom, a fluorine atom, or a chlorine atom, or a group represented by the formula:

$$-(R^{16} - R^{17})^{l1} -$$

wherein $R^{16}$ is $OCF_2$ or $OC_2F_4$;
$R^{17}$ is a group selected from $OC_2F_4$, $OC_3X^F_6$, $OC_4F_8$, $OC_5F_{10}$, and $OC_6F_{12}$, or is a combination of two or three groups independently selected from these groups;
j1 is an integer of 2 to 100; and
$X^F$ is each independently at each occurrence a hydrogen atom, a fluorine atom, or a chlorine atom;

Rf each independently at each occurrence represents an alkyl group having 1 to 16 carbon atoms which is optionally substituted by one or more fluorine atoms;
$X^3$ each independently at each occurrence represents $-(R^{31})_{p'} - (X^a)_{q'} - R^{32} -$, $-X^{10} - CON(R^{34}) - X^{11} -$, $-X^{10} - (OR^{35})_{n4} - X^{11} -$, or a $C_{1-6}$ alkylene group;
$R^{31}$ represents a single bond, $-(CH_2)_{s'} -$ which is optionally substituted by one or more fluorine atoms, or an o-, m-, or p-phenylene group;
s' is an integer of 1 to 20;
$X^a$ is $-(X^b)_{l'} -$;
$X^b$ each independently at each occurrence represents a group selected from the group consisting of $-O-$, $-(OR^{35})_{n4} -$, $-S-$, an o-, m-, or p-phenylene group, $-C(O)O-$, $-Si(R^{33})_2 -$, $(Si(R^{33})_2O)_{m'} - Si(R^{33})_2 -$, $-CON(R^{34}) -$, $-O-CON(R^{34}) -$, $-N(R^{34}) -$, and $-(CH_2)_{n'} -$;
$R^{33}$ each independently at each occurrence represents a phenyl group, a $C_{1-6}$ alkyl group, or a $C_{1-6}$ alkoxy group;
$R^{34}$ each independently at each occurrence represents a hydrogen atom, a phenyl group, or a $C_{1-6}$ alkyl group;
$R^{35}$ is each independently at each occurrence a $C_{1-6}$ alkylene group;
n4 is each independently at each occurrence an integer of 1 to 5;
m' is each independently at each occurrence an integer of 1 to 100;
n' is each independently at each occurrence an integer of 1 to 20;
l' is an integer of 1 to 10;
p' is 0 or 1;
q' is 0 or 1;
at least one of p' and q' is 1, and the occurrence order of the respective repeating units in parentheses with p' or q' is arbitrary in the formula;
$R^{32}$ represents a single bond, $-(CH_2)_{t'} -$ or an o-, m-, or p-phenylene group;
t' is an integer of 1 to 20;
$X^{10}$ is a single bond or a divalent organic group;
$X^{11}$ is a single bond, an oxygen atom, or a divalent organic group;
$R^{34}$ is a hydrogen atom, a phenyl group, or a $C_{1-6}$ alkyl group;
$R^{35}$ is each independently at each occurrence a $C_{1-6}$ alkylene group;
$n^4$ is an integer of 1 to 5;
$\beta$ and $\beta'$ are 1;
$R^a$ each independently at each occurrence represents $-Z^3 - SiR^{71}_{p1}R^{72}_{q1}R^{73}_{r1}$;
$Z^3$ each independently at each occurrence represents an oxygen atom or a divalent organic group;
$R^{71}$ each independently at each occurrence represents $R^{a'}$;
$R^{a'}$ is as defined for $R^a$;
in $R^a$, the number of Si atoms which are linearly linked via the $Z^3$ group is up to five;
$R^{72}$ each independently at each occurrence represents a hydroxyl group or a hydrolyzable group;
$R^{73}$ each independently at each occurrence represents a hydrogen atom or a lower alkyl group;
p1 is 0;
q1 is each independently at each occurrence an integer of 1 to 3;
r1 is each independently at each occurrence an integer of 0 to 2;
in each $(-Z^3 - SiR^{71}_{p1}R^{72}_{q1}R^{73}_{r1})$, the sum of p1, q1, and r1 is 3;
$R^b$ each independently at each occurrence represents a hydroxyl group or a hydrolyzable group;

$R^c$ each independently at each occurrence represents a hydrogen atom or a lower alkyl group;

k1 is 3;

l1 and m1 are 0;

$X^5$ is a divalent group represented by the following formula:

$$-(R^{31})_{p'}-(X^a)_{q'}-$$

wherein:

$R^{31}$ represents a single bond, $-(CH_2)_{s'}-$ which is optionally substituted by one or more fluorine atoms, or an o-, m-, or p-phenylene group, s' is an integer of 1 to 20, $X^a$ represents $-(X^b)_{l'}-$, $X^b$ each independently at each occurrence represents a group selected from the group consisting of $-O-$, $-(OR^{35})_{n4}-$, $-S-$, an o-, m-, or p-phenylene group, $-C(O)O-$, $-Si(R^{33})_2-$, $-(Si(R^{33})_2O)_{m'}-Si(R^{33})_2-$, $-CON(R^{34})-$, $-O-CON(R^{34})-$, $-N(R^{34})-$, and $-(CH_2)_{n'}-$, $R^{33}$ each independently at each occurrence represents a phenyl group, a $C_{1-6}$ alkyl group, or a $C_{1-6}$ alkoxy group, $R^{34}$ each independently at each occurrence represents a hydrogen atom, a phenyl group, or a $C_{1-6}$ alkyl group, $R^{35}$ is each independently at each occurrence a $C_{1-6}$ alkylene group, n4 is each independently at each occurrence an integer of 1 to 5, m' is each independently at each occurrence an integer of 1 to 100, n' is each independently at each occurrence an integer of 1 to 20, l' is an integer of 1 to 10, p' is 0 or 1, q' is 0 or 1, and at least one of p' and q' is 1, and the occurrence order of the respective repeating units in parentheses with p' or q' is arbitrary in the formula;

γ and γ' are 1;

$R^d$ each independently at each occurrence represents $-Z^4-CR^{81}_{p2}R^{82}_{q2}R^{83}_{r2}$;

$Z^4$ each independently at each occurrence represents an oxygen atom or a divalent organic group;

$R^{81}$ each independently at each occurrence represents $R^{d'}$;

$R^{d'}$ is as defined for $R^d$;

in $R^d$, the number of C atoms which are linearly linked via the $Z^4$ group is up to five;

$R^{82}$ each independently at each occurrence represents $-Y-SiR^{85}_{n2}R^{86}_{3-n2}$;

Y each independently at each occurrence represents a divalent organic group;

$R^{85}$ each independently at each occurrence represents a hydroxyl group or a hydrolyzable group;

$R^{86}$ each independently at each occurrence represents a hydrogen atom or a lower alkyl group;

n2 independently represents an integer of 1 to 3 for each $(-Y-SiR^{85}_{n2}R^{86}_{3-n2})$ unit;

$R^{83}$ each independently at each occurrence represents a hydrogen atom, a hydroxyl group, or a lower alkyl group;

p2 is each independently at each occurrence an integer of 0 to 3;

q2 is each independently at each occurrence an integer of 0 to 3;

r2 is each independently at each occurrence an integer of 0 to 3;

in each $(-Z^4-CR^{81}_{p2}R^{82}_{q2}R^{83}_{r2})$, the sum of p2, q2, and r2 is 3;

$R^e$ each independently at each occurrence represents $-Y-SiR^{85}_{n2}R^{86}_{3-n2}$;

$R^f$ each independently at each occurrence represents a hydrogen atom, a hydroxyl group, or a lower alkyl group;

k2 is 0;

l2 is 3;

m2 is 0; and in the formulae (C1) and (C2), there is at least one group represented by $-Y-SiR^{85}$.

2. The mobile phone or the smartphone according to claim 1, wherein in the formulae (B1) and (B2), there are at least two Si atoms bonded to a hydroxyl group or a hydrolyzable group.

3. The mobile phone or the smartphone according to claim 1, wherein in the formulae (C1) and (C2), there are two or more groups represented by $-Y-SiR^{85}$.

4. The mobile phone or the smartphone according to claim 1, wherein $X^F$ is a fluorine atom.

5. The mobile phone or the smartphone according to claim 1, wherein $R^{83}$ and $R^f$ are each independently at each occurrence a hydrogen atom or a lower alkyl group.

6. The mobile phone or the smartphone according to claim 1, wherein the electronic device is a device capable of being driven by a rechargeable battery.

7. The mobile phone or the smartphone according to claim 6, wherein the electronic device has a first main surface and a second main surface facing the first main surface, and has a surface-treating layer on the second main surface.

8. The mobile phone or the smartphone according to claim 1, wherein PFPE is a group represented by the formula:

$$-(OCF_2CF(CF_3))_d-(OC_2F_4)_e-,$$

wherein d is an integer of 1 or more and 200 or less, and e is 0 or 1.

9. The mobile phone or the smartphone according to claim 1, wherein a dynamic friction coefficient on the surface-treating layer is in the range of 0.1 to 0.5.

10. The mobile phone or the smartphone according to claim 1, wherein the mobile phone or the smartphone is wirelessly rechargeable, and the surface-treating layer of the mobile phone or the smartphone is in contact with a surface of a charging stand.

* * * * *